(12) United States Patent
Kuriya et al.

(10) Patent No.: US 7,240,033 B2
(45) Date of Patent: Jul. 3, 2007

(54) INFORMATION PROVIDING APPARATUS AND METHOD, INFORMATION PROCESSING APPARATUS AND METHOD, PROGRAM STORAGE MEDIUM, PROGRAM, AND INFORMATION PROVIDING SYSTEM

(75) Inventors: Shinobu Kuriya, Chiba (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 601 days.

(21) Appl. No.: 09/803,898

(22) Filed: Mar. 13, 2001

(65) Prior Publication Data

US 2001/0056404 A1 Dec. 27, 2001

(30) Foreign Application Priority Data

Mar. 14, 2000 (JP) .............................. 2000-070149

(51) Int. Cl.
*G06F 17/60* (2006.01)

(52) U.S. Cl. ..................... 705/51; 705/59; 705/55; 705/52; 380/201; 380/277; 713/167; 902/1

(58) Field of Classification Search ............... 705/1, 705/52, 55, 59, 51; 380/201, 277; 713/167
See application file for complete search history.

(56) References Cited

U.S. PATENT DOCUMENTS

| | | | | |
|---|---|---|---|---|
| 5,138,712 A | * | 8/1992 | Corbin ..................... 713/200 |
| 5,715,403 A | * | 2/1998 | Stefik ........................ 705/44 |
| 5,794,217 A | | 8/1998 | Allen |
| 5,907,617 A | * | 5/1999 | Ronning .................... 705/52 |
| 5,925,127 A | * | 7/1999 | Ahmad ..................... 713/200 |
| 5,933,498 A | * | 8/1999 | Schneck et al. ............. 705/54 |
| 5,991,876 A | * | 11/1999 | Johnson et al. .............. 726/28 |
| 6,058,476 A | | 5/2000 | Matsuzaki et al. |
| 6,226,618 B1 | * | 5/2001 | Downs et al. ................ 705/1 |

FOREIGN PATENT DOCUMENTS

| | | |
|---|---|---|
| EP | 0 715 244 A1 | 6/1996 |
| EP | 0 809 221 A2 | 11/1997 |
| JP | 1041767 | * 10/2000 |
| WO | WO 00/11871 | 3/2000 |

* cited by examiner

OTHER PUBLICATIONS

The Technology of RightDigtal Rights Management, Karen Coyle Nov. 2003.*

*Primary Examiner*—Andrew J. Fischer
*Assistant Examiner*—John Winter
(74) *Attorney, Agent, or Firm*—Oblon, Spivak, McClelland, Maier & Neustadt, P.C.

(57) ABSTRACT

Disclosed is an information providing apparatus comprising first reception control means for controlling the reception, from a first information processing apparatus, of user identification data for identifying a user of the first information processing apparatus and a request for purchasing a content, first transmission control means for controlling in response to the request for purchasing the content the transmission of the request for purchasing the content to a second information processing apparatus, second reception control means for controlling the reception of the content and usage conditions thereof supplied from the second information processing apparatus, storage control means for controlling the storing of the content and usage conditions thereof in correlation with the user identification data, third reception control means for controlling the reception of the user identification data and a request for sending the content supplied from the first information processing apparatus, and second transmission control means for controlling, in response to the request for sending the content, the transmission of the content stored in correlation with the user identification data.

7 Claims, 34 Drawing Sheets

FIG. 8

| USER ID | CREDIT CARD NO | NAME | ADDRESS | E-MALL ADDRESS | DEVICE ID |
|---------|----------------|------|---------|----------------|-----------|
| AAA | i i i i | a i u | i ro ha | abc | X789, Z213 |
| BBB | ro ro ro ro | ka ki ku | ni ho he | def | X654, W423 |
| ⋮ | ⋮ | ⋮ | ⋮ | ⋮ | ⋮ |

FIG. 9

| CONTENT ID | USER ID | PERMITTED CHECK-OUT COUNT | DEVICE ID |
|------------|---------|---------------------------|-----------|
| A123 | AAA | 2 | X789 |
| D666 | BBB | 2 | Y654 |
| ⋮ | ⋮ | ⋮ | ⋮ |

FIG.11

| CONTENT ID | USER ID | PERMITTED CHECK-OUT COUNT | DEVICE ID |
|---|---|---|---|
| A123 | AAA | 2 | X789 |
| ⋮ | ⋮ | ⋮ | ⋮ |

FIG.12

| CONTENT ID | USER ID | PERMITTED CHECK-OUT COUNT | DEVICE ID |
|---|---|---|---|
| A123 | AAA | 2 | X789 |
| B456 | AAA | 3 | null |
| ⋮ | ⋮ | ⋮ | ⋮ |

F I G. 15

| CONTENT ID | USER ID | PERMITTED CHECK-OUT COUNT | DEVICE ID |
|---|---|---|---|
| A123 | AAA | 2 | Z213 |
| B456 | AAA | 1 | X789, Z213 |
| ⋮ | ⋮ | ⋮ | ⋮ |

F I G. 16

| DESTINATIONS OF CHECK-OUT | |
|---|---|
| MUSIC TITLE | DEVICE ID |
| A I U E O | Z213 |
| KA KI KU KE KO | X789, Z213 |
| ⋮ | ⋮ |

FIG. 18

| CONTENT ID | USER ID | PERMITTED CHECK-OUT COUNT | DEVICE ID |
|---|---|---|---|
| A123 | AAA | 2 | X789 |
| B456 | AAA | 3 | null |
| ⋮ | ⋮ | ⋮ | ⋮ |

FIG. 19

| CONTENT ID | USER ID | PERMITTED CHECK-OUT COUNT | DEVICE ID |
|---|---|---|---|
| A123 | AAA | 3 | null |
| B456 | AAA | 3 | null |
| ⋮ | ⋮ | ⋮ | ⋮ |

FIG. 20

| CONTENT ID | USER ID | PERMITTED CHECK-OUT COUNT | DEVICE ID |
|---|---|---|---|
| A123 | AAA | 3 | NULL |
| B456 | AAA | 2 | X789 |
| ⋮ | ⋮ | ⋮ | ⋮ |

FIG. 22

| CONTENT ID | USER ID | CONTENT SUPPLY SOURCE ADDRESS | PERMITTED CHECK-OUT COUNT | DEVICE ID |
|---|---|---|---|---|
| A123 | AAA | ααα | 2 | X789 |
| D666 | BBB | τττ | 2 | Y654 |
| ... | ... | ... | ... | ... |

FIG. 29

| CONTENT ID | USER ID | PERMITTED CHECK-OUT COUNT | INFORMATION OF CHECK-OUT DESTINATION | | | | | |
|---|---|---|---|---|---|---|---|---|
| | | | 1 | | 2 | | 3 | |
| | | | DEVICE ID | MEDIUM ID | DEVICE ID | MEDIUM ID | DEVICE ID | MEDIUM ID |
| A123 | AAA | 2 | null | AZ555 | null | null | null | null |
| B456 | AAA | 1 | X789 | null | z213 | null | null | null |
| D666 | BBB | 1 | null | BX222 | w423 | null | null | null |
| ... | ... | ... | ... | ... | ... | ... | ... | ... |

F I G. 35

| CONTENT ID | USER ID | CONTENT SUPPLY SOURCE ADDRESS | PERMITTED CHECK-OUT COUNT | INFORMATION OF CHECK-OUT DESTINATION |||||||
|---|---|---|---|---|---|---|---|---|---|
| | | | | 1 || 2 || 3 ||
| | | | | DEVICE ID | MEDIUM ID | DEVICE ID | MEDIUM ID | DEVICE ID | MEDIUM ID |
| A123 | AAA | α α α | 2 | null | AZ555 | null | null | null | null |
| B456 | AAA | β β β | 1 | X789 | null | z213 | null | null | null |
| D666 | BBB | γ γ γ | 1 | null | BX222 | w423 | null | null | null |
| ... | ... | ... | ... | ... | ... | ... | ... | ... | ... |

F I G. 36
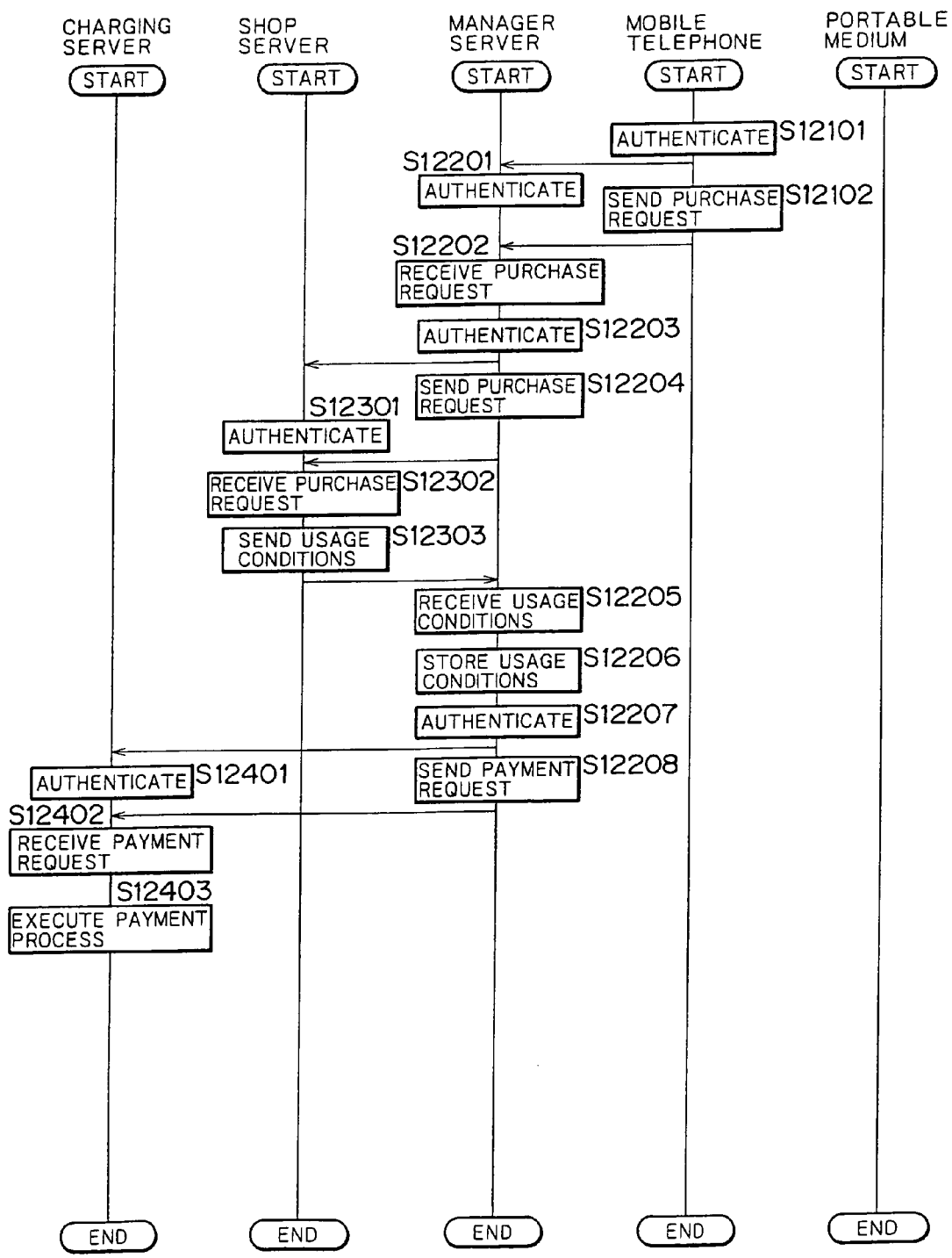

INFORMATION PROVIDING APPARATUS AND METHOD, INFORMATION PROCESSING APPARATUS AND METHOD, PROGRAM STORAGE MEDIUM, PROGRAM, AND INFORMATION PROVIDING SYSTEM

BACKGROUND OF THE INVENTION

The present invention relates generally to an information providing apparatus and method, an information processing apparatus and method, a program storage medium, a program, and an information providing system. More particularly, the present invention relates to an information providing apparatus and method, an information processing apparatus and method, a program storage medium, a program, and an information providing system which manage and provide a content on the basis of usage conditions.

FIG. 1 shows a configuration of a related-art digital data transmission system. A personal computer 1-1 is connected to a network 3 constituted by a local area network or the Internet. The personal computer 1-1 receives content usage conditions and music data (hereinafter referred to as a content) from a shop server 4 via the network 3 and records the received content in accordance with the received usage connotations. The content received from the shop server 4 is encoded by a predetermined compression scheme (for example, ATRAC3 (trademark) and encrypted by a predetermined encryption algorithm such as DES (Data Encryption Standard).

The usage conditions indicate the number of portable devices 2 (also referred to as PDs) which can simultaneously use the content compliant with the usage conditions (namely, the number of PDs that can check out the content, which will be described later), for example. When a content has been checked out by the number of times specified by the usage conditions, the personal computer 1-1 can reproduce this content.

The personal computer 1-1 displays the data associated with the content stored therein (for example, music titles or usage conditions) and makes a software module (hereinafter referred to as LCM (Licensed Compliant Module), not shown, compliant with the SDMI (Secure Digital Music Initiative) standard execute processing such as check-out when a check-out command for example is inputted.

The LCM of the personal computer 1-1 is constituted by a group of modules which control the use of content only when the usage conditions specified by the copyright holder of individual content are satisfied, thereby preventing the copyright infringement based on noncompliant secondary use of the content. The usage conditions include content's reproduction condition, copy condition, move condition, and accumulation condition.

The LCM of the personal computer 1-1 makes an authentication whether the devices connected to the personal computer 1-1 are compliant ones and executes the processing such as a movement of content by a safe method. Along with this processing, the LCM generates a necessary key, manages the generated key, and encrypts the content with this key, or controls the communication with the connected devices.

The LCM of the personal computer 1-1 checks the connected portable device 2 for its validity, adds the usage conditions specified by the shop server 4 to the (encrypted) content, and stores the content in the portable device 2.

The LCM of the personal computer 1-1 supplies the stored encrypted content along with the data (for example, a music title or usage conditions) associated with the content to the connected portable device 2 and accordingly updates the usage conditions (this update operation is hereinafter referred to as a check-out). To be more specific, when a check-out is made, the LCM decrements by one the permitted check-out count for the usage conditions for this content, the permitted checkout count being stored in the personal computer 1-1. When the check-out count is 0, the content cannot be checked out.

The portable device 2 stores in its internal storage medium such as a flash memory for example the content supplied from the personal computer 1-1 (namely, the checked out content) along with the data (for example, a music title or usage conditions) associated with that content.

The portable device 2 reproduces the stored content on the basis of its usage conditions and outputs a reproduced signal to a headphone for example, not shown.

For example, if the user attempts the reproduction of a certain content stored in the portable device 2 in excess of a reproduction count set as a reproduction limit, the portable device 2 fails the attempt.

The user can remove the portable device 2 storing a content from the personal computer 1-1 to carry it about and reproduce the stored content to listen to the reproduced music for example by means of a headphone.

When the portable device 2 is connected to the personal computer 1-1 via a USB cable for example, the portable device 2 and the personal computer 1-1 cross-authenticate each other. This cross-authentication is based on a challenge-response scheme. In the challenge-response scheme, to a certain value (or a challenge) generated by the personal computer 1-1, the portable device 2 makes a response with a value (or a response) generated by use of a secret key shared by the personal computer 1-1.

If a duplication of the content purchased from the shop server 4 is not permitted (namely, if the duplication is prohibited in the usage conditions), the duplication made from the personal computer 1-1 to a personal computer 1-2 cannot be used by the personal computer 1-2.

Likewise, when the content is checked out to the portable device 2, the portable device 2 does not permit the content to be further replicated to a personal computer 1-3.

The shop server 4 accumulates a content compressed and encrypted in predetermined algorithms and distributes the accumulated content on demand from the personal computer 1-1. The shop server 4 accumulates content keys for decrypting the content supplied to the personal computer 1-1 and supplies the accumulated content keys to the personal computer 1-1. Before supplying the content, the shop server 4 cross-authenticates the personal computer 1-1. The shop server 4 encrypts the content key by a temporary key shared as a result of the cross-authentication and sends the encrypted content key to the personal computer 1-1. The personal computer 1-1 decrypts the content key by the shared temporary key.

When the personal computer 1-1 has purchased a content from the shop server 4, a charging server 5 cross-authenticates the personal computer 1-1 and, upon request from the personal computer 1-1, executes payment processing by use of a credit card number for example of the user of the personal computer 1-1.

The following describes processing for the personal computer 1-1 to purchase a content with reference to the flowchart shown in FIG. 2. In step S11, the personal computer 1-1 authenticates the shop server 4 via the network 3. In step S21, the shop server 4 authenticates the personal computer 1-1 via the network 3.

The shop server 4 stores a masker key KMS in advance and the personal computer 1-1 stores a private key KPP and an ID (Identification) of the personal computer 1-1 in advance. The personal computer 1-1 further stores a master key KMP in advance and the shop server 4 also stores its ID and a private key KPS in advance.

The shop server 4 receives the ID of the personal computer 1-1 therefrom and applies a hash function to the received ID and the master key KMS of the shop server 4 to generate a key which is the same as the private key KPP of the personal computer 1-1.

The personal computer 1-1 receives the ID of the shop server 4 from the shop server 4 and applies a hash function to the received ID and the master key KMP of the personal computer 1-1 to generate the same key as the private key KPS of the shop server 4. Consequently, the common private keys are shared between the personal computer 1-1 and the shop server 4. Using these private keys, a temporary key is further generated.

In step S12, the personal computer 1-1 sends a request to the shop server 4 via the network 3 for purchasing a desired content. In step S22, the shop server 4 receives the content purchase request from the personal computer 1-1.

In step S23, the shop server 4 sends the content requested by the process of step S22 to the personal computer 1-1 via the network 3. In step S13, the personal computer 1-1 receives the content from the shop server 4. In step S14, the personal computer 1-1 stores the content received in the process of step S13.

In step S15, the personal computer 1-1 authenticates the charging server 5 via the network 3. In step S31, the charging server 5 authenticates the personal computer 1-1 via the network 3.

In step S16, the personal computer 1-1 sends a payment request to the charging server 5 via the network 3. The payment request includes the credit card number for example of the user of the personal computer 1-1 and is encrypted by the temporary key generated in the authentication processing. In step S32, the charging server 5 receives the payment request from the personal computer 1-1. In step S33, the charging server 5 executes a payment process for a corresponding credit card company on the basis of the payment request received in the process of the step S32, upon which the content purchase processing comes to an end.

The following describes the processing in which the personal computer 1-1 checks out a content to the portable device 2 with reference to the flowchart shown in FIG. 3. In step S51, the personal computer 1-1 selects a content to be checked out, according to an operation by the user.

In step S52, the personal computer 1-1 sends the content selected in the process of step S51 to the portable device 2 along with the usage conditions. In step S53, the personal computer 1-1 updates the usage condition of the content sent to the portable device 2 (namely, the number of times the content can be checked out is decremented by 1).

In step S61, the portable device 2 receives the content from the personal computer 1-1 along with the usage conditions. In step S62, the portable device 2 stores the content and the usage conditions received in the process of step S61, upon which the check out processing comes to an end.

A problem with the above-mentioned related-art technology lies in that the user cannot purchase a content unless the user operates the personal computer 1-1. Another problem is that the user cannot check out a desired content from the personal computer 1-1 to the portable device 2 when the user carries about the portable device 2.

Another problem with the related-art is that, when checking out purchased content, the related-art requires troublesome operations such as content selection and check-out instruction.

Further another problem with the related-art is that, unless the portable device 2 has an enough free space, no content can be checked out.

Still another problem with the related-art is that, if there are two or more portable devices 2 connected to the personal computer 1-1, they must be distinguished from each other by displaying the distinction, otherwise the destination portable devices 2 of content movement, copy, and check-out cannot be known.

SUMMARY OF THE INVENTION

It is therefore an object of the present invention to allow use of desired contents at desired places and, even if memory has not enough free space, allow purchase of desired contents at desired places for use. It is another object of the present invention to allow users of content to quickly know destinations of the content.

In carrying out the invention and according to a first aspect thereof, there is provided an information providing apparatus including: first reception control means for controlling the reception, from a first information processing apparatus, of user identification data for identifying a user of the first information processing apparatus and a request for purchasing a content; first transmission control means for controlling in response to the request for purchasing the content the transmission of the request for purchasing the content to a second information processing apparatus; second reception control means for controlling the reception of the content and usage conditions thereof supplied from the second information processing apparatus; storage control means for controlling the storing of the content and usage conditions thereof in correlation with the user identification data; third reception control means for controlling the reception of the user identification data and a request for sending the content supplied from the first information processing apparatus; and second transmission control means for controlling, in response to the request for sending the content, the transmission of the content stored in correlation with the user identification data.

The above-mentioned information providing apparatus can be used as a manager server for example to be described later.

The above-mentioned first information processing apparatus can be typically used as a mobile telephone, a personal computer, or a PDA to be described later.

The second information processing apparatus in the information providing apparatus according to the first aspect of the invention can be typically used as a shop server to be described later.

Preferably, the above-mentioned third reception control means controls the reception of the request for sending the content as a request for checking out the content and the second transmission control means controls the transmission of the content as checking out of the content.

Preferably, the above-mentioned second transmission control means controls the transmission of the content to the first information processing apparatus.

Preferably, the second transmission control means controls the transmission of the content as checking out of the content to the first information processing apparatus.

Preferably, the above-mentioned second transmission control means controls the transmission of the content to a recording medium detachably loaded in the first information processing apparatus.

Preferably, the above-mentioned second transmission control means controls the transmission of the content as checking out of the content to the recording medium.

An information providing method according to the first aspect of the invention, including the steps of: controlling the reception, from a first information processing apparatus, of user identification data for identifying a user of the first information processing apparatus and a request for purchasing a content; controlling in response to the request for purchasing the content the transmission of the request for purchasing the content to a second information processing apparatus; controlling the reception of the content and usage conditions thereof supplied from the second information processing apparatus; controlling the storing of the content and usage conditions thereof in correlation with the user identification data; controlling the reception of the user identification data and a request for sending the content supplied from the first information processing apparatus; and controlling, in response to the request for sending the content, the transmission of the content stored in correlation with the user identification data.

A first program storage medium according to the first aspect of the invention stores a computer-readable program, including the steps of: controlling the reception, from a first information processing apparatus, of user identification data for identifying a user of the first information processing apparatus and a request for purchasing a content; controlling in response to the request for purchasing the content the transmission of the request for purchasing the content to a second information processing apparatus; controlling the reception of the content and usage conditions thereof supplied from the second information processing apparatus; controlling the storing of the content and usage conditions thereof in correlation with the user identification data; controlling the reception of the user identification data and a request for sending the content supplied from the first information processing apparatus; and controlling, in response to the request for sending the content, the transmission of the content stored in correlation with the user identification data.

A first program according to the first aspect of the invention instructs a computer to execute the steps of: controlling the reception, from a first information processing apparatus, of user identification data for identifying a user of the first information processing apparatus and a request for purchasing a content; controlling in response to the request for purchasing the content the transmission of the request for purchasing the content to a second information processing apparatus; controlling the reception of the content and usage conditions thereof supplied from the second information processing apparatus; controlling the storing of the content and usage conditions thereof in correlation with the user identification data; controlling the reception of the user identification data and a request for sending the content supplied from the first information processing apparatus; and controlling, in response to the request for sending the content, the transmission of the content stored in correlation with the user identification data.

An information processing apparatus according to the first aspect of the invention, including: first transmission control means for controlling the transmission, to a first information providing apparatus, of user identification data for identifying a user of the information processing apparatus and a request for purchasing a content to make the first information providing apparatus purchase the content from a second information providing apparatus and record the purchased content; second transmission control means for controlling the transmission, to the first information providing apparatus, of a request for the content recorded in the first information providing apparatus in correlation with the user identification data; and reception control means for controlling the reception of the content supplied from the first information providing apparatus.

The information processing apparatus according to the first aspect of the invention can be used as a mobile telephone, a personal computer, or a PDA for example to be described later.

The above-mentioned first information providing apparatus can be used as a manager server for example to be described later.

The above-mentioned second information providing apparatus can be used as a shop server for example to be described later.

Preferably, the above-mentioned second transmission control means controls the transmission of the request for the content as a request for checking out the content and the reception control means controls the reception of the checked out content.

Preferably, the above-mentioned information processing apparatus further includes storage control means for controlling the storing of the received content into an incorporated storage medium.

Preferably, the above-mentioned storage control means controls the storing of the content checked out to the incorporated storage medium.

Preferably, the above-mentioned information processing apparatus further includes storage control means for controlling the storing of the received content into a detachably loaded storage medium.

Preferably, the above-mentioned storage control means controls the storing of the checked out content into the storage medium.

An information processing method according to the first aspect of the invention, including the steps of: controlling the transmission, to a first information providing apparatus, of user identification data for identifying a user of the information processing apparatus and a request for purchasing a content to make the first information providing apparatus purchase the content from a second information providing apparatus and record the purchased content; controlling the transmission, to the first information providing apparatus, of a request for the content recorded in the first information providing apparatus in correlation with the user identification data; and controlling the reception of the content supplied from the first information providing apparatus.

A second program storage medium according to the first aspect of the invention stores a computer-readable program, including the steps of: controlling the transmission, to a first information providing apparatus, of user identification data for identifying a user of the information processing apparatus and a request for purchasing a content to make the first information providing apparatus purchase the content from a second information providing apparatus and record the purchased content; controlling the transmission, to the first information providing apparatus, of a request for the content recorded in the first information providing apparatus in correlation with the user identification data; and controlling the reception of the content supplied from the first information providing apparatus.

A second program according to the first aspect of the invention for instructs a computer to execute the steps of: first transmission control means for controlling the transmission, to a first information providing apparatus, of user identification data for identifying a user of the information processing apparatus and a request for purchasing a content to make the first information providing apparatus purchase the content from a second information providing apparatus and record the purchased content; controlling the transmission, to the first information providing apparatus, of a request for the content recorded in the first information providing apparatus in correlation with the user identification data; and controlling the reception of the content supplied from the first information providing apparatus.

The information providing apparatus and method, the first program storage medium, and the first program according to the first aspect of the invention control the reception, from the first information processing apparatus, user identification data for identifying a user of the first information processing apparatus and a request for purchasing a content; control, in response to the content purchase request, the transmission of the content purchase request to the second information processing apparatus; control the reception of the contents and its usage conditions from the second information processing apparatus; control the storing of the content and its usage conditions in association with the user identification data; and control the reception of the user identification data and a content transmission request from the first information processing apparatus, and control, in response to the transmission request, the transmission of the content stored in association with the user identification data. Consequently, the first information processing apparatus can use a desired content at desired places.

The information processing apparatus and method, the second program storage medium, and the second program according to the first aspect of the invention control the transmission, to a first information providing apparatus, of user identification data for identifying a user of the information processing apparatus and a request for purchasing a content to make the first information providing apparatus purchase the content from a second information providing apparatus and record the purchased content; control the transmission, to the first information providing apparatus, of a request for the content recorded in the first information providing apparatus in correlation with the user identification data; and control the reception of the content supplied from the first information providing apparatus. Consequently, the information processing apparatus can use a desired content at desired places.

In carrying out the invention according to a second aspect thereof, there is provided an information providing apparatus including: first reception control means for controlling the reception, from a first information processing apparatus, of user identification data for identifying a user of the first information processing apparatus and a request for purchasing a content; first transmission control means for controlling, in response to the request for purchasing the content, the transmission of the request for purchasing the content to a second information processing apparatus; second reception control means for controlling the reception of the content and usage conditions thereof sent from the second information processing apparatus; storage control means for controlling the storing of the content and usage conditions thereof in correspondence with the user identification data; and second transmission control means for controlling, if the content has been stored, the execution of the transmission of the content stored in correspondence with the user identification data.

The above-mentioned information providing apparatus according to the second aspect of the invention can be used as a manager server for example to be described later.

The above-mentioned first information processing apparatus can be used as a mobile telephone, a personal computer, or a PDA for example to be described later.

The above-mentioned second information processing apparatus can be used as a shop server for example to be described later.

Preferably, the above-mentioned second transmission control means controls the transmission of the content as checking out of the content.

Preferably, the above-mentioned second transmission control means controls the transmission of the content to the first information processing apparatus.

Preferably, the above-mentioned second transmission control means controls the transmission of the content as checking out of the content to the first information processing apparatus.

Preferably, the above-mentioned second transmission control means controls the transmission of the content to a storage medium which is detachably loaded in the first information processing apparatus.

Preferably, the above-mentioned second transmission control means controls the transmission of the content as checking out of the content to the storage medium.

An information providing method according to the second aspect of the invention, including the steps of: controlling the reception, from a first information processing apparatus, of user identification data for identifying a user of the first information processing apparatus and a request for purchasing a content; controlling, in response to the request for purchasing the content, the transmission of the request for purchasing the content to a second information processing apparatus; controlling the reception of the content and usage conditions thereof sent from the second information processing apparatus; controlling the storing of the content and usage conditions thereof in correspondence with the user identification data; and controlling, if the content has been stored, the execution of the transmission of the content stored in correspondence with the user identification data.

A first program storage medium according to the second aspect of the invention stores a computer-readable program, including the steps of: controlling the reception, from a first information processing apparatus, of user identification data for identifying a user of the first information processing apparatus and a request for purchasing a content; controlling, in response to the request for purchasing the content, the transmission of the request for purchasing the content to a second information processing apparatus; controlling the reception of the content and usage conditions thereof sent from the second information processing apparatus; controlling the storing of the content and usage conditions thereof in correspondence with the user identification data; and controlling, if the content has been stored, the execution of the transmission of the content stored in correspondence with the user identification data.

A first program according to the second aspect of the invention for instructs a computer to execute the steps of: controlling the reception, from a first information processing apparatus, of user identification data for identifying a user of the first information processing apparatus and a request for purchasing a content; controlling, in response to the request for purchasing the content, the transmission of the request for purchasing the content to a second information processing apparatus; controlling the reception of the content and usage conditions thereof sent from the second information processing apparatus; controlling the storing of the content and usage conditions thereof in correspondence with the user identification data; and controlling, if the content has been stored, the execution of the transmission of the content stored in correspondence with the user identification data.

An information processing apparatus according to the second aspect of the invention, including: transmission control means for controlling the transmission, to a first information providing apparatus, of user identification data for identifying a user of the information processing apparatus and a request for purchasing a content to make the first information providing apparatus purchase the content from a second information providing apparatus and record the purchased content; and reception control means for controlling, if the first information providing apparatus has recorded the purchased content, the reception of the content to be sent by the first information providing apparatus.

The information processing apparatus according to the second aspect of the invention can be used as a mobile telephone, a personal computer, or a PDA for example to be described later.

The above-mentioned first information providing apparatus can be used as a manager server for example to be described later.

The above-mentioned second information providing apparatus can be used as a shop server for example to be described later.

Preferably, the above-mentioned reception control means controls the reception of the checked out content.

Preferably, the above-mentioned information processing apparatus further includes storage control means for controlling the storing of the received content into an incorporated storage medium.

Preferably, the above-mentioned storage control means controls the storing of the checked out content into the incorporated storage medium.

Preferably, the above-mentioned information processing apparatus further includes storage control means for controlling the storing of the received content into a detachably loaded storage medium.

Preferably, the above-mentioned storage control means controls the storing of the checked out content into the detachably loaded storage medium.

An information processing method according to the second aspect of the invention, including the steps of: controlling the transmission, to a first information providing apparatus, of user identification data for identifying a user of the information processing apparatus and a request for purchasing a content to make the first information providing apparatus purchase the content from a second information providing apparatus and record the purchased content; and controlling, if the first information providing apparatus has recorded the purchased content, the reception of the content to be sent by the first information providing apparatus.

A second program storage medium according to the second aspect of the invention stores a computer-readable program including the steps of: controlling the transmission, to a first information providing apparatus, of user identification data for identifying a user of the information processing apparatus and a request for purchasing a content to make the first information providing apparatus purchase the content from a second information providing apparatus and record the purchased content; and controlling, if the first information providing apparatus has recorded the purchased content, the reception of the content to be sent by the first information providing apparatus.

A second program according to the second aspect of the invention instructs a computer to execute the steps of: controlling the transmission, to a first information providing apparatus, of user identification data for identifying a user of the information processing apparatus and a request for purchasing a content to make the first information providing apparatus purchase the content from a second information providing apparatus and record the purchased content; and controlling, if the first information providing apparatus has recorded the purchased content, the reception of the content to be sent by the first information providing apparatus.

The information providing apparatus and method, the first program storage medium, and the first program according to the second aspect of the invention control the reception, from the first information processing apparatus, user identification data for identifying a user of the first information processing apparatus and a request for purchasing a content; control, in response to the request for purchasing the content, the transmission of this request to the second information processing apparatus; control the reception of the content and its usage conditions from the second information processing apparatus; control the storing of the received content and its usage conditions in association with the user identification data; and control, when the content has been stored, the transmission of the content so as to transmit the content stored in association with the user identification data. Consequently, the first information processing apparatus can purchase a desired content at desired places and promptly use the purchased content.

The information processing apparatus and method, the second program storage medium, and the second program according to the second aspect of the invention control the transmission, to the first information providing apparatus, of the user identification data for identifying a user of the first information providing apparatus and a request for purchasing a content for purchasing the content from the second information providing apparatus and record the purchased content; and, when the first information providing apparatus has recorded the purchased content, control the reception of the content to be sent by the first information providing apparatus. Consequently, the information processing apparatus can purchase a desired content at desired places and promptly use the purchased content.

In carrying out the invention and according to a third aspect thereof, there is provided an information providing apparatus including: storage control means for controlling the storing of a first content, a second content, and usage conditions thereof in correspondence with user identification data for identifying a user of an information processing apparatus; reception control means for controlling the reception of a request for checking in of the first content and a request for checking out of the second content along with the user identification data sent from the information processing apparatus; check-in control means for controlling, in response to the check-in request, the checking in of the first content on the basis of the usage conditions stored in correspondence with the user identification data; and check-out control means for controlling, in response to the check-out request when the checking in of the first content has ended, the checking out of the second content on the basis of the usage conditions stored in correspondence with the user identification data.

The information providing apparatus according to the third aspect of the invention can be used as a manager server for example to be described later.

The above-mentioned information processing apparatus can be used as a mobile telephone, a personal computer, or a PDA for example to be described later.

Preferably, the above-mentioned check-in control means controls the checking in of the first content sent from the information processing apparatus.

Preferably, the above-mentioned check-in control means controls the checking in of the first content from a storage medium detachably loaded in the information processing apparatus.

Preferably, the above-mentioned check-out control means controls the checking out of the second content to the information processing apparatus.

Preferably, the above-mentioned check-out control means controls the checking out of the second content to a recording medium detachably loaded in the information processing apparatus.

An information providing method according to the third aspect of the invention, including the steps of: controlling the storing of a first content, a second content, and usage conditions thereof in correspondence with user identification data for identifying a user of an information processing apparatus; controlling the reception of a request for checking in of the first content and a request for checking out of the second content along with the user identification data sent from the information processing apparatus; controlling, in response to the check-in request, the checking in of the first content on the basis of the usage conditions stored in correspondence with the user identification data; and controlling, in response to the check-out request if the checking in of the first content has ended, the checking out of the second content on the basis of the usage conditions stored in correspondence with the user identification data.

A first program storage medium according to the third aspect of the invention stores a computer-readable program including the steps of: controlling the storing of a first content, a second content, and usage conditions thereof in correspondence with user identification data for identifying a user of an information processing apparatus; controlling the reception of a request for checking in of the first content and a request for checking out of the second content along with the user identification data sent from the information processing apparatus; controlling, in response to the check-in request, the checking in of the first content on the basis of the usage conditions stored in correspondence with the user identification data; and controlling, in response to the check-out request if the checking in of the first content has ended, the checking out of the second content on the basis of the usage conditions stored in correspondence with the user identification data.

A first program according to the third aspect of the invention for instructing a computer to execute the steps of: controlling the storing of a first content, a second content, and usage conditions thereof in correspondence with user identification data for identifying a user of an information processing apparatus; controlling the reception of a request for checking in of the first content and a request for checking out of the second content along with the user identification data sent from the information processing apparatus; controlling, in response to the check-in request, the checking in of the first content on the basis of the usage conditions stored in correspondence with the user identification data; and controlling, in response to the check-out request if the checking in of the first content has ended, the checking out of the second content on the basis of the usage conditions stored in correspondence with the user identification data.

An information processing apparatus according to the third aspect of the invention, including: transmission control means for controlling the transmission, to an information providing apparatus, of a request for checking in of a first content and a request for checking out of a second content; check-in control means for controlling checking in of the first content on the basis of controlling by the information providing apparatus; and check-out control means for controlling checking out of the second content supplied from the information providing apparatus when checking in of the first content has ended.

The information processing apparatus according to the third aspect of the invention can be used as a mobile telephone, a personal computer, or a PDA for example to be described later.

The above-mentioned information providing apparatus can be used as a manager server for example to be described later.

Preferably, the above-mentioned check-in control means controls checking in of the first content read from an incorporated storage medium.

Preferably, the above-mentioned check-in control means controls checking in of the first content read from a detachably loaded storage medium.

Preferably, the above-mentioned check-out control means controls checking out of the second content to an incorporated storage medium.

Preferably, the above-mentioned check-out control means controls checking out of the second content to a detachably loaded storage medium.

An information processing method according to the third aspect of the invention, including the steps of: controlling the transmission, to an information providing apparatus, of a request for checking in of a first content and a request for checking out of a second content; controlling checking in of the first content on the basis of controlling by the information providing apparatus; and controlling checking out of the second content supplied from the information providing apparatus when checking in of the first content has ended.

A second program storage medium according to the third aspect of the invention stores a computer-readable program including the steps of: controlling the transmission, to an information providing apparatus, of a request for checking in of a first content and a request for checking out of a second content; controlling checking in of the first content on the basis of controlling by the information providing apparatus; and controlling checking out of the second content supplied from the information providing apparatus when checking in of the first content has ended.

A second program according to the third aspect of the invention instructs a computer to execute the steps of: controlling the transmission, to an information providing apparatus, of a request for checking in of a first content and a request for checking out of a second content; controlling checking in of the first content on the basis of controlling by the information providing apparatus; and controlling checking out of the second content supplied from the information providing apparatus when checking in of the first content has ended.

The information providing apparatus and method, the first program storage medium, and the first program according to the third aspect of the invention control the storing of a first content, a second content, and usage conditions thereof in correspondence with user identification data for identifying a user of an information processing apparatus; control the reception of a request for checking in of the first content and a request for checking out of the second content along with the user identification data sent from the information processing apparatus; control, in response to the check-in request, the checking in of the first content on the basis of the usage conditions stored in correspondence with the user identification data; and control, in response to the check-out request if the checking in of the first content has ended, the checking out of the second content on the basis of the usage conditions stored in correspondence with the user identification data. Consequently, even if the information processing apparatus has only a relatively small free storage space, the information processing apparatus can use a desired content at desired places.

The information processing apparatus and method, the second program storage medium, and the second program according to the third aspect of the invention control the transmission, to an information providing apparatus, of a request for checking in of a first content and a request for checking out of a second content; control checking in of the first content on the basis of controlling by the information providing apparatus; and control checking out of the second content supplied from the information providing apparatus when checking in of the first content has ended. Consequently, even if the information processing apparatus has only a relatively small free storage space, the information processing apparatus can use a desired content at desired places.

In carrying out the invention and according to a fourth aspect thereof, there is provided an information providing apparatus including: first reception control means for controlling the reception, from a first information processing apparatus, of user identification data for identifying a user of the first information processing apparatus and a request for purchasing a content; first transmission control means for controlling in response to the request for purchasing the content the transmission of the request for purchasing the content to a second information processing apparatus; second reception control means for controlling the reception, from the second information processing apparatus, device identification information for identifying the second information processing apparatus and usage conditions of the content; storage control means for controlling the storing of the device identification information and the usage conditions in correspondence with the user identification data; and second transmission control means for controlling in response to a request from the first information processing apparatus the device identification information and the usage conditions recorded in correspondence with the user identification data to the first information processing apparatus.

The information providing apparatus according to the fourth aspect of the invention can be used as a manager server for example to be described later.

The above-mentioned first information processing apparatus can be used as a mobile telephone, a personal computer, or a PDA for example to be described later.

The above-mentioned second information processing apparatus can be used as a shop server for example to be described later.

An information providing method according to the fourth aspect of the invention, including the steps of: controlling the reception, from a first information processing apparatus, of user identification data for identifying a user of the first information processing apparatus and a request for purchasing a content; controlling in response to the request for purchasing the content the transmission of the request for purchasing the content to a second information processing apparatus; controlling the reception, from the second information processing apparatus, device identification information for identifying the second information processing apparatus and usage conditions of the content; controlling the storing of the device identification information and the usage conditions in correspondence with the user identification data; and controlling in response to a request from the first information processing apparatus the device identification information and the usage conditions recorded in correspondence with the user identification data to the first information processing apparatus.

A first program storage medium according to the fourth aspect of the invention stores a computer-readable program including the steps of: controlling the reception, from a first information processing apparatus, of user identification data for identifying a user of the first information processing apparatus and a request for purchasing a content; controlling in response to the request for purchasing the content the transmission of the request for purchasing the content to a second information processing apparatus; controlling the reception, from the second information processing apparatus, device identification information for identifying the second information processing apparatus and usage conditions of the content; controlling the storing of the device identification information and the usage conditions in correspondence with the user identification data; and controlling in response to a request from the first information processing apparatus the device identification information and the usage conditions recorded in correspondence with the user identification data to the first information processing apparatus.

A first program according to the fourth aspect of the invention instructs a computer to execute the steps of: controlling the reception, from a first information processing apparatus, of user identification data for identifying a user of the first information processing apparatus and a request for purchasing a content; controlling in response to the request for purchasing the content the transmission of the request for purchasing the content to a second information processing apparatus; controlling the reception, from the second information processing apparatus, device identification information for identifying the second information processing apparatus and usage conditions of the content; controlling the storing of the device identification information and the usage conditions in correspondence with the user identification data; and controlling in response to a request from the first information processing apparatus the device identification information and the usage conditions recorded in correspondence with the user identification data to the first information processing apparatus.

An information processing apparatus according to the fourth aspect of the invention, including: first reception control means for controlling the reception of device identification information for identifying an information providing apparatus for providing a content and usage conditions of the content; transmission control means for controlling, if the reproduction of the content is requested, the transmission of the request of the content to the information providing apparatus on the basis of the device identification information and the usage conditions; and second reception control means for controlling the reception of the content from the information providing apparatus.

The information processing apparatus according to the fourth aspect of the invention can be used as a mobile telephone, a personal computer, or a PDA for example to be described later.

The above-mentioned information providing apparatus can be used as a shop server for example to be described later.

Preferably, the above-mentioned second reception control means controls the reception from the information providing apparatus the content having a format corresponding to streaming reproduction.

An information processing method according to the fourth aspect of the invention, including the steps of: controlling the reception of device identification information for identifying an information providing apparatus for providing a content and usage conditions of the content; controlling, if the reproduction of the content is requested, the transmission of the request of the content to the information providing apparatus on the basis of the device identification information and the usage conditions; and controlling the reception of the content from the information providing apparatus.

A second program storage medium according to the fourth aspect of the invention stores a computer-readable program including the steps of: controlling the reception of device identification information for identifying an information providing apparatus for providing a content and usage conditions of the content; controlling, if the reproduction of the content is requested, the transmission of the request of the content to the information providing apparatus on the basis of the device identification information and the usage conditions; and controlling the reception of the content from the information providing apparatus.

A second program according to the fourth aspect of the invention instructs a computer to execute the steps of: controlling the reception of device identification information for identifying an information providing apparatus for providing a content and usage conditions of the content; controlling, if the reproduction of the content is requested, the transmission of the request of the content to the information providing apparatus on the basis of the device identification information and the usage conditions; and controlling the reception of the content from the information providing apparatus.

A second information providing apparatus according to the fourth aspect of the invention, including: first reception control means for controlling the reception, from a first information processing apparatus, of a request for purchasing a content; first transmission control means for controlling in response to the request for purchasing the content the transmission of device identification information for identifying the information providing apparatus and usage conditions of the content to the first information processing apparatus; second reception control means for controlling the reception of a request for the content from a second information processing apparatus; and second transmission control means for controlling in response to the request for the content the transmission of the content to the second information processing apparatus.

The second information providing apparatus according to the fourth aspect of the invention can be used as a shop server for example to be described later.

The above-mentioned first information processing apparatus can be used as a manager server for example to be described later.

The above-mentioned second information processing apparatus can be used as a mobile telephone, a personal computer, or a PDA for example to be described later.

Preferably, the above-mentioned second transmission control means controls the transmission, to the second information processing apparatus, of the content having a format corresponding to streaming reproduction.

A second information providing method according to the fourth aspect of the invention, including the steps of: controlling the reception, from a first information processing apparatus, of a request for purchasing a content; controlling in response to the request for purchasing the content the transmission of device identification information for identifying the information providing apparatus and usage conditions of the content to the first information processing apparatus; controlling the reception of a request for the content from a second information processing apparatus; and controlling in response to the request for the content the transmission of the content to the second information processing apparatus.

A third program storage medium according to the fourth aspect of the invention stores a computer-readable program including the steps of: controlling the reception, from a first information processing apparatus, of a request for purchasing a content; controlling in response to the request for purchasing the content the transmission of device identification information for identifying the information providing apparatus and usage conditions of the content to the first information processing apparatus; controlling the reception of a request for the content from a second information processing apparatus; and controlling in response to the request for the content the transmission of the content to the second information processing apparatus.

A third program according to the fourth aspect of the invention instructs a computer to execute the steps of: controlling the reception, from a first information processing apparatus, of a request for purchasing a content; controlling in response to the request for purchasing the content the transmission of device identification information for identifying the information providing apparatus and usage conditions of the content to the first information processing apparatus; controlling the reception of a request for the content from a second information processing apparatus; and controlling in response to the request for the content the transmission of the content to the second information processing apparatus.

An information providing system according to the fourth aspect of the invention, including a first information providing apparatus, an information processing apparatus, and a second information providing apparatus, the first information providing apparatus including: first reception control means for controlling the reception, from the information processing apparatus, user identification data for identifying a user of the information processing apparatus and a request for purchasing a content; first transmission control means for controlling in response to the request for purchasing the content the transmission of the request for purchasing the content to the second information providing apparatus; second reception control means for controlling the reception, from the second information providing apparatus, device identification information for identifying the second information providing apparatus and usage conditions of the content; storage control means for controlling the storing of the device identification information and the usage conditions in correspondence with the user identification data; and second transmission control means for controlling in response to a request from the information processing apparatus the transmission, to the information processing apparatus, the device identification information and the usage conditions stored in correspondence with the user identification data; the information processing apparatus including: third reception control means for controlling the reception of the device identification information and the usage conditions; third transmission control means for controlling, when reproduction of the content is requested, the transmission of the request for the content to the second information providing apparatus on the basis of the device identification information and the usage conditions; and fourth reception control means for controlling the reception of the content from the second information providing apparatus; and the second information providing apparatus including: fifth reception control means for controlling the reception of the request for purchasing the content from the first information providing apparatus; fourth transmission control means for controlling in response to the request for purchasing the content the transmission of the device identification information and the usage conditions to the first information providing apparatus; sixth reception control means for controlling the reception of a request for the content from the information processing apparatus; and fifth transmission control means for controlling in response to the request for the content the transmission of the content to the information processing apparatus.

The above-mentioned first information providing apparatus can be used as a manager server for example to be described later.

The above-mentioned information processing apparatus can be used as a mobile telephone, a personal computer, or a PDA for example to be described later.

The above-mentioned second information providing apparatus can be used as a shop server for example to be described later.

The first information providing apparatus and method, the first program storage medium, and the first program according to the fourth aspect of the invention control the reception, from a first information processing apparatus, of user identification data for identifying a user of the first information processing apparatus and a request for purchasing a content; control in response to the request for purchasing the content the transmission of the request for purchasing the content to a second information processing apparatus; control the reception, from the second information processing apparatus, device identification information for identifying the second information processing apparatus and usage conditions of the content; controlling the storing of the device identification information and the usage conditions in correspondence with the user identification data; and control in response to a request from the first information processing apparatus the device identification information and the usage conditions recorded in correspondence with the user identification data to the first information processing apparatus. Consequently, even if the first information processing apparatus has only a relatively small free storage space, the first information processing apparatus can purchase and use a desired content at desired places.

The information processing apparatus and method, the second program storage medium, and the second program according to the fourth aspect of the invention control the reception of device identification information for identifying an information providing apparatus for providing a content and usage conditions of the content; control, if the reproduction of the content is requested, the transmission of the request of the content to the information providing apparatus on the basis of the device identification information and the usage conditions; and control the reception of the content from the information providing apparatus. Consequently, even if the information processing apparatus has only a relatively small free storage space, the information processing apparatus can purchase and use a desired content at desired places.

The second information providing apparatus and method, the third program storage medium, and the third program according to the fourth aspect of the invention control the reception, from a first information processing apparatus, of a request for purchasing a content; control in response to the request for purchasing the content the transmission of device identification information for identifying the information providing apparatus and usage conditions of the content to the first information processing apparatus; control the reception of a request for the content from a second information processing apparatus; and control in response to the request for the content the transmission of the content to the second information processing apparatus. Consequently, even if the second information processing apparatus has only a relatively small free storage space, the second information processing apparatus can purchase and use a desired content at desired places.

The information providing system according to the fourth aspect of the invention controls the reception, from the information processing apparatus, user identification data for identifying a user of the information processing apparatus and a request for purchasing a content; controls in response to the request for purchasing the content the transmission of the request for purchasing the content to the second information providing apparatus; controls the reception, from the second information providing apparatus, device identification information for identifying the second information providing apparatus and usage conditions of the content; controls the storing of the device identification information and the usage conditions in correspondence with the user identification data; controls in response to a request from the information processing apparatus the transmission, to the information processing apparatus, the device identification information and the usage conditions stored in correspondence with the user identification data; controls the reception of the device identification information and the usage conditions; controls, when reproduction of the content is requested, the transmission of the request for the content to the second information providing apparatus on the basis of the device identification information and the usage conditions; controls the reception of the content from the second information providing apparatus; controls the reception of the request for purchasing the content from the first information providing apparatus; controls in response to the request for purchasing the content the transmission of the device identification information and the usage conditions to the first information providing apparatus; controls the reception of a request for the content from the information processing apparatus; and controls in response to the request for the content the transmission of the content to the information processing apparatus. Consequently, even if the information processing apparatus has only a relatively small free storage space, the information processing apparatus can purchase and use a desired content at desired places.

In carrying out the invention and according to a fifth aspect thereof, there is provided an information providing apparatus including: transmission control means for controlling the transmission of a content in response to a request from an information processing apparatus; reception control means for controlling, when the content has been transmitted, the reception, from the information processing apparatus, of information for identifying a transmission destination of the content; and storage control means for controlling the storing of the information for identifying the transmission destination of the content in correspondence with data for identifying the content.

The information providing apparatus according to the fifth aspect of the invention can be used as a manager server for example to be described later.

The information processing apparatus according to the fifth aspect of the invention can be used as a mobile telephone, a personal computer, or a PDA for example to be described later.

Preferably, the above-mentioned transmission control means controls the transmission of the content as checking out of the content and the reception control means controls the reception of the information for identifying a destination to which the content is checked out.

Preferably, the above-mentioned transmission control means controls the transmission of the content to the information processing apparatus and the reception control means controls the reception of the information for identifying the transmission destination of the content indicative of the information processing apparatus.

Preferably, the above-mentioned the transmission control means controls the transmission of the content as checking out of the content and the reception control means controls the reception of the information for identifying the destination to which the content is checked out.

Preferably, the above-mentioned transmission control means controls the transmission of the content to a storage medium detachably loaded in the information processing apparatus and the reception control means controls the reception of the information for identifying the transmission destination of the content, the information being indicative of the storage medium.

Preferably, the above-mentioned transmission control means controls the transmission of the content as checking out of the content and the reception control means controls the reception of the information for identifying a check-out destination of the content, the information being indicative of the storage medium.

A information providing method according to the fifth aspect of the invention including the steps of: controlling the transmission of a content in response to a request from an information processing apparatus; controlling, when the content has been transmitted, the reception, from the information processing apparatus, of information for identifying a transmission destination of the content; and controlling the storing of the information for identifying the transmission destination of the content in correspondence with data for identifying the content.

A first program storage medium according to the fifth aspect of the invention stores a computer-readable program including the steps of: controlling the transmission of content in response to a request from an information processing apparatus; controlling, when the content has been transmitted, the reception, from the information processing apparatus, of information for identifying a transmission destination of the content; and controlling the storing of the information for identifying the transmission destination of the content in correspondence with data for identifying the content.

A first program according to the fifth aspect of the invention instructs a computer to execute the steps of: controlling the transmission of a content in response to a request from an information processing apparatus; controlling, when the content has been transmitted, the reception, from the information processing apparatus, of information for identifying a transmission destination of the content; and controlling the storing of the information for identifying the transmission destination of the content in correspondence with data for identifying the content.

An information processing apparatus according to the fifth aspect of the invention, including: first transmission control means for controlling the transmission of a request for a content to an information providing apparatus; reception control means for controlling the reception of the content; and second transmission control means for controlling, when the content has been received, the transmission, to the information providing apparatus, of information for identifying a transmission destination of the content.

The information processing apparatus according to the fifth aspect of the invention can be used as a mobile telephone, a personal computer, or a PDA for example to be described later.

The above-mentioned information processing apparatus can be used as a manager server for example to be described later.

Preferably, the above-mentioned second transmission control means controls the transmission of the information for identifying the transmission destination of the content, the information being indicative of the information processing apparatus.

Preferably, the above-mentioned second transmission control means controls the transmission of the information for identifying the transmission destination of the content as a check-out destination of the content, the information being indicative of the information processing apparatus.

Preferably, the above-mentioned second transmission control means controls the transmission of the information for identifying a transmission destination of the content, the information being indicative of a detachably loaded storage medium.

Preferably, the above-mentioned second transmission control means controls the transmission of the information for identifying a transmission destination of the content as a check-out destination of the content, the information being indicative of the detachably loaded storage medium.

An information processing method according to the fifth aspect of the invention, including the steps of: controlling the transmission of a request for a content to an information providing apparatus; controlling the reception of the content; and controlling, when the content has been received, the transmission, to the information providing apparatus, of information for identifying a transmission destination of the content.

A second program storage medium according to the fifth aspect of the invention stores a computer-readable program including the steps of: controlling the transmission of a request for a content to an information providing apparatus; controlling the reception of the content; and controlling, when the content has been received, the transmission, to the information providing apparatus, of information for identifying a transmission destination of the content.

A second program according to the fifth aspect of the invention instructs a computer to execute the steps of: controlling the transmission of a request for a content to an information providing apparatus; controlling the reception of the content; and controlling, when the content has been received, the transmission, to the information providing apparatus, of information for identifying a transmission destination of the content.

The information providing apparatus and method, the first program storage medium, and the first program according to the fifth aspect of the invention control the transmission of a content in response to a request from an information processing apparatus; control, when the content has been transmitted, the reception, from the information processing apparatus, of information for identifying a transmission destination of the content; and control the storing of the information for identifying the transmission destination of the content in correspondence with data for identifying the content. Consequently, the user can promptly know to which destination apparatus particular content has been sent.

The information processing apparatus and method, the second program storage medium, and the second program according to the fifth aspect of the invention control the transmission of a request for a content to an information providing apparatus; control the reception of the content; and control, when the content has been received, the transmission, to the information providing apparatus, of information for identifying a transmission destination of the content. Consequently, the information providing apparatus can promptly know to which destination apparatus particular content has been sent.

BRIEF DESCRIPTION OF THE DRAWINGS

These and other objects of the invention will be seen by reference to the description, taken in connection with the accompanying drawing, in which:

FIG. 8 is a diagram illustrating an example of user management table;

FIG. 9 is a diagram illustrating an example of content management table;

FIG. 11 is a diagram illustrating an example of content management table;

FIG. 12 is a diagram illustrating another example of content management table;

FIG. 15 is a diagram illustrating still another example of content management table;

FIG. 16 is a diagram illustrating an exemplary display on display block;

FIG. 18 is a diagram illustrating an example of content management table;

FIG. 19 is a diagram illustrating another example of content management table;

FIG. 20 is a diagram illustrating still another example of content management table;

FIG. 22 is a diagram illustrating an example of content management table;

FIG. 29 is a diagram illustrating an example of content management table;

FIG. 35 is a diagram illustrating an example of content management table;

FIG. 36 is a flowchart describing a content purchase process;

DETAILED DESCRIPTION OF PREFERRED EMBODIMENTS

This invention will be described in further detail by way of example with reference to the accompanying drawings.

Figure 1:
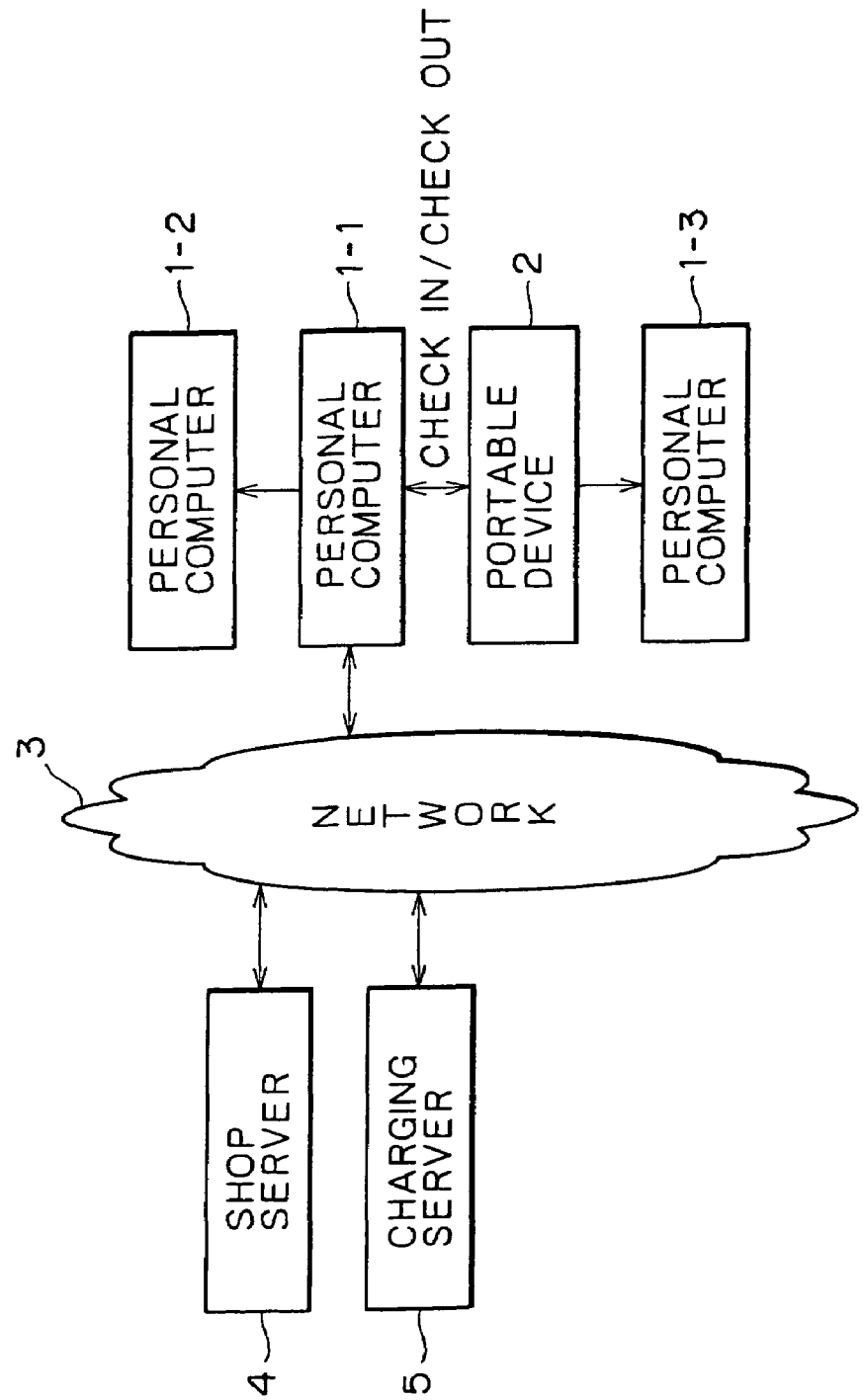
FIG. 1 is a diagram illustrating a configuration of a related-art digital data transmission system associated with the present invention.
Figure 2:
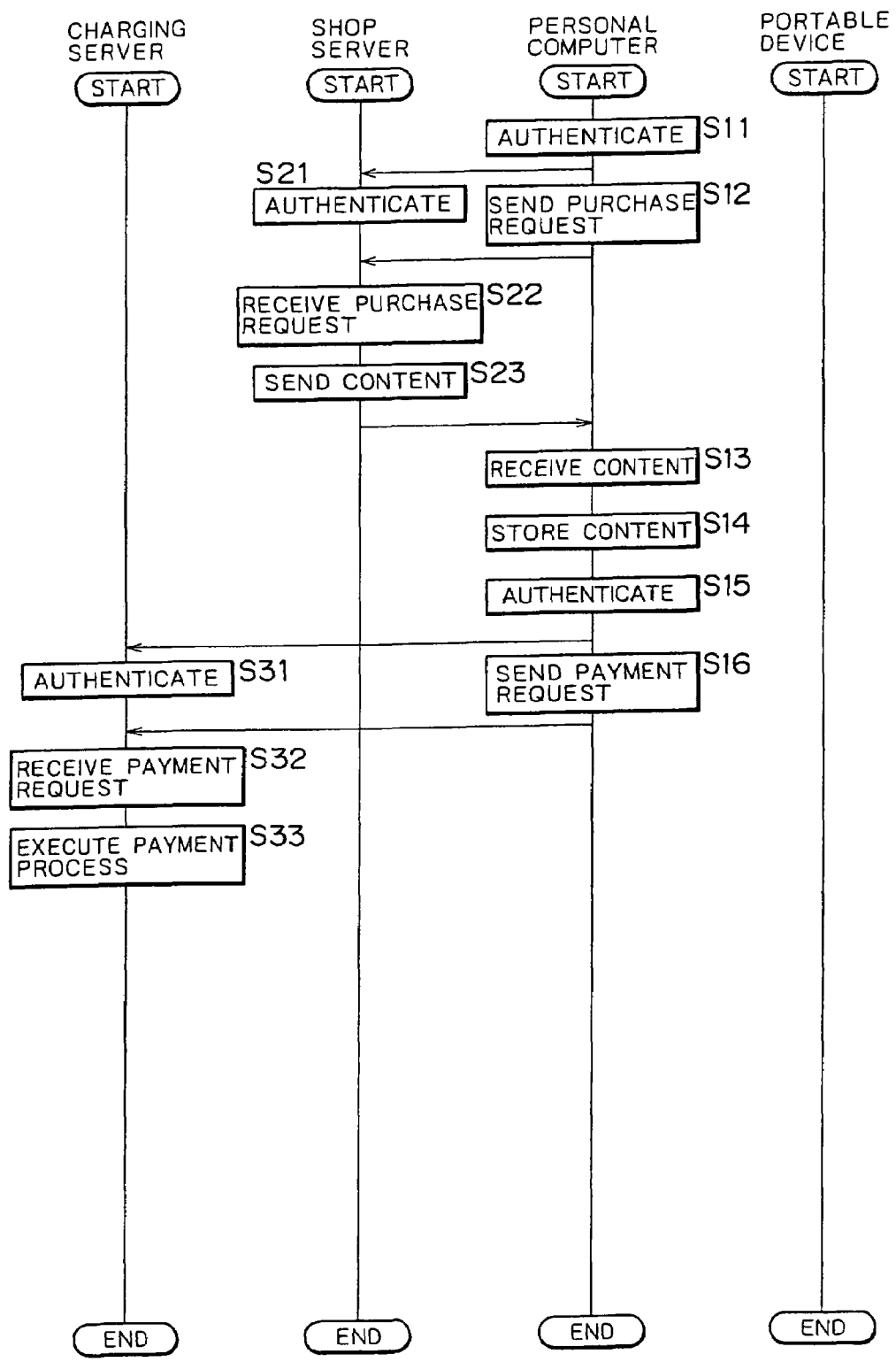
FIG. 2 is a flowchart describing a related-art content purchasing process.
Figure 3:
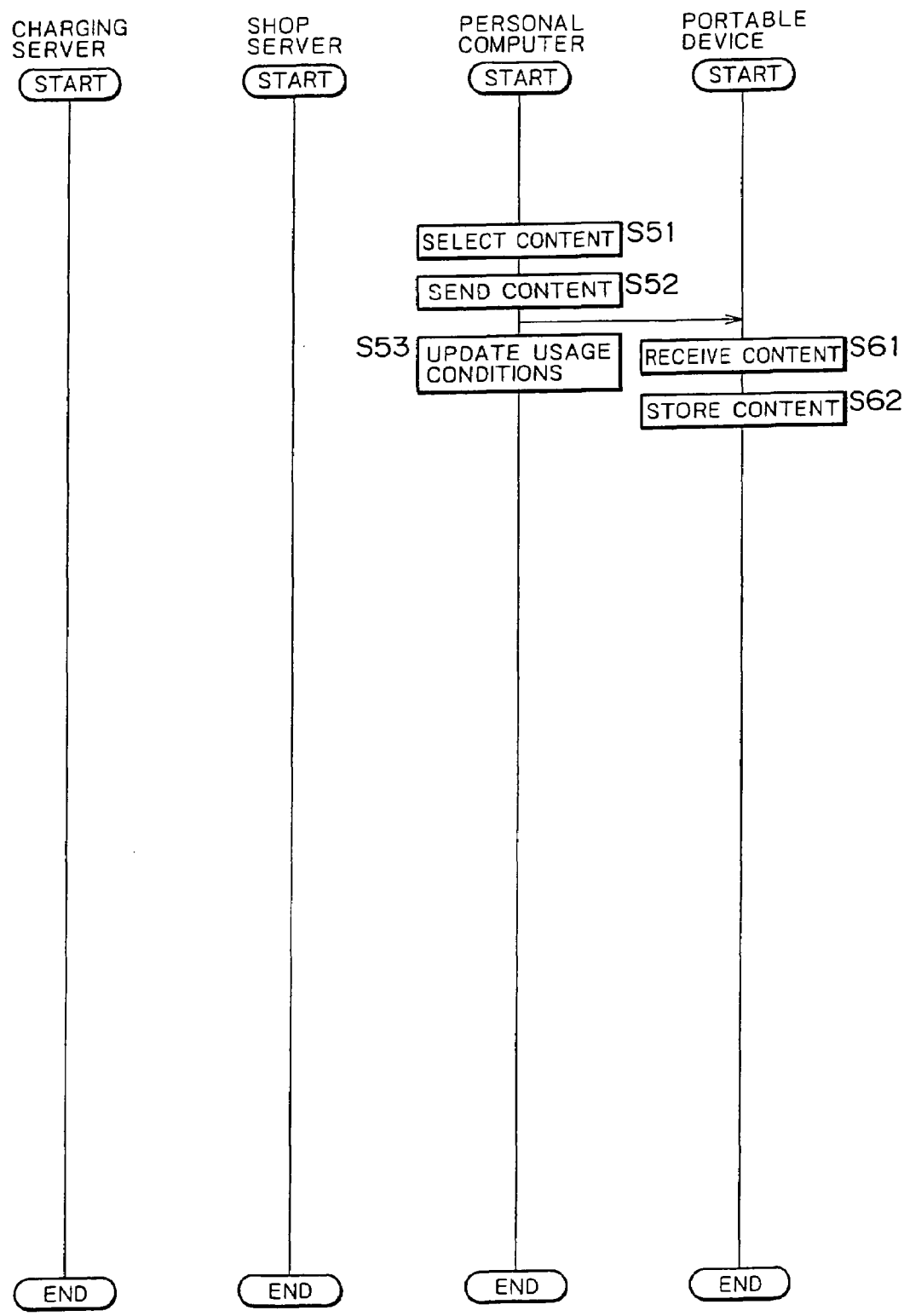
FIG. 3 is a flowchart describing a related-art content check-out process.
Figure 4:
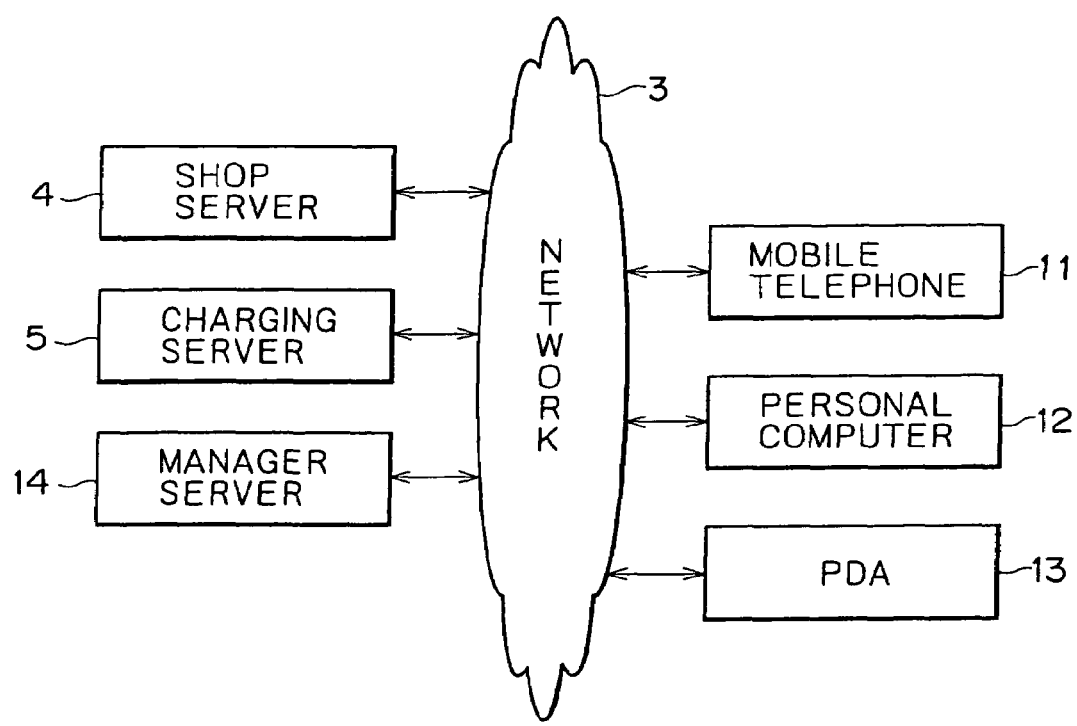
FIG. 4 is a diagram illustrating one embodiment of a digital data transmission system associated with the present invention.

Now referring to FIG. 4, there is shown a diagram illustrating one embodiment of a digital data transmission system associated with the present invention. With reference to FIG. 4, components similar to those previously described with reference to FIG. 1 are denoted by the same reference numerals and their descriptions will be skipped.

A mobile telephone 11 connects to the network 3 in a wireless manner. The mobile telephone 11 receives the content (compressed and encrypted in predetermined algorithms) received from a manager server 14 via the network 3 along with its usage conditions and content key and stores the received content, its usage conditions and content key.

On the basis of the usage conditions of the received content, the mobile telephone 11 reproduces the stored content and outputs the reproduced content to a headphone or speaker, not shown. The user, carrying about the mobile telephone 11, can receive a desired content from the manager server 14 and store the received content in the mobile telephone. The user can reproduce the stored content by the mobile telephone 11 and listen to the music for example corresponding to the reproduced content through the headphone for example.

The mobile telephone displays the data associated with the content (for example, a music title or usage conditions) and executes the processing corresponding to inputted download instructions for example.

A program (to be described later with reference to FIG. 7 for example) of the mobile telephone 11 is constituted by a module group which, in order to prevent the infringement of the copyright of a content by its noncompliant secondary usage, controls the permission of the use of individual contents only when the usage conditions specified by the copyright holder of each content are satisfied. The usage conditions include content's reproduction conditions, duplication conditions, movement conditions, and accumulation conditions for example.

The program of the mobile telephone 11 adds the usage conditions and content key specified by the shop server 4 in a safe method to the content (encrypted) and stores them in an internal memory for example of the mobile telephone 11.

A personal computer 12 is connected to the network 3. The personal computer 12 converts in a predetermined compression scheme the content and its key received from the manager server 14 or the content read from a CD, not shown, and its key generated at that time and encrypts them in a predetermined encryption scheme such as DES, recording the resultant content and its key. The personal computer 12 records the usage conditions for the recorded content.

A program, not shown, of the personal computer 12 displays data (for example, a music title or usage conditions) associated with the content and executes processing such as downloading or check-out specified by the user.

The program of the personal computer 12 is constituted by a module group which, in order to prevent the infringement of the copyright of a content by its noncompliant secondary usage, controls the permission of the use of individual contents only when the usage conditions specified by the copyright holder of each content are satisfied. The usage conditions include content's reproduction conditions, duplication conditions, movement conditions, and accumulation conditions for example.

The program of the personal computer 12 executes the processing of moving a content in a safe method, for example. AS the content is moved, the program of the personal computer 12 generates a necessary key and manages it, encrypts the content, or controls the communication with the connected devices.

A PDA (Personal Digital Assistant) 13 is generally the same in functionality as the personal computer 12 and therefore its description will be skipped.

The manager server 14 cross-authenticates the shop server 4 in response to a content purchase request from the cross-authenticated mobile telephone 11, personal computer 12, or PDA 13, receives the requested content from the cross-authenticated shop server 4 along with the content's usage conditions and a content key, and stores the received content, its content key and usage conditions as related to the user ID for identifying the user of the mobile telephone 11, the personal computer 12, or the PDA 13.

Upon reception of the content requested from the mobile telephone 11, the personal computer 12, or the PDA 13, the manager server 14 cross-authenticates the charging server 5 and sends a payment request of the received content to the charging server 5.

Upon cross-authentication with the manager server 14, the charging server 5 executes payment processing in response to the request from the manager server 4, by use of the credit card number for example of the user of the mobile telephone 11, the personal computer 12, or the PDA 13.

The mobile telephone 11, the personal computer 12, and the PDA 13 can make the manager server 14 download a desired content and process the charging only by sending a content purchase request to the cross-authenticated manager server 14.

The user of the mobile telephone 11, the personal computer 12, or the PDA 13 makes the manager server 14 move, copy, or check out the downloaded content to the mobile telephone 11, the personal computer 12, or the PDA 13. In what follows, the check-out operation will be described typically. The mobile telephone 11, the personal computer 12, or the PDA 13 can reproduce the checked out content in accordance with its usage conditions.

Figure 5:
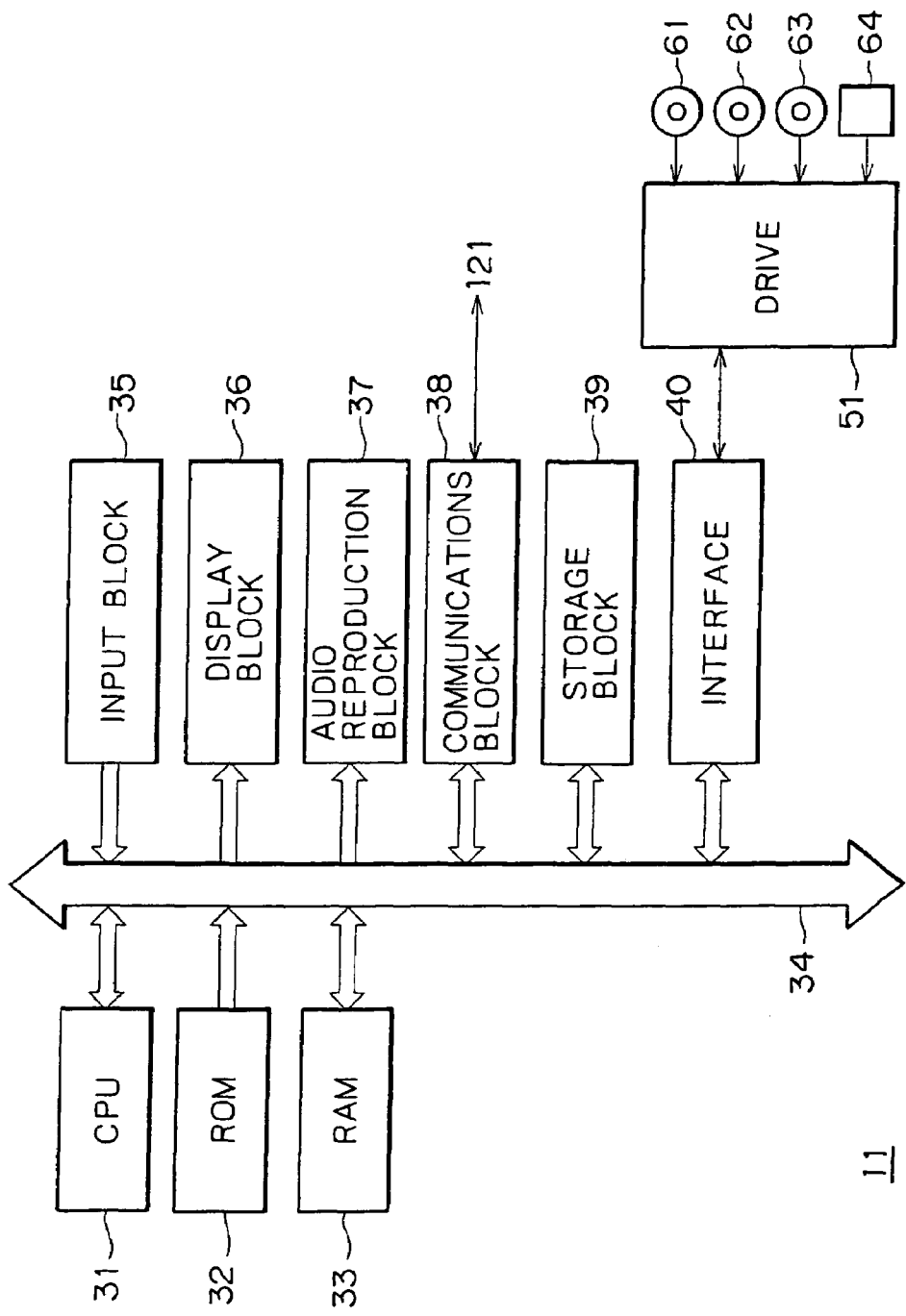
FIG. 5 is a block diagram illustrating a configuration of a mobile telephone.

FIG. 5 is a block diagram illustrating a configuration of the mobile telephone 11. A CPU (Central Processing Unit) 31 actually executes programs stored in a ROM (Read Only Memory) 32 or a RAM (Random Access Memory) 33. The ROM 32, constituted by an EEPROM (Electrically Erasable Programmable Read Only Memory) or a flash memory, generally stores programs and basically fixed data of computational parameters to be used by the CPU 31. The RAM 33, constituted by an SRAM (Static RAM) for example, stores programs to be used by the CPU 31 in its execution and parameters which changes from time to time in the execution.

An input block 35, constituted by an input key or a microphone, is operated by the user when inputting commands into the CPU 31 or inputting a voice. A display block 36, constituted by a liquid crystal display device, displays various kinds of information in the form of text or image.

An audio reproduction block 37 reproduces the audio data of the other party supplied from a communications block 38 or the content supplied from a storage block 39 and outputs the reproduced audio signal.

The communications block 38 connects to the network 3 via a public line network 121 (to be described later with reference to FIG. 7) and stores in predetermined packets the data supplied from the CPU 31 (for example, a content check-out request) or the audio data of the user supplied from the input block and sends the packets via the public line network 121 and the network 3. Also, the communications block 38 outputs the data stored in received packets (for example, contents) or the audio data of the other party received via the public line network 121 and the network 3 to the CPU 31, the RAM 33, the audio reproduction block 37, or the storage block 39.

The storage block 39, constituted by a flash memory, stores the content supplied from the communications block 38 along with its usage conditions and content key and reads the data such as contents, its content key and usage conditions, supplying them to the CPU 31, the RAM 33, or the audio reproduction block 37.

An interface 40 is connected to an externally attached drive 51. The drive 51 reads data or programs from a magnetic disc 61, an optical disc (including a CD-ROM) 62, a magneto-optical disc 63, or a semiconductor memory 64, which is loaded in the drive 51, and supplies the data or programs to the ROM 32 or the RAM 33 via the interface 40 and a bus 34.

The components CPU 31 through the interface 40 are interconnected via the bus 34.

The personal computer 12 and the PDA 13 are generally the same in configuration as the mobile telephone 11 and therefore their descriptions will be skipped.

Figure 6:
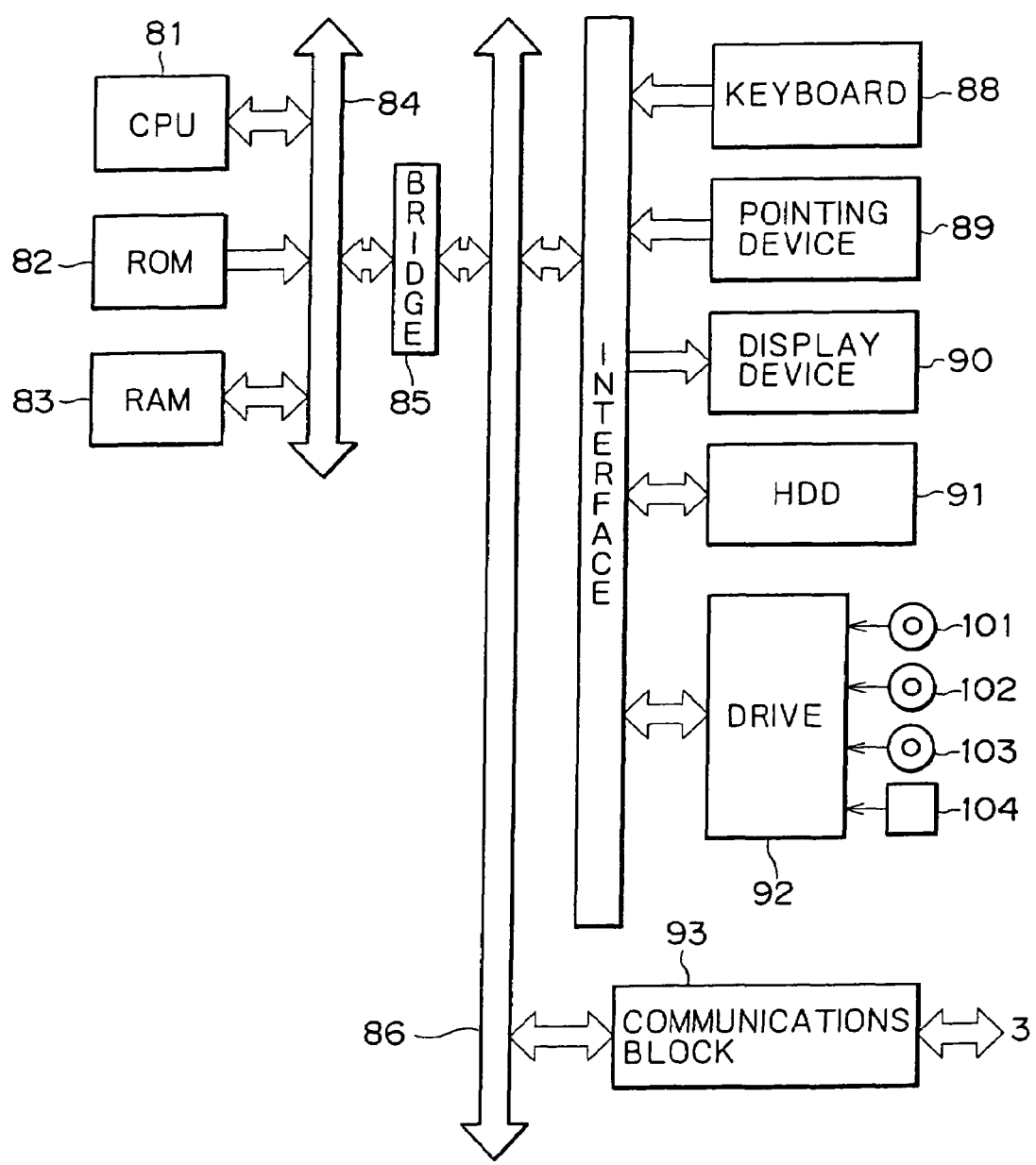
FIG. 6 is a block diagram illustrating a configuration of a manager server.

FIG. 6 is a block diagram illustrating a configuration of the manager server 14. A CPU 81 actually executes application programs (their details will be described later) and an OS (Operating System). A ROM 82 generally stores programs and basically fixed data of computational parameters to be used by the CPU 81. A RAM 83 stores programs to be used by the CPU 81 in its execution and parameters which changes from time to time in the execution. These components are interconnected by a host bus 84 constituted by a CPU for example.

The host bus 84 is connected to an external bus 86, which is a PCI (Peripheral Component Interconnect/Interface), via a bridge 85.

A keyboard 88 is operated by the user when inputting commands into the CPU 81. A pointing device 89 is operated by the user when executing pointing and selecting operations on the screen of a display device 90. The display device 90, constituted by a liquid crystal display device or a CRT (Cathode Ray Tube), shows various kinds of information in the form of text or image. A HDD (Hard Disc Drive) 91 drives a hard disc to record programs and information to be used by the CPU 81 and reproduce the recorded information.

A drive 92 reads data or programs stored on a magnetic disc 101, an optical disc 102, a magneto-optical disc 103, or a semiconductor memory 104, which is loaded in the drive 92, and supplies the data or programs to the RAM 83 via an interface 87, an external bus 86, a bridge 85, and the host bus 84.

These components, the keyboard 88 through the drive 92, are connected to the interface 87, which is connected to the CPU 81 via the external bus 86, the bridge 85, and the host bus 84.

A communications block 93, connected to the network 3, stores data (for example, contents) supplied from the CPU 81 or the HDD 91 into predetermined packets and send the data over the network 3 and, at the same time, outputs the data (for example, contents) stored in received packets over the network 3 to the CPU 81, the RAM 83, or the HDD 91.

The communications block 93 is connected to the CPU 81 via the external bus 86, the bridge 85, and the host bus 84.

The shop server 4 and the charging server 5 are generally the same in configuration as the manger server 14 and therefore their descriptions will be skipped.

Figure 7:
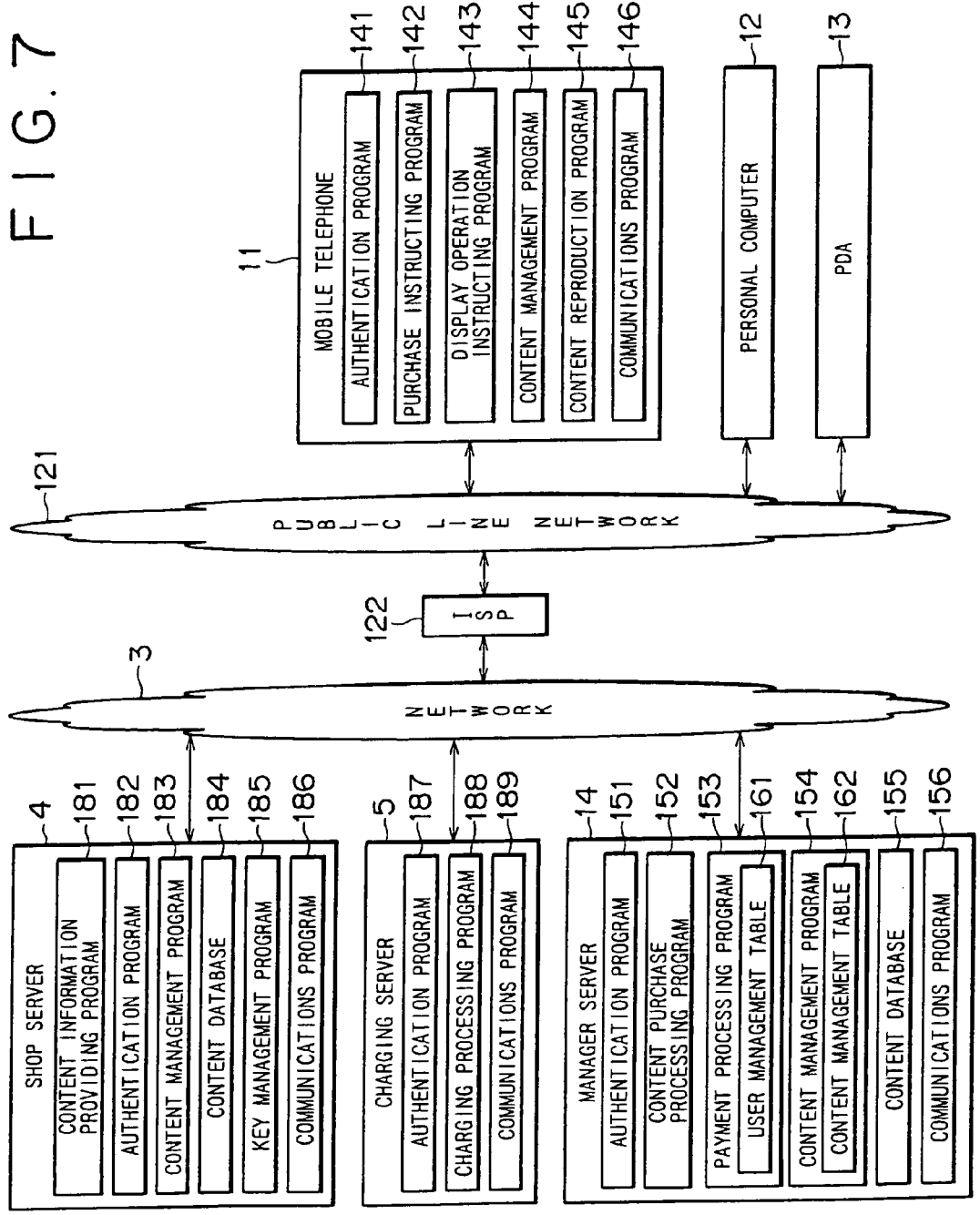
FIG. 7 is a block diagram illustrating an exemplary configuration of a first capability of a digital data transmission system according to the invention.

The following describes an exemplary configuration of a first capability of the digital data transmission system associated with the present invention with reference to FIG. 7.

The mobile telephone 11 executes an authentication program 141, a purchase instructing program 142, a display operation instructing program 143, a content management program 144, a content reproduction program 145, and communications program 146.

The authentication program 141 authenticates the manager server 14 or the shop server 4 via the public line network 121 and the network 3. The authentication program 141 may authenticate the user by use of the input block 35.

The purchase instructing program 142 sends a request for purchasing a content to the manager server 14 via the public line network 121 and the network 3. This request includes the user ID, the device ID, the content ID of the requested content, and the processing requirements (check-out, move, copy, or null) after the downloading.

The display operation instructing program 143 receives, via the public line network 121 and the network 3, the data (for example, a music title or usage conditions) associated with the content stored in the manager server 14 in relation to the user ID of the user of the mobile telephone 11 and displays the received data onto the display block 36.

The display operation instructing program 143 reads the data (for example, a music title or usage conditions) associated with the content stored in the storage block 39 and displays the data onto the display block 36.

When a check-out for example is instructed from the input block 35 by the user, the display operation instructing program 143 makes the content management program 144 execute a check-out operation. When content reproduction is instructed from the input block 35 by the user, the display operation instructing program 143 makes the content reproduction program 145 reproduce the content (stored in the storage block 39) on the basis of the management of content usage based on the usage conditions executed by the content management program 144.

The content management program 144 manages the use of a content on the basis of the content usage conditions and requests the manager server 14 for content check-out or check-in.

On the basis of content usage conditions, the content management program 144 manages the permission or prohibition of the reproduction of the content stored in the storage block 39 and, when the content stored in the storage block 39 has been reproduced, updates its usage conditions.

When the content management program 144 has requested the manager server 14 for the check-out of a particular content, the content management program 144 receives the content, its content key and usage conditions from the manager server 14 and stores the received content in the storage block 39 as related to its content key and usage conditions.

The content management program 144, when it has requested the manager server 14 for the checking in of a particular content, deletes the content of which check-in has been requested, its content key and usage conditions from the storage block 39.

When the reproduction of a content is permitted by the content management program 144, the content reproduction program 145 decrypts the content stored in the storage block 39 and makes the audio reproduction block 37 to output a voice representing the content.

The communications program 146 is a program for establishing a connection to an ISP (Internet Service Provider) 122 via the public line network 121 such as a PHS (Personal Handyphone System) or an IMT (International Mobile Telecommunication System). The communications program 146 includes protocols such as IP (Internet Protocol), HTTP (HyperText Transport Protocol) and WAP (Wireless Access Protocol) and makes communication with the shop server 4, the charging server 5, and the manager server 14 via the network 3.

When the programs, the authentication program 141 through the content management program 144, request the manager server 14 for a content purchase or a content check-out via the public line network 121 and the network 3, the programs, the authentication program 141 through the content management program 144, make the communications program 146 send the data associated with the content purchase request or content check-out request and receive the data sent from the manager server 14.

The personal computer 11 and the PDA 13 are generally the same in configuration as the mobile telephone 11 and therefore their descriptions will be skipped.

The manager server 14 executes an authentication program 151, a content purchase processing program 152, a payment processing program 153, a content management program 154, a content database 155, and a communications program 156.

The authentication program 151 is a program for authenticating the mobile telephone 11, the personal computer 12, the PDA 13, the shop server 4, or the charging server 5.

When a content purchase request has been made from the mobile telephone 11, the personal computer 12, or the PDA 13, the content purchase processing program 152 executes a process for purchasing the requested content from the shop server 4.

In response to the content purchase request from the mobile telephone 11, the personal computer 12, or the PDA 13, the content purchase processing program 152 sends the request to the shop server 4. When the content, its content key and usage conditions are supplied from the shop server 4, the content purchase processing program 152 receives them and stores them in the content database 155.

When the content has been purchased, the payment processing program 153 sends a payment request to the charging server 5 via the network 3 on the basis of the data listed in a user management table 161. The content purchase processing program 152 instructs the content management program 154 to execute the processing in accordance with the processing request after downloading included in the content purchase request. The request sent from the payment processing program 153 to the charging server 5 includes the name, credit card number, and address for example of the user who purchased the content.

The user management table 161 lists credit card numbers, names, addresses, electronic mail addresses, and users' device IDs as shown in FIG. 8 for example as related to the user IDs identifying the users of the mobile telephone 11, the personal computer 12, and the PDA 13.

For example, in the user management table 161 shown in FIG. 8 as an example, the credit card number of the user whose ID is "AAA" is "i i i i," the name of the user whose user ID is "AAA" is "a i u," the address of the user whose ID is "AAA" is "i ro ha," the electronic mail address of the user whose ID is "AAA" is "abc," and the IDs of devices to be used by the user whose ID is "AAA" are "X789" and "Z213."

The credit card number of the user whose ID is "BBB" is "ro ro ro ro," the name of the user whose ID is "BBB" is "ka ki ku," the address of the user whose ID is "BBB" is "ni ho he," the electronic mail address of the user whose ID is "BBB" is "def," and the IDs of devices to be used by the user whose ID is "BBB" are "Y654" and "W423."

When the content database 155 has stored the purchased content, its content key and usage conditions, the content management program 154 stores the content ID and usage conditions of the purchased content into a content management table 162 as related to the user ID of the user who purchased the content.

The content management table 162 lists content IDs, usage conditions (for example, the number of times check-out is permitted), and device IDs as related to the user IDs for identifying the users of the mobile telephone 11, the personal computer 12, and the PDA 13 as shown in FIG. 9 for example.

The permitted check-out count shown in the content management table 162 shown in FIG. 9 denotes the number of times the corresponding content can be checked out. The device ID denotes the ID of a device (for example, the mobile telephone 11, the personal computer 12, or the PDA 13) which has checked out that content.

For example, in the example shown in FIG. 9, the ID of the user who purchased the content of which ID is "A123" is "AAA," the permitted check-out count of the content of which ID is "A123" is 2 (denoting that this content can be checked out 2 more times), and the device ID of the device to which the content of which ID is "A123" has been checked out is "789" (for example, the mobile telephone 11).

The ID of the user who has purchased the content of which ID is "D666" is "BBB," the permitted check-out count of the content of which ID is "D6661" is 2, and the ID of the device to which the content of which ID is "D666" has been checked out is "Y654" (for example, the personal computer 12).

When a check-out request (accompanied by content ID and device ID) comes from the mobile telephone 11, the personal computer 12, the PDA 13, or the content purchase processing program 152, the content management program 154 determines, on the basis of the data listed in the content management table 162, whether this request is from the user who has purchased this content. If the request is found from that user, the content management program 154 further determines whether the permitted check-out count for that content is 1 or more.

If the permitted check-out count is found 1 or more, the content management program 154 reads the content corresponding to the content ID and its content key and usage conditions from the content database 155 and send them via the network to the mobile telephone 11, the personal computer 12, or the PDA 13 which requested for the check-out.

If the request is found not from the user who purchased that content or the check-out count of that content is found 1 or more, the content management program 154 does not send the content.

It should be noted that the mobile telephone 11, the personal computer 12, or the PDA 13 may attach the content ID and the user ID to each check-out request and send it to the manager server 14. In this case, the manager server 14 selects the content corresponding to the attached content ID and user ID and sends the selected content.

When the requested content has been sent to the mobile telephone 11, the personal computer 12, or the PDA 13, the content management program 154 decrements by 1 the check-out count of that content listed in the content management table 162 and stores the device ID of the device to which the content has been sent into the content management table 162.

When a content check-in request comes from the mobile telephone 11, the personal computer 12, or the PDA 13, the content management program 154 increments by 1 the check-out count of the content to be checked in listed in the content management table 162 on the basis of the content ID and device ID attached to the request and deletes the device ID corresponding to the content ID from the content management table 162.

When the content has been purchased, the content database 155 stores the content supplied from the shop server 4 as related to its content key and usage conditions. When requested by the content management program 154 for the reading involved in the content check-out, the content database 155 supplies the requested content and its content key and usage conditions to the content management program 154.

When requested by the content management program 154 for updating the usage conditions due to the content check-in, the content database 155 updates the usage conditions of the content corresponding to the request.

The communications program 156 includes the protocols such as IP, HTTP, and WAP and makes communication with the shop server 4, the charging server 5, the mobile telephone 11, the personal computer 12, and the PDA 13 via the network 3.

The shop server 4 executes a content information providing program 181, an authentication program 182, a content management program 183, a content database 184, a key management program 185, and a communications program 186.

When requested by the mobile telephone 11, the personal computer 12, or the PDA 13 for the provision of content information, the content information providing program 181 supplies the content information (such as music title, artist name, corresponding image, play duration, and price) to the requesting mobile telephone 11, personal computer 12, or PDA 13 via the network 3.

The authentication program 182 authenticates the manager server 14.

When requested by the manager server 14 for the purchase of a content, the content management program 183 reads the requested content and its usage conditions from the content database 184 and its content key from the key management program 185 and sends the content and its content key and usage conditions to the manager server 14 via the network 3.

The content database 184 stores the content as related to its usage conditions and, in response to a read request from the content management program 183, supplies the content and its usage conditions to the content management program 183.

The key management program 185 generates a content key for decoding the content stored in the content database 184 and stores the generated content key. When requested by the content management program 183 for the content key, the key management program 185 supplies the requested content key to the content management program 183.

The communications program 186 includes the protocols such as IP, HTTP, and WAP and makes communication with the manager server 14 via the network 3.

The charging server 5 executes an authentication program 187, a charging processing program 188, and a communications program 189. The authentication program 187 authenticates the manager server 14.

The charging processing program 188, upon request from the manager server 14 for a payment, executes the payment processing by use of the credit card number for example of the user corresponding to that payment request.

The communications program 189 includes the protocols such as IP, HTTP, and WAP and makes communication with the manager server 14 via the network 3.

Figure 10:
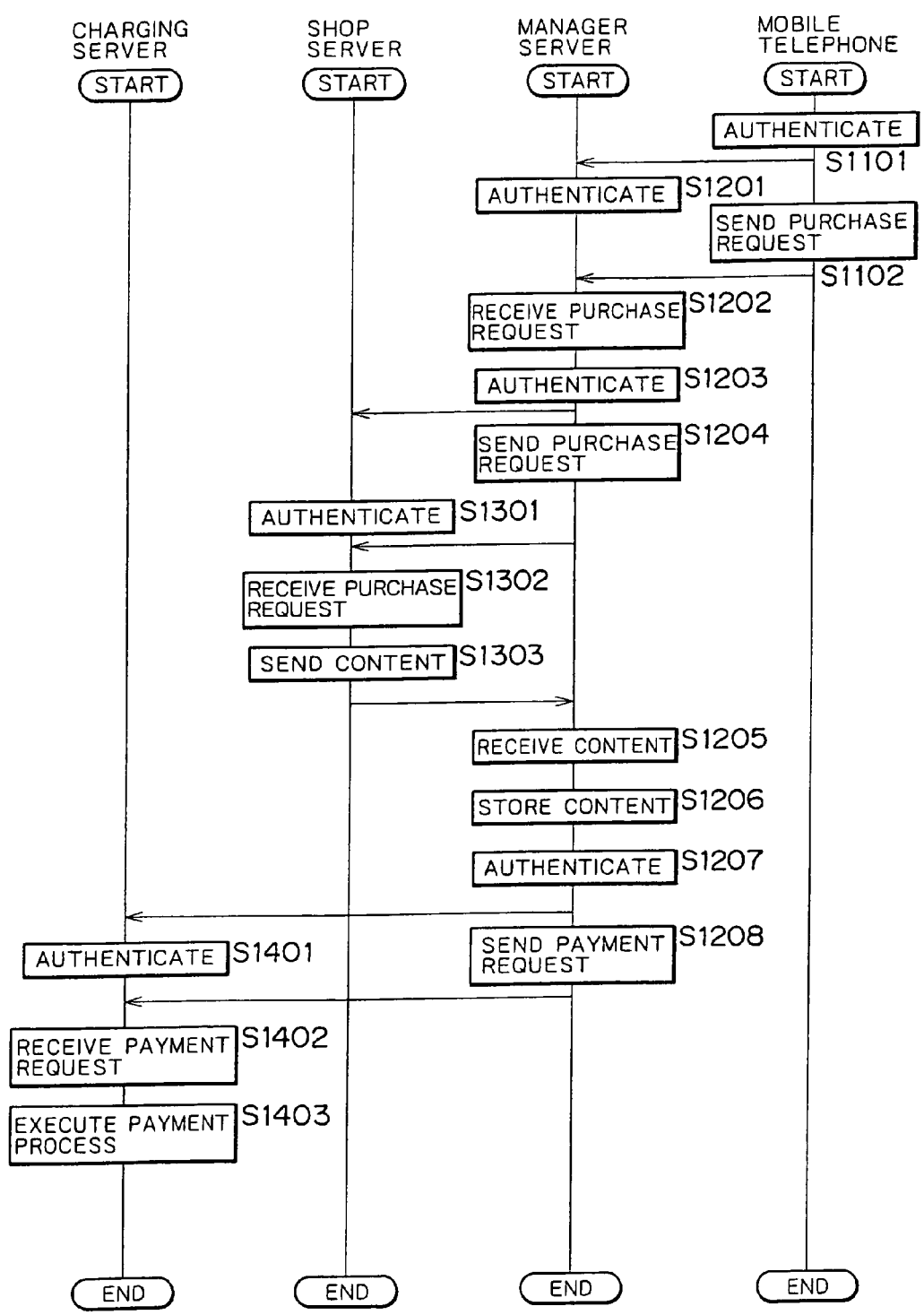
FIG. 10 is a flowchart describing a content purchasing process.

The following describes content purchase processing with reference to the flowchart shown in FIG. 10. In step S1101, the authentication program 141 of the mobile telephone 11 authenticates the user by use of the input block 35 and authenticates the manager server 14 via the network 3. In step S1201, the authentication program 151 of the manager server 14 authenticates the mobile telephone 11.

The manager server 14 stores the master key KMK in advance and the mobile telephone 11 stores the private key KPT and the ID of the mobile telephone 11 in advance. The mobile telephone 11 further stores the master key KMK in advance and the manager server 14 also stores the ID of the manager server 14 and its private key KPK.

The manager server 14 receives the ID of the mobile telephone 11 therefrom and applies a hash function to the received ID and the masker key KMK of the manager server 14 to generate a same key as the private key KPT of the mobile telephone 11.

The mobile telephone 11 receives the ID of the manager server 14 therefrom and applies a hash function to the received ID and the master key KMK of the mobile telephone 11 to generate a same key as the private key KPK of the manager server 14. Consequently, the common private keys are held in both the mobile telephone 11 and the manager server 14. By use of these private keys, a temporary key is generated.

In step S1102, the purchase instructing program 142 of the mobile telephone 11 sends a content purchase request to the manager server 14 via the network 3 along with the content ID of the content to be purchased and the device ID of the mobile telephone 11, the user ID, and the processing request after downloading. In step S1202, the content purchase processing program 152 of the manager server 14 receives the content purchase request from the mobile telephone 11.

In step S1203, the authentication program 151 of the manager server 14 authenticates the shop server 4. In step S1301, the authentication program 182 of the shop server 4 authenticates the manager server 14. The processes to be executed in steps S1203 and S1301 are the same as those of steps S1101 and S1201.

In step S1204, the content purchase processing program 152 of the manager server 14 sends a content purchase request to the shop server 4 along with the content ID of the content to be purchased. In step S1302, the content management program 183 of the shop server 4 receives the content purchase request from the manager server 14.

In step S1303, the content management program 183 of the shop server 4 reads the content (encrypted) corresponding to the content ID received in step S1302 and its usage conditions from the content database 184, makes the key management program 185 supply the content key corresponding to this content, and sends the content and its usage conditions to the manager server 14. The content management program 183 encrypts the content key with the temporary key generated in the authentication processing and sends the encrypted content key to the manager server 14.

In step S1205, the content purchase processing program 152 of the manager server 14 receives the content and its usage conditions and content key supplied from the shop server 4. The content purchase processing program 152 decrypts the content key by the temporary key generated in the authentication processing.

When requested for a content purchase from the mobile telephone 11, the personal computer 12, and the PDA 13 at the same time, the manager server 14 executes the processes of steps S1204 and S1205 at the same time. The manager server 14 determines to which of the mobile telephone 11, the personal computer 12, and the PDA 13, each of the processes of steps S1204 and S1205 corresponds, by means of the port numbers of these devices for example.

In step S1206, the content purchase processing program 152 stores the content and its content key and usage conditions into the content database 155.

On the basis of the content ID corresponding to the content stored in the content database 155 and the device ID obtained in step S1202, the content purchase processing program 152 makes the content management program 154 store the user ID and usage conditions (for example, permitted check-out count) obtained by referencing the user management table 161 into the content management table 162.

If the content management table 162 is in the state shown in FIG. 11 before the execution of the content purchase processing, for example, if the user of the mobile telephone 11 has purchased a content of which ID is "B456," user ID "AAA" of the user of the mobile telephone 11 is stored in the content management table 162 as related to content ID "B456" as shown in FIG. 12. The newly purchased content has not yet been checked out, so that the device ID corresponding to content ID "B456" is null.

In step S1207, the authentication program 151 of the manager server 14 authenticates the charging server 5. In step S1401, the authentication program 187 of the charging server 5 authenticates the manager server 14. The authentication processes in steps S1207 and S1401 are the same as those of steps S1101 and S1201.

In step S1208, the payment processing program 153 of the manager server 14 sends a payment request to the charging server 5 via the network 3. The payment request includes the credit card number for example of the user of the mobile telephone 11 obtained by referencing the user management table 161 on the basis of the device ID obtained in step S1202. The payment request is encrypted with the temporary key generated in the authentication processing. In step S1402, the charging processing program 188 of the charging server 5 receives the payment request sent by the manager server 14. In step S1403, the charging processing program 188 of the charging server 5 executes the process of the payment to a corresponding credit card company on the basis of the payment request received in step S1402. The content purchase processing comes to an end if the processing request after downloading included in the content request is null.

Thus, receiving the content purchase request from the mobile telephone 11, the manager server 14 purchases the requested content from the shop server 4, records the purchased content, and requests the charging server 5 for its payment.

It should be noted that the purchase instructing program 142 of the mobile telephone 11 may send, via the network 3, the content purchase request to the manager server 14 in step S1102 along with the content ID corresponding to the content to be purchased and the user ID of the user of the mobile telephone 11.

Figure 13:
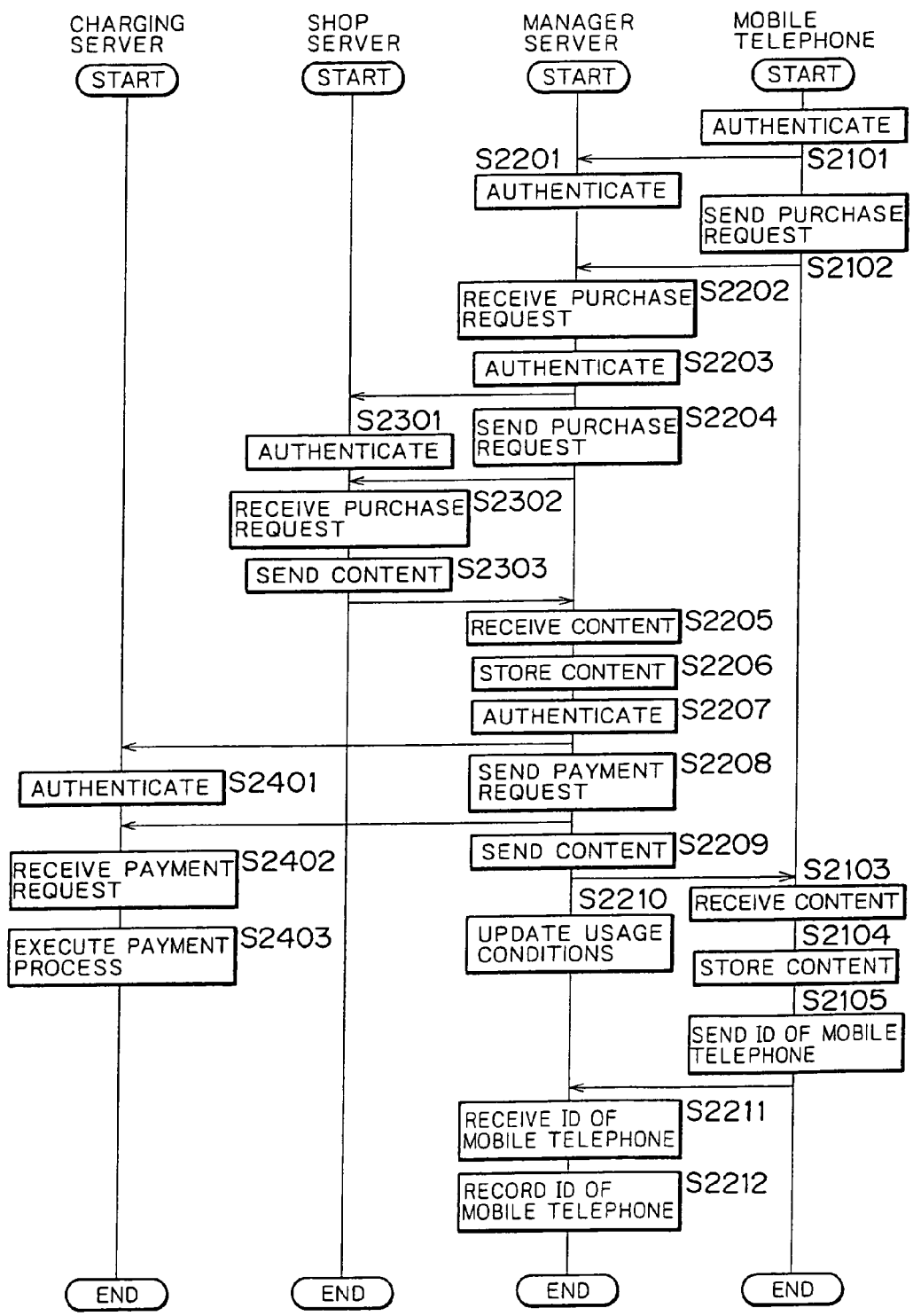
FIG. 13 is a flowchart describing processing in which a content is checked out immediately after purchasing it.

The following describes the processing in which the purchased content is immediately checked out are executed at the same time, with reference to the flowchart shown in FIG. 13. The processes of steps S2101 through S2403 are generally the same as those of steps S101 through S1403 of FIG. 10 and therefore their descriptions will be skipped. It should be noted that the check-out process to be executed at content purchasing is executed by user's instruction thereof through the corresponding menu, button, or other GUI.

In step S2209, if the processing request after downloading of the content request is a check-out instruction, the content purchase processing program 152 of the manager server 14 instructs the content management program 154 to check out the content and reads the content and its content key and usage conditions from the content database 155 in which they were stored in step S2206 and send them to the mobile telephone 11 via the network 3. In step S2210, the content management program 154 decrements the permitted check-out count in the content management table 162 by one which corresponds to that content and makes the content database 155 update the usage conditions of the content.

In step S2103, the content management program 144 of the mobile telephone 11 receives the contents and its content key and usage conditions from the manager server 14. In step S2104, the content management program 144 of the mobile telephone 11 stores the content and its content key and usage conditions received in step S2103 into the storage block 39.

If the purchase instructing program 142 of the mobile telephone 11 sends a content purchase request to the manager server 14 via the network 3 in step S2102 along with the content ID of the content to be purchased and the user ID of the mobile telephone 11, the processes of steps S2103 through S2212 are executed.

In step S2105, the content management program 144 of the mobile telephone 11 sends the device ID of the mobile telephone 11 stored in advance to the manager server 14 via the network 3. In step S2211, the content management program 154 of the manager server 14 receives the device ID of the mobile telephone 11. In step S2212, the content management program 154 of the manager server 14 records the device ID of the mobile telephone 11 into the content management table 162 in relation to the content ID of the content sent in step S2209, upon which this processing comes to an end.

It should be noted that, in step S2212, the content management program 154 of the manager server 14 may record the ID of the mobile telephone 11 received in the authentication process into the content management table 162. In step S2212, the content management program 154 of the manager server 14 may record the device ID obtained by referencing the user management table 161 on the basis of the user ID obtained in step S2202 into the content management table 162.

Thus, only by requesting the manager server 14 for a purchase of a desired content, the mobile telephone 11 can make the manager server 14 record the desired content and, at the same time, make the mobile telephone 11 check out that content from the manager server 14.

Figure 14:
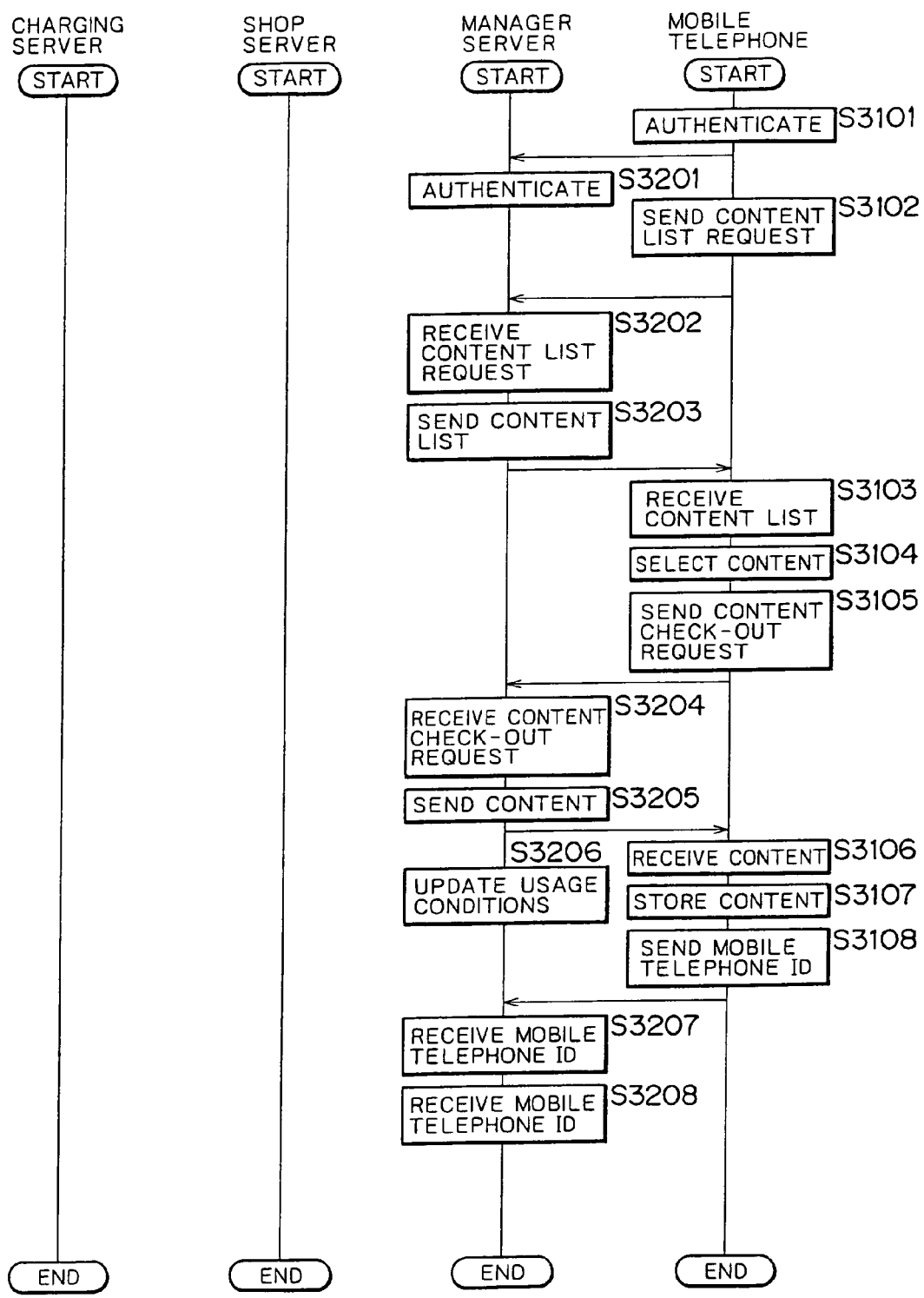
FIG. 14 is a flowchart describing a content checkout process.

The following describes the processing of checking out a content from the manager server 14 to the mobile telephone 11 with reference to the flowchart shown in FIG. 14. In step S3101, the authentication program 141 of the mobile telephone 11 authenticates the manager server 14 via the network 3. In step S3201, the authentication program 151 of the manager server 14 authenticates the mobile telephone 11.

The authentication processes of steps S3101 and S3201 are generally the same as those of steps S1101 and S1201.

In step S3102, the display operation instructing program 143 of the mobile telephone 11 sends a request to the manager server 14 for a content list (including the user ID of the user of the mobile telephone 11) via the network 3. In step S3202, the content management program 154 of the manager server 14 receives the content list request.

In step S3203, on the basis of the user ID received in step S3202, the content management program 154 of the manager server 14 reads the data about the content corresponding to the user ID of the user of the mobile telephone 11, namely the content purchased by the user of the mobile telephone 11, from the content management table 162 and sends the list (containing the music title for example of this content) of the content purchased by the user of the mobile telephone 11 to the mobile telephone 11 via the network 3. In step S3103, the display operation instructing program 143 of the mobile telephone 11 receives the list of the content purchased by the user of the mobile telephone 11.

In step S3104, the display operation instructing program 143 of the mobile telephone 11 makes display the content list on the display block 36 and, on the basis of the signal inputted from the input block 35 by the user of the mobile telephone 11, selects the specified content from the list.

In this case, the content management program 154 sends the ID of the device which has checked out the content recorded in the content management table 162 in relation to the content ID shown in FIG. 15 for example to the mobile telephone 11 in relation to the music title of this content.

Consequently, the mobile telephone 11 can display the device ID to which the content has been checked out onto the display block 36 in relation to the music title of the content.

Displaying the device ID to which the content has been checked out allows the user to know the device which has checked out each specified content.

In step S3105, the content management program 144 sends a check-out request (including the user ID and the content ID of the selected content) for the content selected in step S3104 to the manager server 14 via the network 3. In step S3204, the content management program 154 of the manager server 14 receives the content checkout request.

In step S3205, the content management program 154 of the manager server 14 determines on the basis of the data stored in the content management program 162 whether the check-out count of the requested content is 1 or more and, if the decision is affirmative, the content management program 154 of the manager server 14 reads, on the basis of the user ID and content ID contained in the check-out request, the content to be checked out and its content key and usage conditions from the content database 155 and sends them to the mobile telephone 11 via the network 3. In step S3206, the content management program 154 decrements by 1 the permitted check-out count for this content recorded in the content management table 162 and makes the content database 155 update the usage conditions of this content.

In step S3106, the content management program 144 of the mobile telephone 11 receives the content and its content key and usage conditions supplied from the manager server 14. In step S3107, the content management program 144 of the mobile telephone 11 stores the content and its content key and usage conditions received in step S3106 into the storage block 39.

In step S3108, the content management program 144 of the mobile telephone 11 sends the device ID of the mobile telephone 11 stored in advance to the manager server 14 via the network 3. In step S3207, the content management program 154 of the manager server 14 receives the device ID of the mobile telephone 11. In step S3208, the content management program 154 of the manager server 14 records the device ID of the mobile telephone 11 into the content management table 162 in relation to the content ID of the content sent in step S3205, upon which the content check-out processing comes to an end.

Thus, in response to the check-out request from the mobile telephone 11, the manager server 14 can check out the content purchased by the user of the mobile telephone 11 to the mobile telephone 11.

It is also practicable that the mobile telephone 11 sends the check-out request including the content ID and the device ID to the manager server 14 and the manager server 14 obtains the user ID on the basis of the received device ID and the user management table 161.

Figure 17:
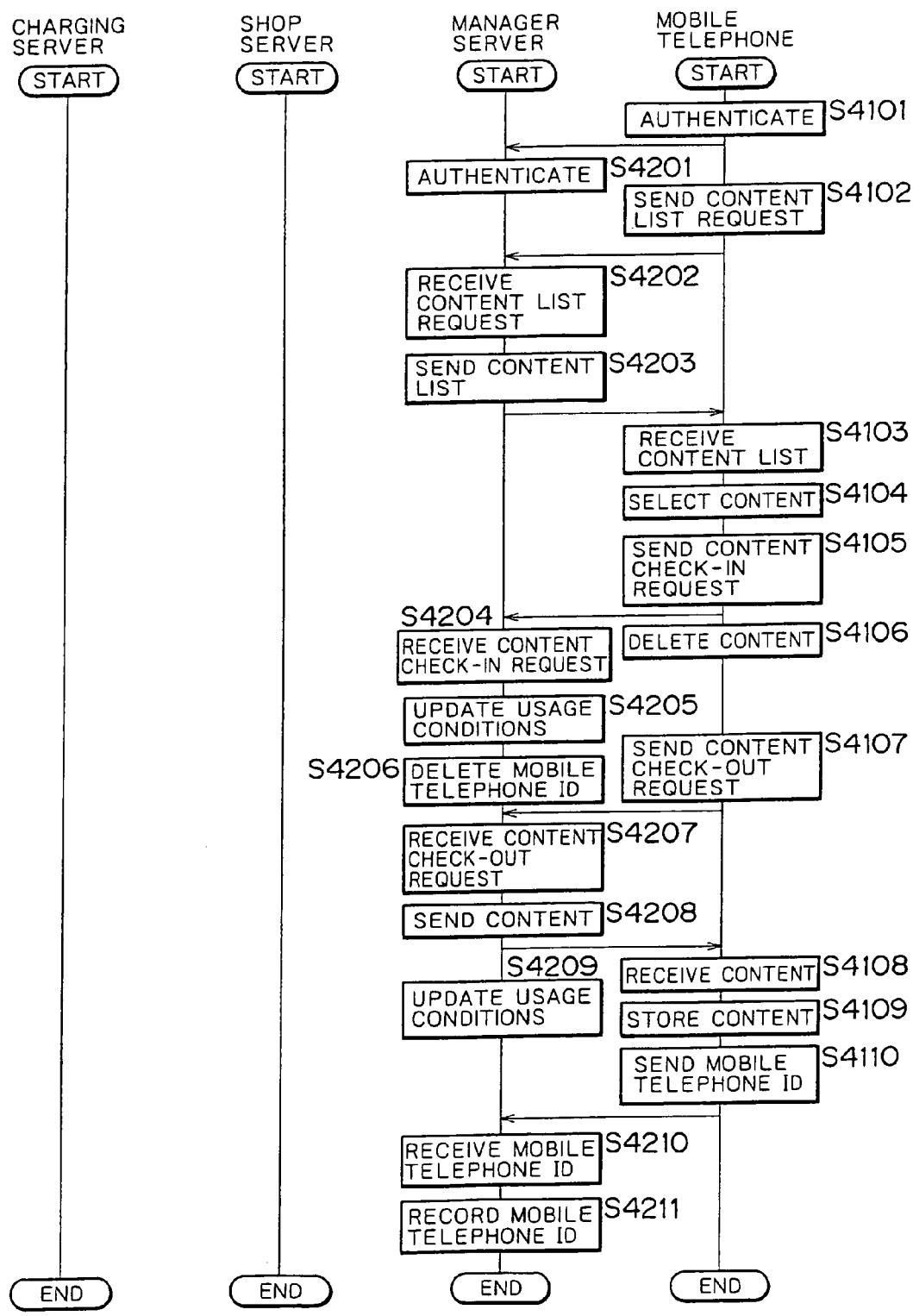
FIG. 17 is a flowchart describing a content checkout process.

The following describes the processing of checking in the content stored in the mobile telephone 11 and then checking out a desired content with reference to the flowchart shown in FIG. 17. The processes of steps S4101 through S4103 are generally the same as those of steps S3101 through S3103 of FIG. 14 and therefore their descriptions will be skipped.

In step S4104, the display operation instructing program 143 of the mobile telephone 11 displays a content list on the display block 36 and, on the basis of a signal inputted from the input block 35 by the user of the mobile telephone 11, selects from the list a particular content to be checked in and another content to be checked out.

In step S4105, the content management program 144 of the mobile telephone 11 sends a request (including the user ID and the content ID of the content to be checked in) for checking in the content stored in the storage block 39 to the manager server 14 via the network 3. In step S4106, the content management program 144 of the mobile telephone 11 deletes the content from the storage block 39.

In step S4204, the content management program 154 of the manager server 14 receives the content check-in request. In step S4205, the content management program 154 increments by 1 the permitted check-out count, stored in the content management table 162, corresponding to the user ID and content ID included in the received check-in request and makes the content database 155 update the usage conditions of the checked-in content.

If, before the content check-in process is executed, the content of which content ID is "A123" has been checked out to the mobile telephone 11 (its device ID being "X789"), the permitted check-out count corresponding to the content ID "A123" in the content management table 162 is set to 2 and the device ID corresponding to the content ID "A123" is set to "X789" as shown in FIG. 18.

When the content "A123" is checked in by the mobile telephone 11, as shown in FIG. 19, the permitted check-out count for the user ID "AAA" and the content ID "A123" in the content management table 162 is incremented by 1 to be 3, making null the device ID corresponding to the user ID "AAA" and the content ID "A123."

In step S4206, the content management program 154 deletes the device ID corresponding to the content ID included in the received check-in request stored in the content management table 162.

The processes of steps S4107 through S4211 are generally the same as those of steps S3105 through S3208 shown in FIG. 14, and therefore their descriptions will be skipped.

After the content is checked in by the mobile telephone 11, the content is checked out, so that content check-out can be implemented even if the free space of the storage block 39 of the mobile telephone 11 is comparatively small.

When the content "B456" is checked out from the state corresponding to the content management table 162 shown in FIG. 19 to the mobile telephone 11, the permitted check-out count corresponding to the user ID "AAA" and the content ID "B456" in the content management table 162 is decremented by 1 to be 2 and the device ID for the content "B456" is set to "X789."

Thus, after the mobile telephone 11 has checked in the content stored therein, the manager server 14 can check out, in response to the request from the mobile telephone 11, the content purchased by the user of the mobile telephone 11 to the mobile telephone 11.

Figure 21:
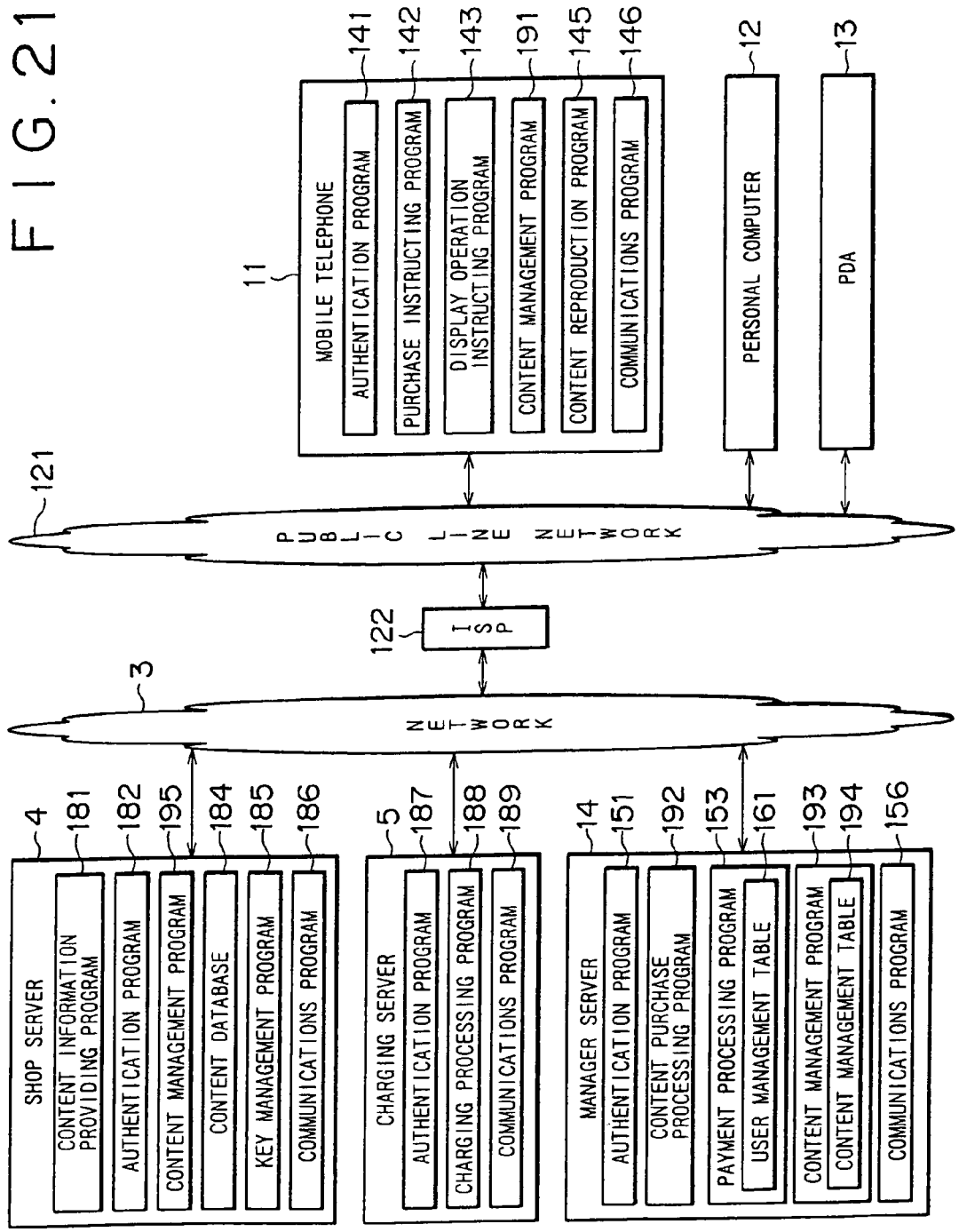
FIG. 21 is a block diagram illustrating an exemplary configuration of a second capability of the digital data transmission system according to the invention.

The following describes an exemplary configuration of a second capability of the digital data transmission system associated with the present invention with reference to FIG. 21. With reference to FIG. 21, components similar to those previously described with reference to FIG. 7 are denoted by the same reference numerals and their descriptions will be skipped.

A content management program 191, when a content check-out request is sent to the manager server 14, receives the corresponding content key and content usage conditions from the manager server 14. The content management program 191 receives the content from the shop server 4 and stores the received content into the storage block 39 in relation to the received content key and usage conditions.

On the basis of the content usage conditions stored in the storage block 39, the content management program 191 executes management operations such as permitting or prohibiting the reproduction of the content stored in the storage block 39 and, when the content stored in the storage block 39 is reproduced, makes the storage block 39 update the usage conditions of that content.

When a content check-in request is sent to the manager server 14, the content management program 191 deletes the content to be checked in and its content key and usage conditions from the storage block 39.

In response to a content purchase request received from the mobile telephone 11, the personal computer 12, or the PDA 13, a content purchase processing program 192 of the manager server 14 sends this content purchase request to the shop server 4. When the corresponding content key and usage conditions come from the shop server 4, the content purchase processing program 192 receives them and makes a content management program 193 to store them.

When the content is purchased, the content management program 193 records its content key and usage conditions and stores the content ID for identifying the purchased content and its usage conditions (for example, the permitted check-out count) into a content management table 194 in relation to the user ID of the user who has purchased this content.

The content management table 194 lists content IDs, content supply source addresses, permitted check-out counts which is one of the usage conditions, and device IDs in relation to the user IDs for identifying the users of the mobile telephone 11, the personal computer 12, and the PDA 13 as shown in FIG. 22 for example.

In the example shown in FIG. 22, the user ID of the user who purchased the content with content ID "A123" is "AAA," the content supply source address indicative of the address of the server supplying the content "A123" is "ααα" (for example, the URL (Uniform Resource Locator) of the shop server 4), the permitted check-out count of the content with the content ID "A123" is 2, and the device ID of the device to which the content has been checked out is "X789" (corresponding to the mobile telephone 11 for example).

When requested by the manager server 14 for a content purchase, a content management program 195 of the shop server 4 reads the corresponding content usage conditions from the content database 184 and the corresponding content key from the key management program 185 and sends them to the manager server 14 via the network 3. When requested by the mobile telephone 201 for the transmission of the content, the content management program 195 reads the content from the content database 184 and sends it to the mobile telephone 11 via the network 3.

Figure 23:
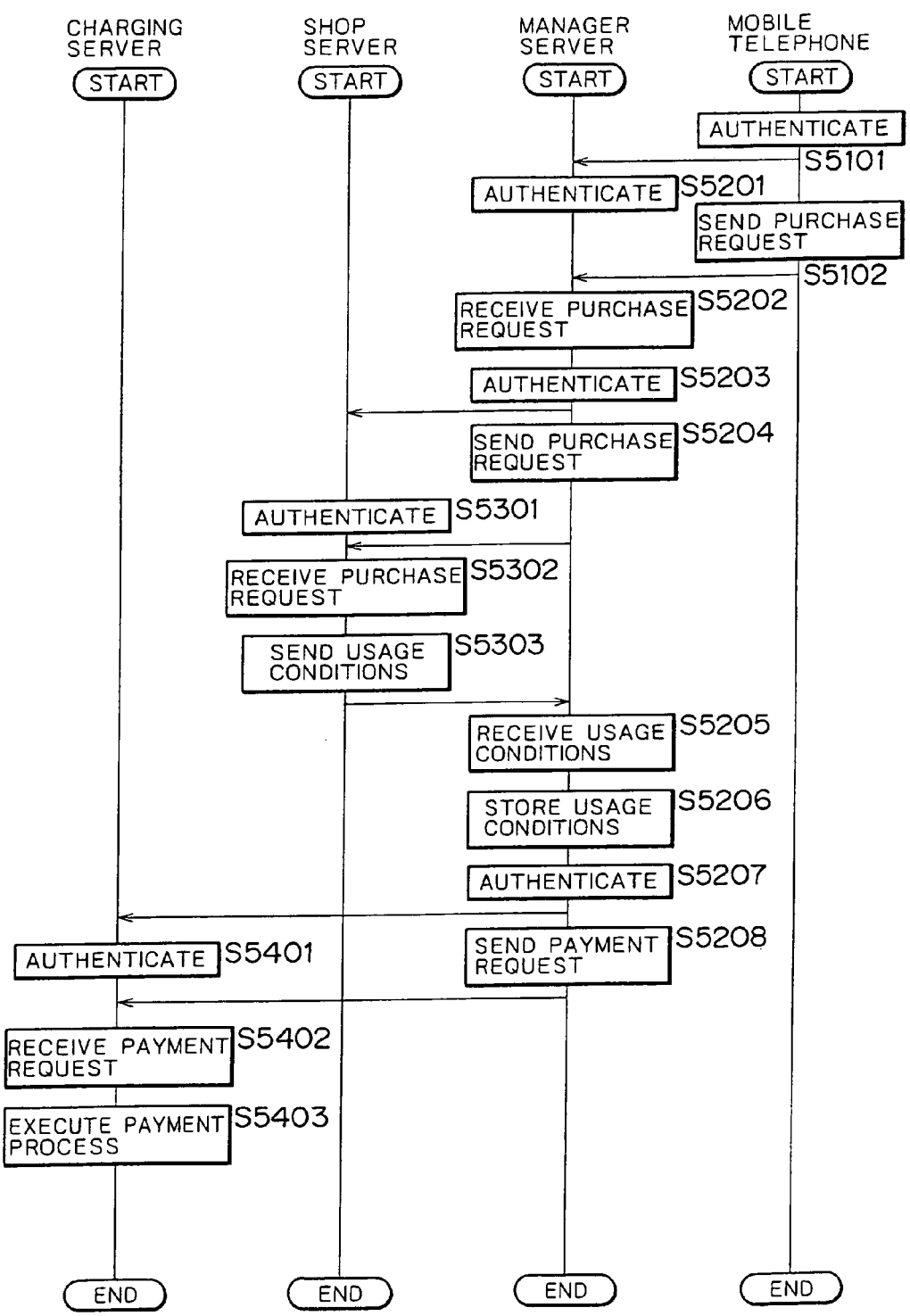
FIG. 23 is a flowchart describing a content purchase processing.

The following describes the content purchase processing of the manager server 14 in the digital data transmission system having the functional configuration shown in FIG. 21 with reference to the flowchart shown in FIG. 23. The processes of steps S5101 through S5302 are generally the same as those of steps S1101 through S1302 and therefore their descriptions will be skipped.

In step S5303, the content management program 195 of the shop server 4 reads the content usage conditions corresponding to the content ID received in step S5302 from the content database 184 and sends them to the manager server 14. The content management program 195 makes the key management program 185 supply the content key corresponding to this content, encrypts the supplied content key by a temporary key generated in the authentication processing, and sends the encrypted content key to the manager server 14.

In step S5205, the content purchase processing program 192 of the manager server 14 receives the usage conditions and the content key from the shop server 4. The content purchase processing program 192 decrypts the content key by the temporary key generated in the authentication processing.

In step S5206, the content purchase processing program 192 makes the content management program 193 store the content key and the usage conditions.

The content purchase processing program 192 makes the content management program 193 input the content ID and content supply source address corresponding to the stored content key and usage conditions into the content management table 194.

In step S5207, the authentication program 151 of the manager server 14 authenticates the charging server 5. In step S5401, the authentication program 187 of the charging server 5 authenticates the manager server 14. The processes of steps S5207 and S5401 are generally the same as those of steps S1101 and S1201.

In step S5208, the payment processing program 153 of the manager server 14 sends a payment request to the charging server 5 via the network 3. The payment request includes the credit card number for example of the user of the mobile telephone 11 and is encrypted by the temporary key generated in the authentication processing. In step S5402, the charging processing program 188 of the charging server 5 receives the payment request from the manager server 14. In step S5403, the charging processing program 188 of the charging server 5 executes a payment process for the corresponding credit card company on the basis of the payment request received in step S5402, upon which the content purchase processing comes to an end.

Thus, receiving a content purchase request from the mobile telephone 11, the manager server 14 purchases the requested content, records its usage conditions (the content itself is not recorded), and sends a payment request to the charging server 5.

Figure 24:
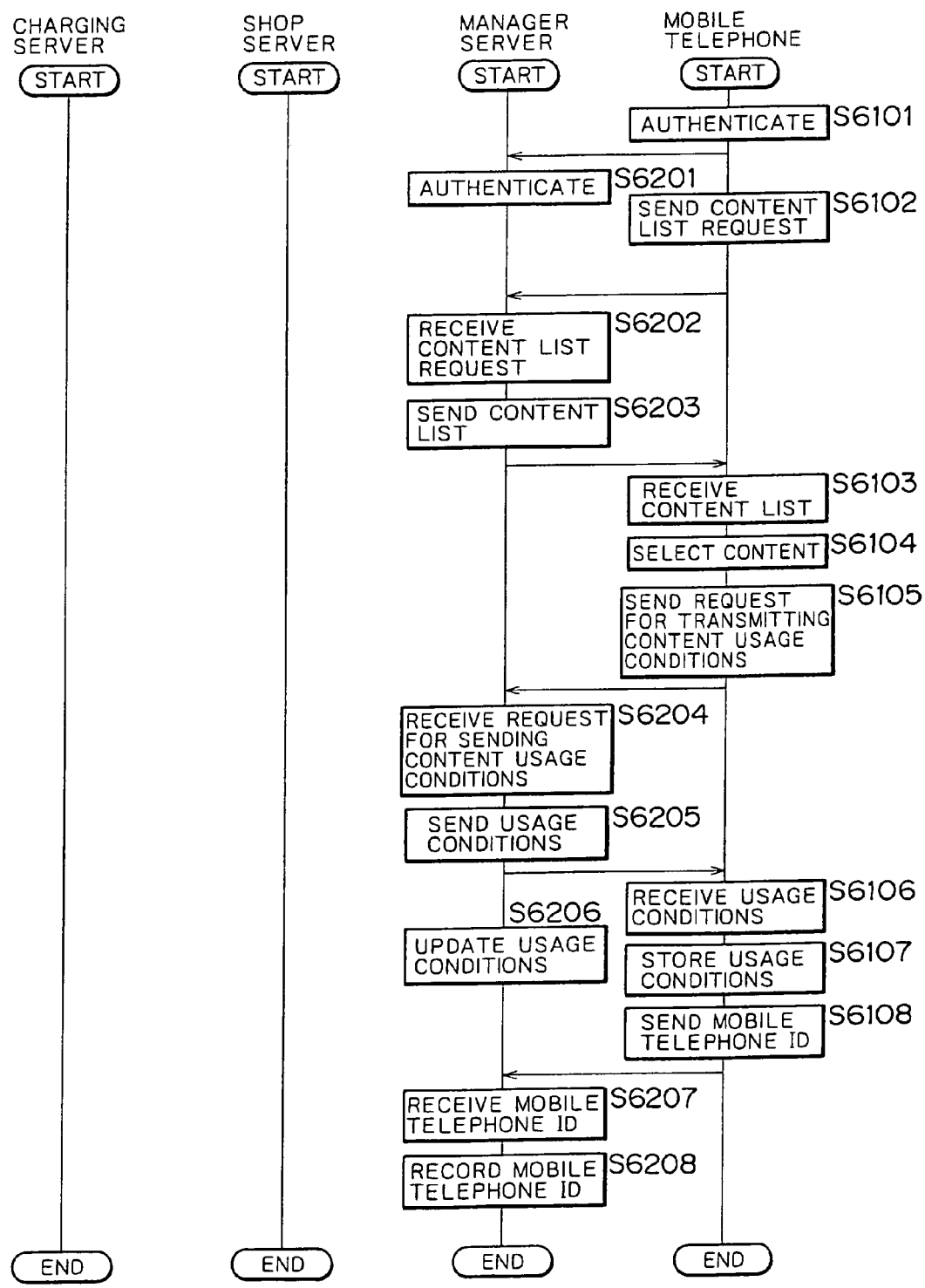
FIG. 24 is a flowchart describing a process of transmitting usage conditions from manager server to mobile telephone.

The following describes the transmission of the content usage conditions from the manager server 14 to the mobile telephone 11 in the digital data transmission system having the functional configuration shown in FIG. 21 with reference to the flowchart shown in FIG. 24. The processes of steps S6101 through S6104 are generally the same as those of steps S3101 through S3104 of FIG. 14 and therefore their descriptions will be skipped.

In step S6105, the content management program 191 sends a usage conditions transmission request (including the content ID of the selected content) corresponding to the content selected in step S6104 to the manager server 14 via the network 3. In step S6204, the content management program 193 of the manager server 14 receives the content usage conditions transmission request.

In step S6205, the content management program 193 of the manager server 14 sends the requested usage conditions, the corresponding content key, and the content supply source address to the mobile telephone 11 via the network 3. In step S6206, the content management program 193 decrements by 1 the permitted check-out count corresponding to the usage conditions listed in the content management table 194 and updates the usage conditions.

In step S6106, the content management program 191 of the mobile telephone 11 receives the content key and the usage conditions, and the content supply source address supplied from the manager server 14. In step S6107, the content management program 191 of the mobile telephone 11 stores the content key, usage conditions, and content supply source address received in step S6106 into the storage block 39.

In step S6108, the content management program 191 of the mobile telephone 11 sends the device ID of the mobile telephone 11 stored in advance to the manager server 14 via the network 3. In step S6207, the content management program 193 of the manager server 14 receives the device ID of the mobile telephone 11. In step S6208, the content management program 193 of the manager server 14 records the device ID of the mobile telephone 11 into the content management table 194 in relation to the content ID corresponding to the usage conditions sent in step S6205, upon which the usage condition transmission processing comes to an end.

Thus, the manager server 14, in response to the request from the mobile telephone 11, can send the usage conditions of the content purchased by the user of the mobile telephone 11 to the mobile telephone 11.

Figure 25:
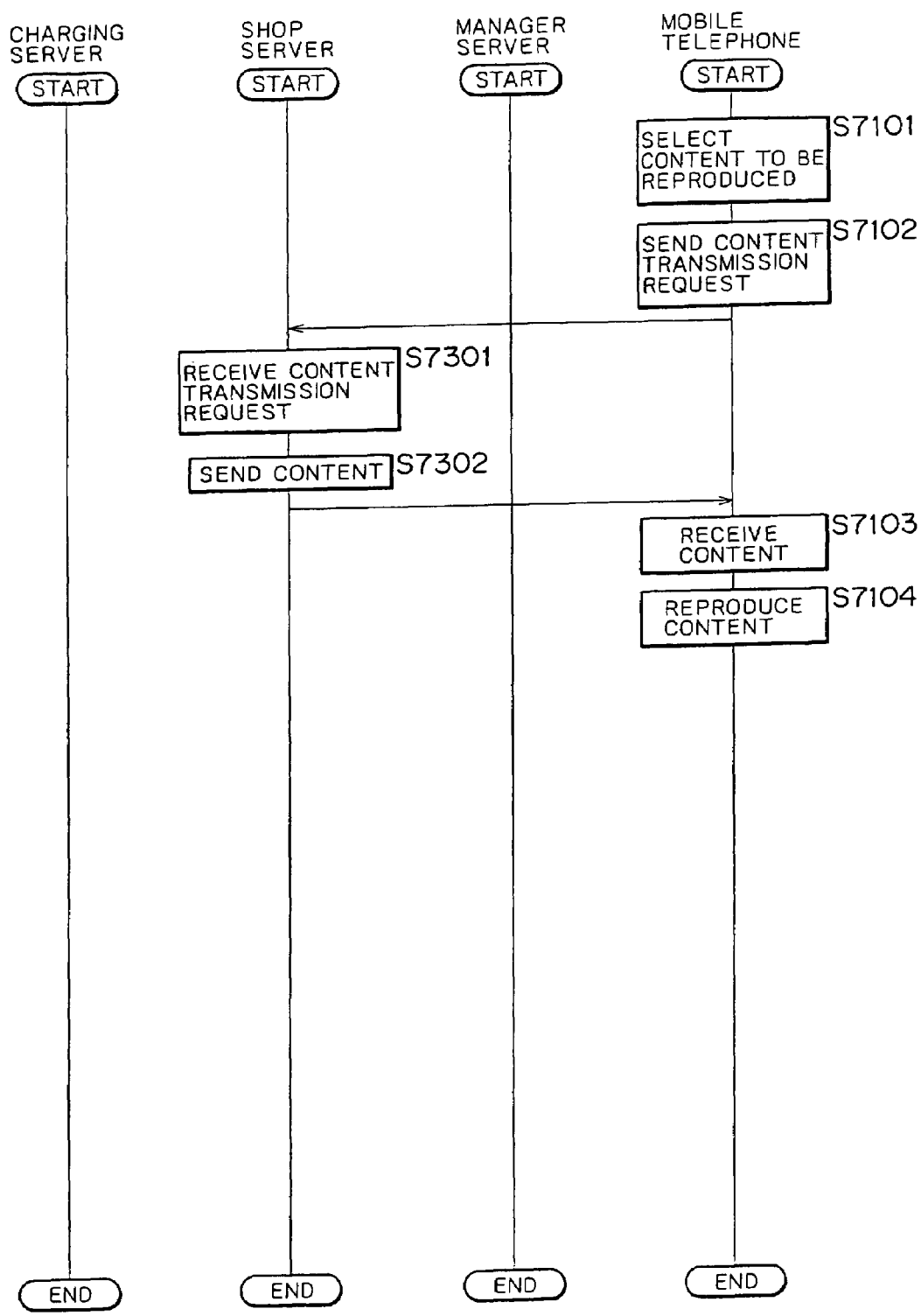
FIG. 25 is a flowchart describing a process of reproducing a content by mobile telephone 11 which has stored the usage conditions of the content.

The following describes the processing of reproducing a content by the mobile telephone 11 storing the content usage conditions in the digital data transmission system having the functional configuration shown in FIG. 21 with reference to the flowchart shown in FIG. 25. In step S7101, the display operation instructing program 143 displays music titles for example of the content storing its usage conditions onto the display block 36 and, on the basis of a signal inputted from the input block 35 by the user, selects the content to be reproduced. In step S7102, the content management program 191 determines whether the content is reproducible or not and, if the content is reproducible, then sends via the network 3 a request to the shop server 4 for sending the selected content supplied to the content supply source address.

In step S7301, the content management program 195 of the shop server 4 receives the content transmission request from the mobile telephone 11. In step S7302, the content management program 195 of the shop server 4 reads the content (encrypted) corresponding to the transmission request received from the mobile telephone 11 from the content database 184 and sends the content to the mobile telephone 11 via the network 3.

In step S7103, the content reproduction program 145 of the mobile telephone 11 receives the content supplied from the shop server 4. In step S7104, the content reproduction program 145 of the mobile telephone 11 reproduces the received content, upon which the content reproduction processing comes to an end.

Alternatively, the content may be reproduced in step S7104 after storing the content in step S7103 into the storage block 39 or a so-called stream reproduction may be executed.

Thus, the manager server 14 only stores the usage conditions of the purchased content and therefore does not store the purchased content itself. When the mobile telephone 11 reproduces the purchased content, the manager server 14 sends the usage conditions of that content to the mobile telephone 11.

When reproducing the purchased content, the mobile telephone 11 can directly receive the content from the shop server 4 and, on the basis of the usage conditions of that content received from the manager server 14, reproduce the received content.

It should be noted that the manager server 14 purchases or checks out a content in response to the request from the personal computer 12 or the PDA 13 in the same processing as that for the mobile telephone 11.

Figure 26:
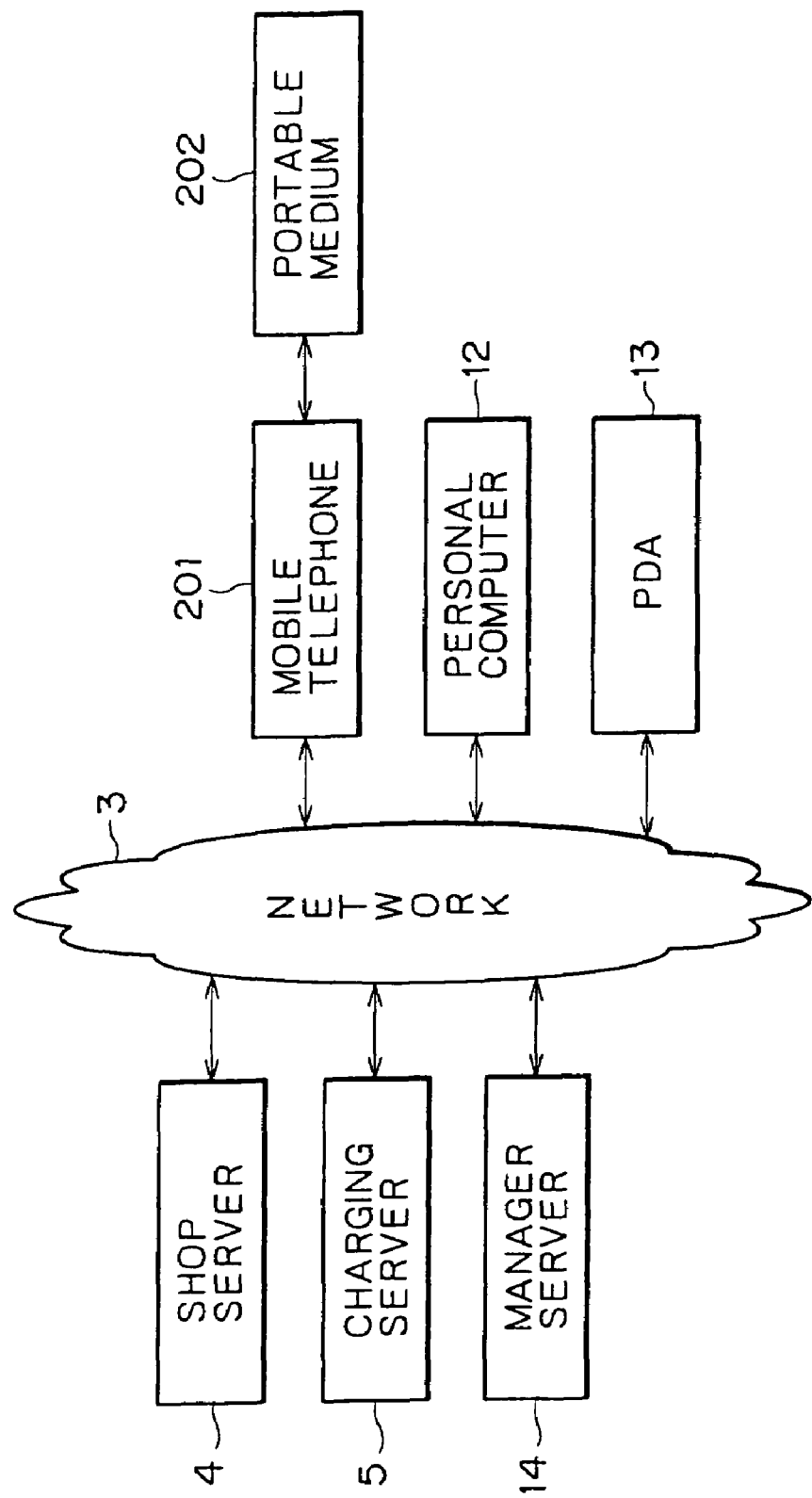
FIG. 26 is a block diagram illustrating another embodiment of the digital data transmission system acceding to the invention.

The following describes another embodiment of the digital data transmission system associated with the present invention. Referring to FIG. 26, there is shown another embodiment of the digital data transmission system associated with the present invention. With reference to FIG. 26, components similar to those previously described with reference to FIG. 4 are denotes by the same reference numbers and therefore their descriptions will be omitted.

A mobile telephone 201 is configured so that a portable medium 202 can be loaded therein and connected to a network 3 in a wireless manner. The mobile telephone 201 stores, via the network 3, the content (compressed and encrypted in predetermined algorithms) checked out from a manager server 14 into the portable medium 202 along with the usage conditions of the content.

The portable medium 202 incorporates a recording medium such as a flash memory and is configured so as to be detachably loaded in the mobile telephone 201.

The mobile telephone 201, on the basis of content usage conditions, reproduces the content stored on the loaded portable medium 202 and outputs the reproduction to a headphone or a speaker, not shown. The user can carry about the mobile telephone 201, check out a desired content from a manager server 14 at a desired place, and store the checked out content into the portable medium 202. The user can make the mobile telephone 201 reproduce the content stored in the portable medium 202 and listen to the music corresponding to the content by means of a headphone for example.

A program to be described with reference to FIG. 28 of the mobile telephone 201 is constituted by a module group which, in order to prevent the infringement of the copyright of a content by its noncompliant secondary usage, controls the permission of the use of individual contents only when the usage conditions specified by the copyright holder of each content are satisfied. The usage conditions include content's reproduction conditions, duplication conditions, movement conditions, and accumulation conditions for example.

The program of the mobile telephone 201 authenticates the portable medium 202 when it is loaded on the mobile telephone 201 and adds the usage conditions specified by the shop server 4 in a safe method to the content (encrypted) and stores them in the portable medium 202 of the mobile. As the content is moved, the program of the mobile telephone 201 generates a necessary key and manages it or controls the communication with the connected portable medium 202.

Figure 27:
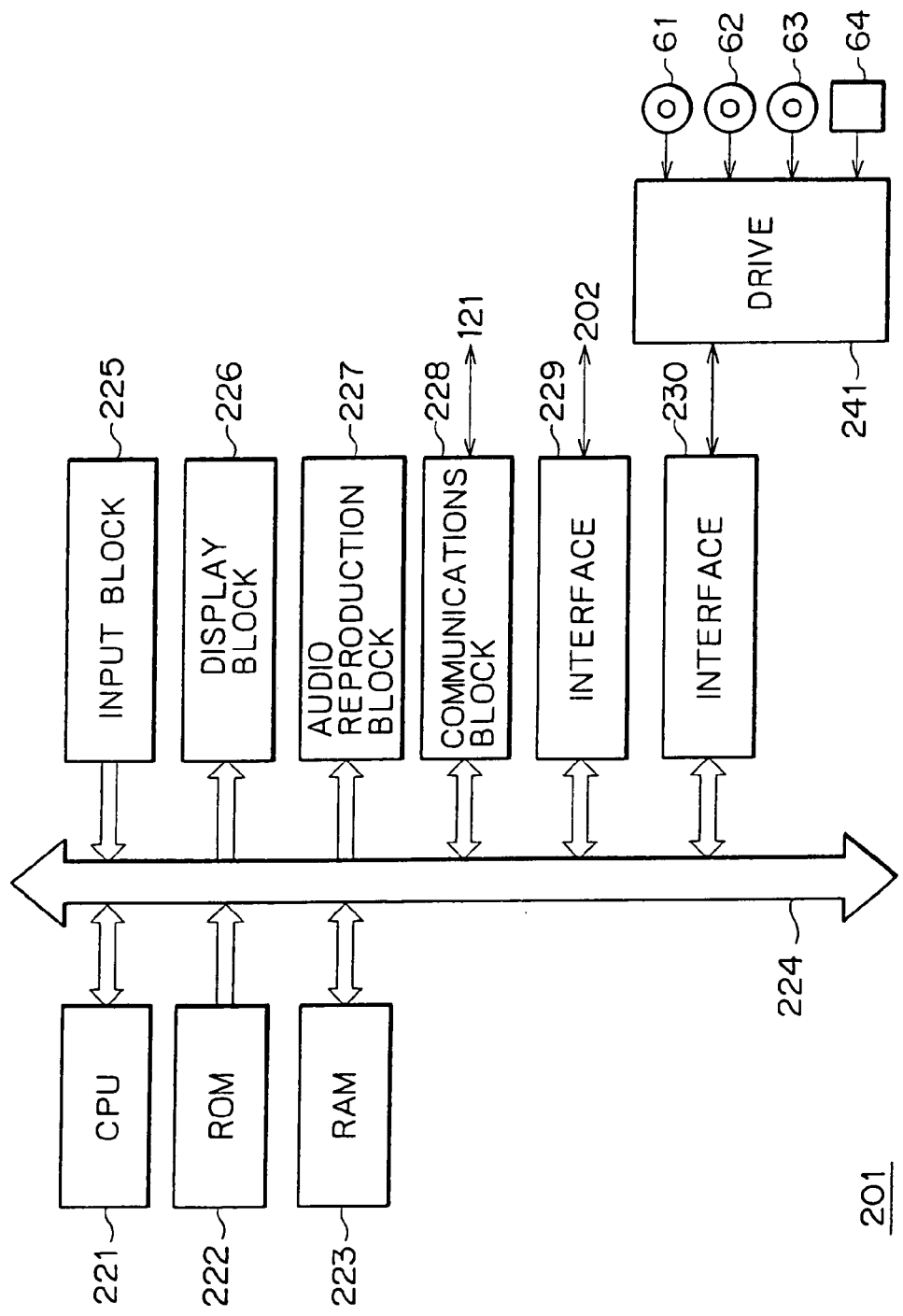
FIG. 27 is a block diagram illustrating a configuration of mobile telephone 201.

FIG. 27 is a block diagram illustrating an exemplary configuration of the mobile telephone 201. Components, CPU 221 through a communications block 228, are similar to those, the CPU 31 through the communications block 38, shown in FIG. 5, and therefore their descriptions will be skipped appropriately.

An audio reproduction block 227 reproduces the audio data of the other party supplied from the communications block 228 or the content supplied from the portable medium 202 via an interface 229 and outputs a voice.

The interface 229 stores the data supplied from the CPU 221, a RAM 223, or the communications block 228 into the loaded portable medium 202 and reads the data such as a content from the loaded portable medium 202 to supply the data to the CPU 221, the RAM 223, or the audio reproduction block 227.

An interface 230, a drive 241, and disks and memory connected thereto are the same as those shown in FIG. 5 and therefore their descriptions will be skipped.

The following describes an exemplary configuration of a third capability of the digital data transmission system associated with the present invention with reference to FIG. 28 with reference to FIG. 28, components similar to those previously described with reference to FIG. 7 are denoted by the same reference numerals and therefore their descriptions will be skipped.

The mobile telephone 201 executes an authentication program 261, a purchase instructing program 262, a display operation instructing program 263, a content management program 264, a content reproduction program 265, and communications program 266.

The authentication program 261 authenticates a manager server 14 or a shop server 4 via a public line network 121 and a network 3 as well as the portable medium 202 loaded on the mobile telephone 201.

The purchase instructing program 262 sends a request for purchasing a content to the manager server 14 via the public line network 121 and the network 3.

The display operation instructing program 263 receives, via the public line network 121 and the network 3, the data (for example, a music title or usage conditions) associated with the content stored in the manager server 14 and displays the received data of the content recorded in the manager server 14 onto a display block 226.

The display operation instructing program 263 reads, via the interface 229, the data (for example, a music title or usage conditions) associated with the content stored in the portable medium 202 from the portable medium 202 and displays the data onto the display block 226.

When a check-out for example is instructed from an input block 225 by the user, the display operation instructing program 263 makes the content management program 264 execute a check-out operation for example. When content reproduction is instructed from the input block 225 by the user, the display operation instructing program 263 makes the content reproduction program 265 reproduce the content stored in the portable medium 202 on the basis of the management of content usage based on the usage conditions executed by the content management program 264.

The content management program 264 manages the use of a content stored in the portable medium 202 on the basis of the content usage conditions stored in the portable medium 202 and requests the manager server 14 for content check-out or check-in.

On the basis of content usage conditions stored in the portable medium 202, the content management program 264 manages the permission or prohibition of the reproduction of the content stored in the portable medium 202 and, when the content stored in the portable medium 202 has been reproduced, updates its usage conditions.

When the content management program 264 has requested the manager server 14 for the check-out of a particular content, the content management program 264 receives the content, its content key and usage conditions from the manager server 14 and stores the received content into the portable medium 202 as related to its content key and usage conditions.

The content management program 264, when it has requested the manager server 14 for the checking in of a particular content, deletes the content of which check-in has been requested, its content key and usage conditions from the portable medium 202.

When the reproduction of a content is permitted by the content management program 264, the content reproduction program 265 decrypts the content stored in the portable medium 202 and makes the audio reproduction block 227 to output a voice representing the content.

The communications program 266 is a program for establishing a connection to an ISP 122 via the public line network 121 such as a PHS or an IMT. The communications program 266 includes protocols such as IP, HTTP and WAP and makes communication with the shop server 4, the charging server 5, and the manager server 14 via the network 3 and with the portable medium 202 via the interface 230.

When the programs, the authentication program 261 through the content management program 264, request the manager server 14 for a content purchase or a content check-out via the public line network 121 and the network 3, the programs, the authentication program 261 through the content management program 264, make the communications program 266 send the data associated with the content purchase request or content check-out request and receive the data sent from the manager server 14. The portable medium 202 executes an authentication program 281, a content management program 282, and the communications program 283.

The authentication program 281 authenticates the mobile telephone 201.

The content management program 282 stores a content and its content key and usage conditions and, on the basis of the usage conditions, controls a content read operation for example. The content management program 282 encrypts the content key supplied from the mobile telephone 201 with a storage key stored in advance and manages the encrypted content key. The communications program 283 is a program for making communication with the mobile telephone 201 via the interface 229 of the mobile telephone 201.

When the purchased content and its content key and usage conditions have been stored in the content database 155, the content management program 291 stores the content ID for identifying the purchased content and its usage conditions into the a content management table 292 in relation to the user ID of the user who has purchased that content.

The content management table 292 lists content IDs, permitted check-out count, which is one of usage conditions, device IDs, and medium IDs as related to the user IDs for identifying the users of the mobile telephone 201, the personal computer 12, and the PDA 13 as shown in FIG. 29 for example.

The permitted check-out count denotes the number of times the corresponding content can be checked out. The device ID denotes the ID of a device (for example, the personal computer 12 or the PDA 13) which has checked out that content. The medium ID identifies a recording medium such as the portable medium 202 that has checked out that content.

When the content management program 291 has checked out the content to a detachable medium, the content management program 291 enters the medium ID of that detachable medium into the medium ID column of the content management table 292. When the content management program 219 has checked out the content to a device incorporating a medium (a device which cannot be detachably loaded by the user in an ordinary manner), the content management table 292 enters the ID of this device into the device ID column of the content management table 292.

The device ID and the medium ID may be differentiated by different schemes (for example, assigning different numbers of bits) for the content management program 291 to make a distinction between them with a single ID.

Alternatively, the device ID and medium ID to be used may be stored in a user management table 161 in advance along with the data for identifying these IDs (which ID identifies device or medium) for the content management program 291 to make a distinction between them by referencing the user management table 161.

For example, in the example shown in FIG. 29, the ID of the user who purchased the content of which ID is "A1213" is "AAA," the permitted check-out count of the content of which ID is "A123" is 2, and the medium ID of the medium to which the content of which ID is "A123" has been checked out is "AZ555" (for example, the portable medium 202).

The ID of the user who has purchased the content of which ID is "B456" is "AAA," the permitted check-out count of the content of which ID is "B456" is 1, and the ID of the device to which the content of which ID is "B456" has been checked out is "X789 " (for example, the mobile telephone 201) and "Z213".

When a check-out request (accompanied by content ID and device ID or medium ID) comes from the mobile telephone 201, the personal computer 12, or the PDA 13, the content management program 291 determines, on the basis of the data listed in the content management table 292, whether this request is from the user who has purchased this content. If the request is found from that user, the content management program 291 further determines, on the basis of the usage conditions, whether the check-out count for that content is 1 or more.

If the permitted check-out count is found 1 or more, the content management program 291 reads the content corresponding to the content ID and its content key and usage conditions from the content database 155 and send them via the network 3 to the mobile telephone 201, the personal computer 12, or the PDA 13 which requested for the check-out.

When the content has been sent to the mobile telephone 201, the personal computer 12, or the PDA 13, the content management program 291 decrements by 1 the permitted check-out count, stored in the content management table 292, corresponding to that content and stores the device ID or the medium ID into the content management table 292.

When a content check-in request comes from the mobile telephone 201, the personal computer 12, or the PDA 13, the content management program 291 increments by 1 the permitted check-out count of the content to be checked in listed in the content management table 292 on the basis of the user ID, the content ID and device ID attached to the request and deletes the device ID of the device or the medium ID of the medium that has issued the check-in request from the content management table 292.

Figure 28:
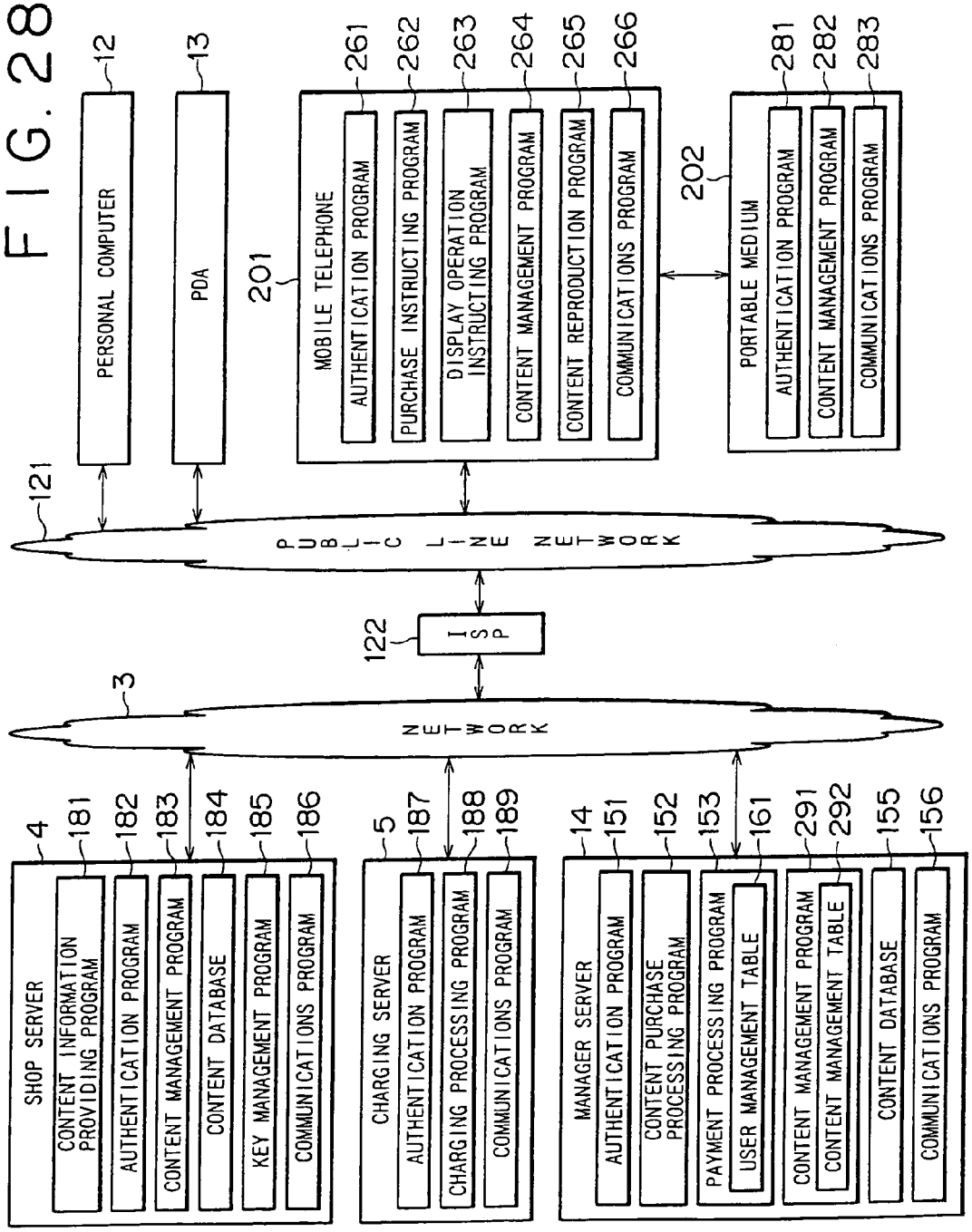
FIG. 28 is a block diagram illustrating an exemplary configuration of a third capability of the digital data transmission system according to the invention.
Figure 30:
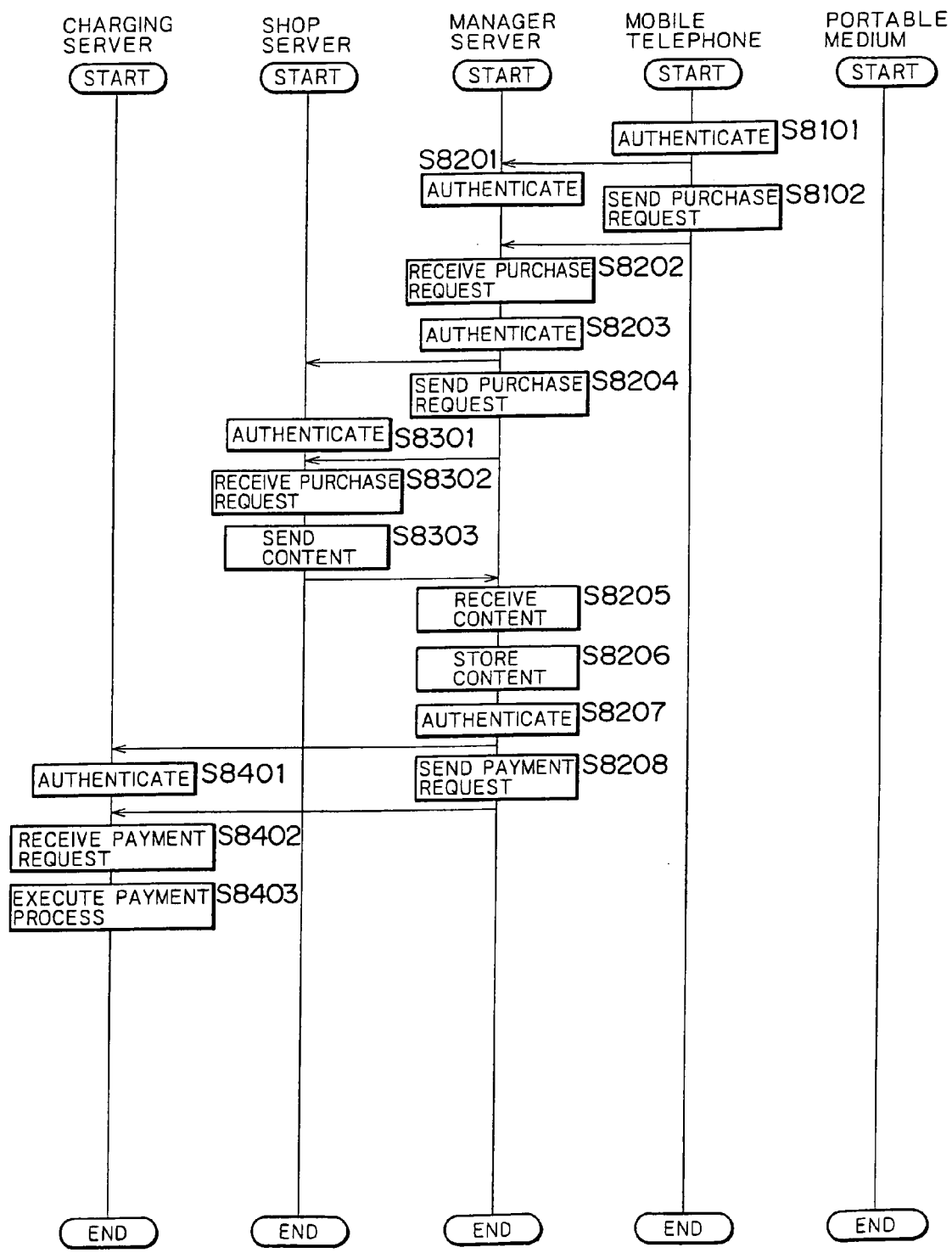
FIG. 30 is a flowchart describing a content purchase process.

The following describes a content purchasing process in the digital data transmission system having a functional capability shown in FIG. 28 with reference to the flowchart shown in FIG. 30. The processes of steps S8101 through S8403 are generally the same as those of steps S101 through S1403 of FIG. 10 and therefore their descriptions will be skipped.

Figure 31:
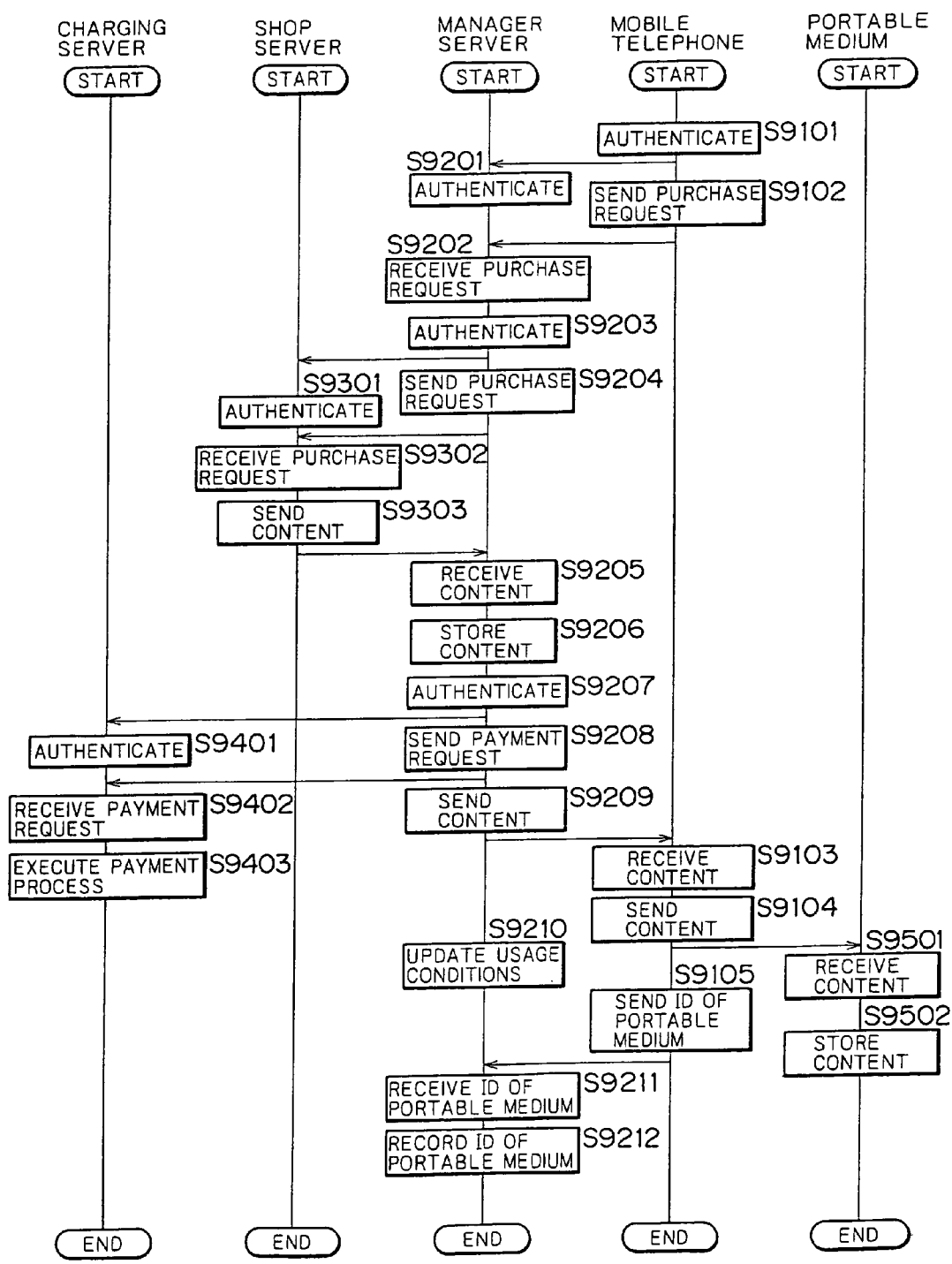
FIG. 31 is a flowchart describing another content purchase process.

The following describes another content purchasing process in the digital data transmission system having the functional capability shown in FIG. 28 with reference to the flowchart shown in FIG. 31. The processes of steps S9101 through S9103 are generally the same as those of steps S2101 through S2103 of FIG. 13 and therefore their descriptions will be skipped.

In step S9104, the content management program of the mobile telephone 201 makes the communications program 266 send the content received in step S9103 and its content key and usage conditions to the portable medium 202. In step S9501, the content management program 282 of the portable medium 202 receives the content and its content key and usage conditions from the mobile telephone 201.

In step S9502, the content management program 282 of the portable medium 202 stores the content and its content key and usage conditions received in step S9501.

In step S9105, the content management program 264 of the mobile telephone 201 sends the medium ID of the portable medium 202 obtained in the authentication process (executed when the portable medium 202 is loaded in the mobile telephone 201) with the portable medium 202 to the manager server 14 via the network 3. In step S9211, the content management program 291 of the manager server 14 receives the medium ID of the portable medium 202. In step S9212, the content management program 291 of the manager server 14 records the medium ID of the portable medium 202 into the content management table 292 in relation to the content ID of the content sent in step S9209, upon which the content purchase processing comes to an end.

Thus, by only issuing a request for a desired content to the manager server 14, the mobile telephone 201 can record the desired content to the manager server 14 and check out that content from the manager server 14 to the portable medium 202.

Figure 32:
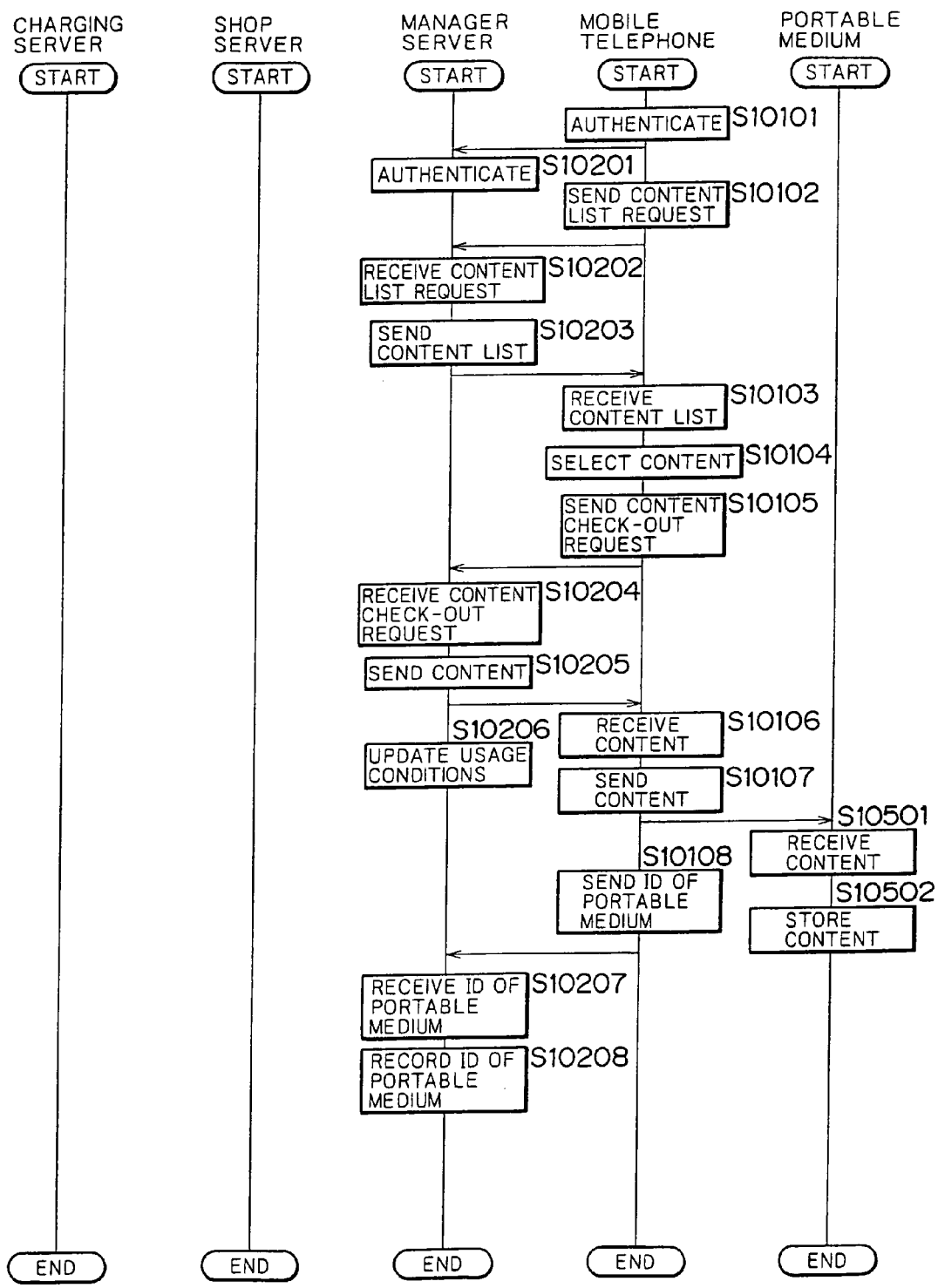
FIG. 32 is a flowchart describing a content checkout process.

The following describes the content check-out processing in the digital data transmission system having the functional capability shown in FIG. 28 with reference to the flowchart shown in FIG. 32. In steps S10101 through S10106 are generally the same as those of steps S3101 through S3106 of FIG. 14 and therefore their descriptions will be skipped.

In step S10107, the content management program 264 of the mobile telephone 201 makes the communications program 266 send the content received in step S10106 and its content key and usage conditions to the portable medium 202. In step S10501, the content management program 282 of the portable medium 202 receives the content and its content key and usage conditions from the mobile telephone 201.

In step S10502, the content management program 282 of the portable medium 202 stores the content and its content key and usage conditions received in step S10501.

In step S10108, the content management program 264 of the mobile telephone 201 sends the medium ID of the portable medium 202 obtained in the authentication process (executed when the portable medium 202 is loaded in the mobile telephone 201) with the portable medium 202 to the manager server 14 via the network 3. In step S10207, the content management program 291 of the manager server 14 receives the medium ID of the portable medium 202. In step S10208, the content management program 291 of the manager server 14 stores the medium ID of the portable medium 202 into the content management table 292 in relation to the content ID of the content sent in step S10205, upon which the content check-out processing comes to an end.

Thus, the manager server 14, in response to the request from the mobile telephone 201, can check out the content purchased by the user of the mobile telephone 201 to the portable medium 202.

Figure 33:
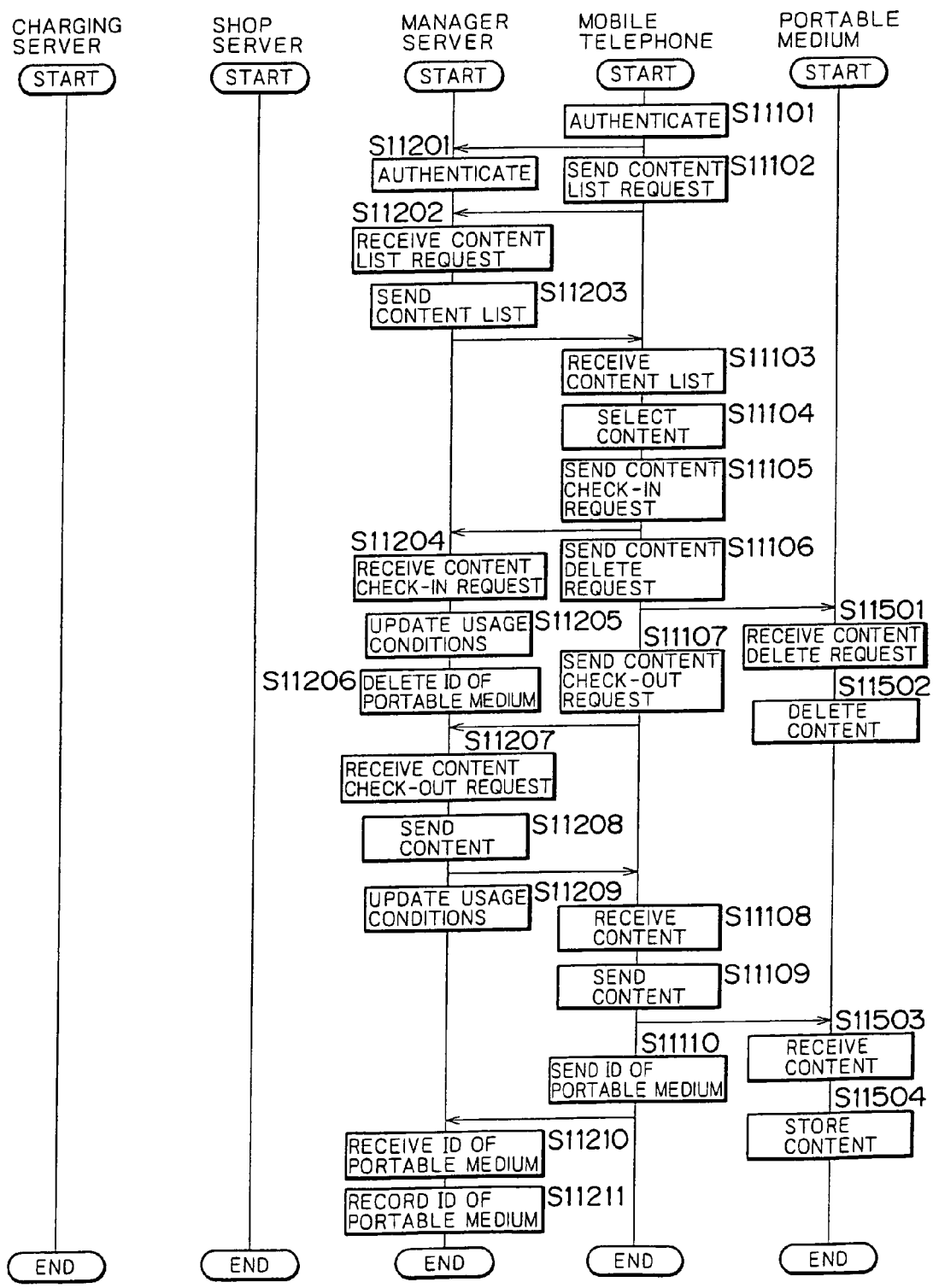
FIG. 33 is a flowchart describing another content checkout process.

The following describes the processing of checking in the content stored in the mobile telephone 201 and then checking out a desired content with reference to the flowchart shown in FIG. 33 in the digital data transmission system having the functional configuration shown in FIG. 28. The processes of steps S11101 through S11104 are generally the same as those of steps S4101 through S4104 of FIG. 17 and therefore their descriptions will be skipped.

In step S11105, the content management program 264 of the mobile telephone 201 sends a request (including the user ID, the medium ID and the content ID of the content to be checked in) for checking in the content stored in the portable medium 202 to the manager server 14 via the network 3.

In step S11204, the content management program 291 of the manager server 14 receives the content check-in request. In step S11205, the content management program 292 increments by 1 the permitted check-out count, stored in the content management table 292, corresponding to the user ID and content ID included in the received check-in request and makes the content database 155 update the usage conditions of the checked-in content.

In step S11206, the content management program 291 deletes the medium ID corresponding to the content ID and user ID included in the received check-in request stored in the content management table 292.

In step S11106, the content management program of the mobile telephone 201 sends a content delete request to the portable medium 202. In step S11502, the content management program 262 of the portable medium 202 deletes the content.

The processes of steps S11107 through S11211 are generally the same as those of steps S10105 through S10208 of FIG. 32 and therefore their descriptions will be skipped.

Thus, after the portable telephone 201 checks in the content stored in the portable medium 202, the manager server 14 can check out the content purchased by the user of the mobile telephone 201 to the portable medium 202 in response to the request from the mobile telephone 201.

Figure 34:
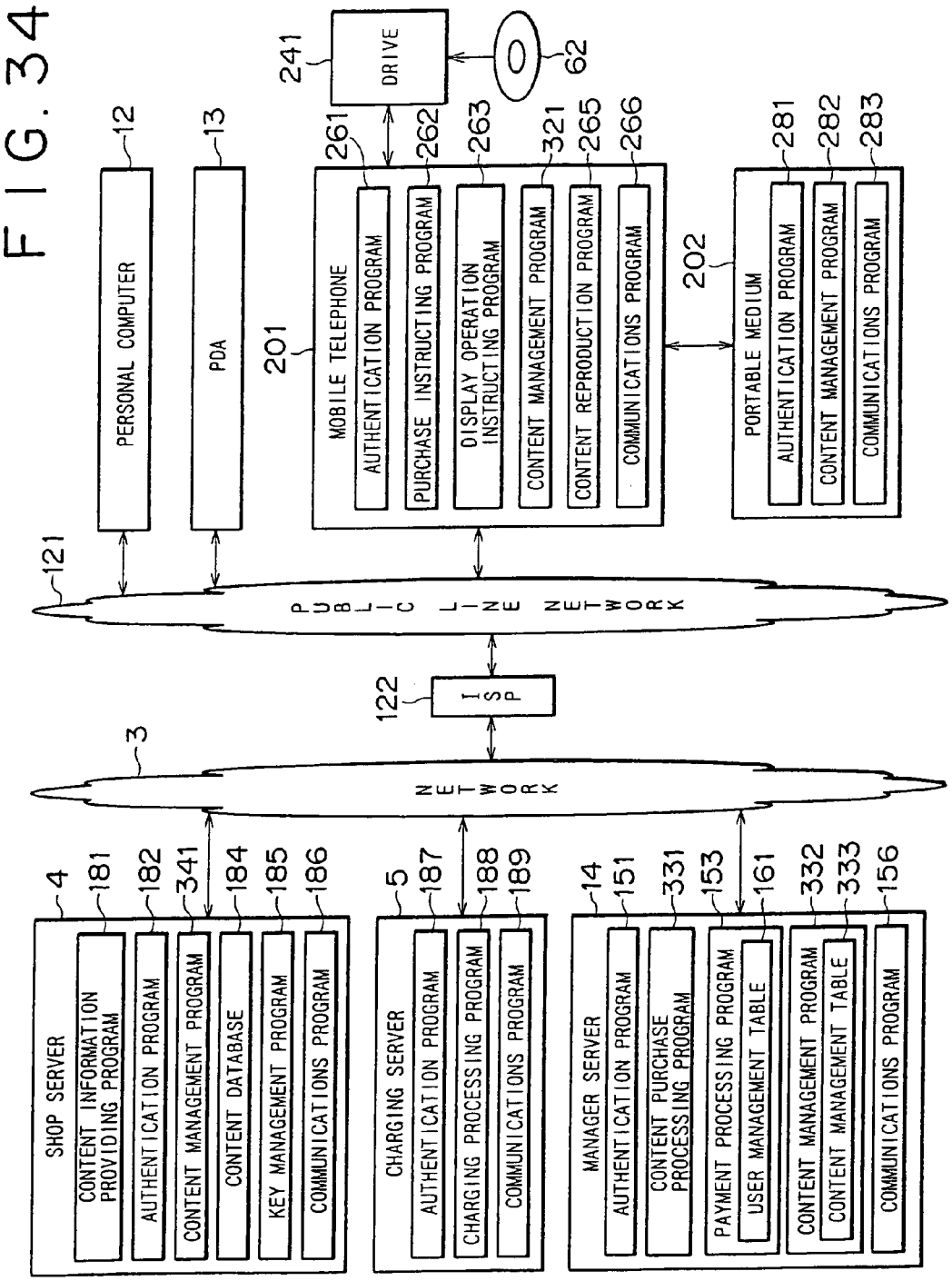
FIG. 34 is a block diagram illustrating an exemplary configuration of a fourth capability of the digital data transmission system according to the invention.

The following describes a fourth functional configuration of the digital data transmission system associated with the present invention with reference to FIG. 34. With reference to FIG. 34, components similar to those previously described with FIG. 28 are denoted by the same reference numerals and therefore their descriptions will be skipped.

When a content management program 321 of the mobile telephone 201 has requested the manager server 14 for checking out a particular content, the content management program 321 receives the corresponding content key and content usage conditions from the manager server 14. When the content management program 321 has requested the manager server 14 for checking out the particular content, the content management program 321 receives the requested content from the shop server 4 and stores the received content into the portable medium 202 in relation to the content key and the usage conditions.

On the basis of the content usage conditions stored in the portable medium 202, the content management program 321 manages the permission or prohibition of the reproduction of the content stored in the portable medium 202 and, when the content stored in the portable medium 202 has been reproduced, makes the portable medium 202 update its usage conditions.

When the content management program 321 has requested the manager server 14 for the particular content, the content management program 321 deletes the requested content and its content key and usage conditions from the portable medium 202.

A content purchase processing program 331 of the manager server 14 sends a content purchase request received from the mobile telephone 201, the personal computer 12, or the PDA 13 to the shop server 14. The content purchase processing program 331 receives the corresponding content key and usage conditions supplied from the shop server 4 and makes the content management program 332 record the received content key and usage conditions.

When a content has been purchased, the content management program 332 records its content key and usage conditions and stores the content ID for identifying the purchased content and its usage conditions (for example, the permitted check-out count) into a content management table 333 in relation to the user ID of the user who purchased the content.

The content management table 333 lists content IDs, content supply source addresses, permitted check-out counts which is one of the usage conditions, and device IDs or medium IDs in relation to the user IDs for identifying the users of the mobile telephone 201, the personal computer 12, and the PDA 13 as shown in FIG. 35 for example.

In the example shown in FIG. 35, the user ID of the user who purchased the content with content ID "A123" is "AAA," the content supply source address indicative of the address of the server supplying the content "A123" is "ααα" (for example, the URL (Uniform Resource Locator) of the shop server 4), the permitted check-out count of the content with the content ID "A123" is 2, and the medium ID of the medium to which the content has been checked out is "AZ555" (corresponding to the portable medium 202 for example).

When a content purchase request comes from the manager server 14, a content management program 341 of the shop server 4 reads the usage conditions of the requested content from a content database 184 and the corresponding content key from a key management program 185 and sends the usage conditions and the content key (encrypted by a temporary key) to the manager server 14 via the network 3. The content management program 341 of the shop server 4, when requested by the manager server 14 for the transmission of the content (including the address of the mobile telephone 201), reads the content from the content database 184 and sends the content to the mobile telephone 201 via the network 3.

The following describes the content purchase processing in the digital data transmission system having the functional configuration shown in FIG. 34 with reference to the flowchart shown in FIG. 36. The processes of steps S12101 through S12403 are generally the same as those of steps S5101 through S5403 shown in FIG. 23 and therefore their descriptions will be skipped.

Figure 37:
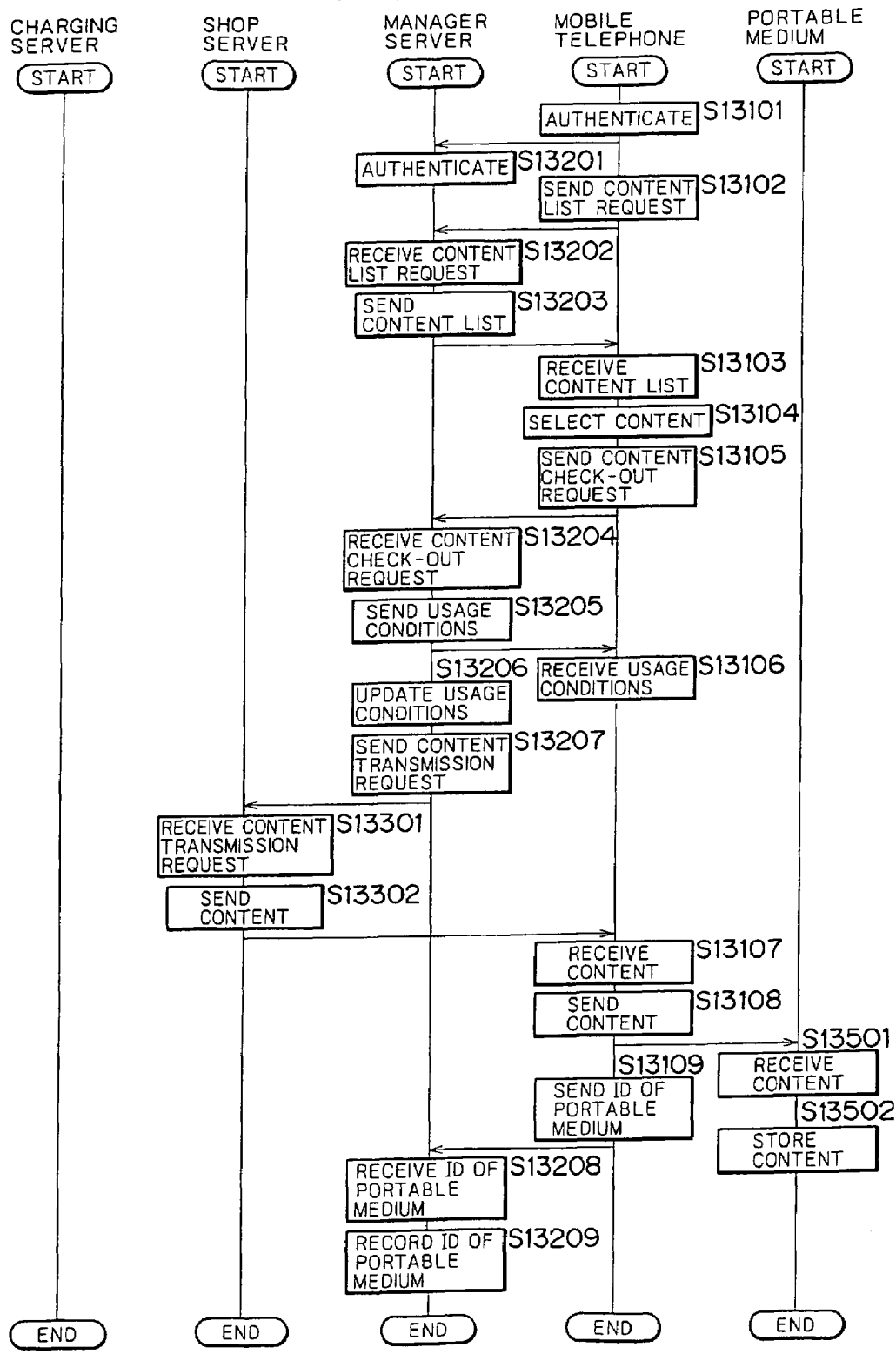
FIG. 37 is a flowchart describing a content checkout process.

The following describes the content check-out processing in the digital data transmission system having the functional configuration shown in FIG. 34 with reference to the flowchart shown in FIG. 37. In step S13101, the authentication program 261 of the mobile telephone 201 authenticates the manager server 14 via the network 3. In step S13201, the authentication program 151 of the manager server 14 authenticates the mobile telephone 201.

The processes of steps S13101 and S13201 are generally the same as those of steps S1101 and S1201 shown in FIG. 10 and therefore their descriptions will be skipped.

In step S13102, the display operation instructing program 263 of the mobile telephone 201 sends a content list request (including the user ID of the user of the mobile telephone 201) to the manager server 14 via the network 3. In step S13202, the content management program 332 of the manager server 14 receives the content list request.

In step S13203, on the basis of the user ID received in step S13202, the content management program 332 of the manager server 14 reads from the content management table 333 the content corresponding to the user ID of the user of the mobile telephone 201, namely the content purchased by the user of the mobile telephone 201, and sends the list (containing the music title of the content for example) of the content purchased by the user of the mobile telephone 201 to the mobile telephone 201 via the network 3. In step S13103, the display operation instructing program 263 of the mobile telephone 201 receives the list of the content purchased by the user of the mobile telephone 201.

In step S13104, the display operation instructing program 263 of the mobile telephone 201 displays the content list on the display block 226 and, on the basis of the signal inputted from the input block 225 by the user of the mobile telephone 201, selects a particular content from the list.

In this case, the content management program 332 sends to the mobile telephone 201 the device ID or medium ID that has checked out the content, these IDs being recorded in correlation with the content ID in the content management table 333 as shown in FIG. 35 for example. This allows the mobile telephone 201 to display on the display block 226 the device ID or medium ID to which the content is checked out in correlation with the music title of the content.

Displaying the device ID or medium ID as above allows the user of the mobile telephone 201 to learn the device or medium to which the desired content has been checked out.

In step S13105, the content management program 321 sends a request (including the content ID of the selected content) for checking out the content selected in step S13104 to the manager server 14 via the network 3. In step S13204, the content management program 332 of the manager server 14 receives this content check-out request.

In step S13205, the content management program 332 of the manager server 14 sends the usage conditions and content key of the content to be checked out to the mobile telephone 201 via the network 3. In step S13206, the content management program 332 decrements by 1 the permitted check-out count corresponding to the transmitted usage conditions, the permitted check-out count being stored in the content management table 333.

In step S13106, the content management program 321 of the mobile telephone receives the usage conditions and content key of the content supplied from the manager server 14.

In step S13207, the content management program 332 of the manager server 14 sends a content transmission request (including the content ID and the address of the mobile telephone 201) to the shop server 4 via the network 3. In step S13301, the content management program 341 of the shop server 4 reads the content (encrypted) corresponding to the content ID included in the content transmission request from the content database 184 and sends the content to the mobile telephone 201 via the network 3.

In step S13107, the content management program 321 of the mobile telephone 201 receives the content supplied from the shop server 4.

In step S13108, the content management program 321 of the mobile telephone 201 instructs the communications program 266 to send the content received in step S13107, the content key and the content usage conditions received in step S13106 to the portable medium 202. In step S13501, the content management program 282 of the portable medium 202 receives the content and its content key and usage conditions supplied by the mobile telephone 201.

In step S13502, the content management program 282 of the portable medium 202 stores the content, its content key and usage conditions received in step S13501.

In step S13109, the content management program 321 of the mobile telephone 201 sends the medium ID of the portable medium 202 obtained in the authentication (executed when the portable medium 202 is loaded in the mobile telephone 201) with the portable medium 202 to the manager server 14 via the network 3. In step S13208, the content management program 332 of the manager server 14 receives the medium ID of the portable medium 202. In step S13209, the content management program 332 of the manager server 14 records in the content management table 333 the medium ID of the portable medium 202 in correlation with the content ID of the usage conditions received in step S13205, upon which the content check-out processing comes to an end.

It should be noted that the content management program 321 may read the content from a CD such as the optical disc 62 loaded in the drive 241. Any copyright-managed content may be reproduced on the mobile telephone as outputted from a CD.

Figure 38:
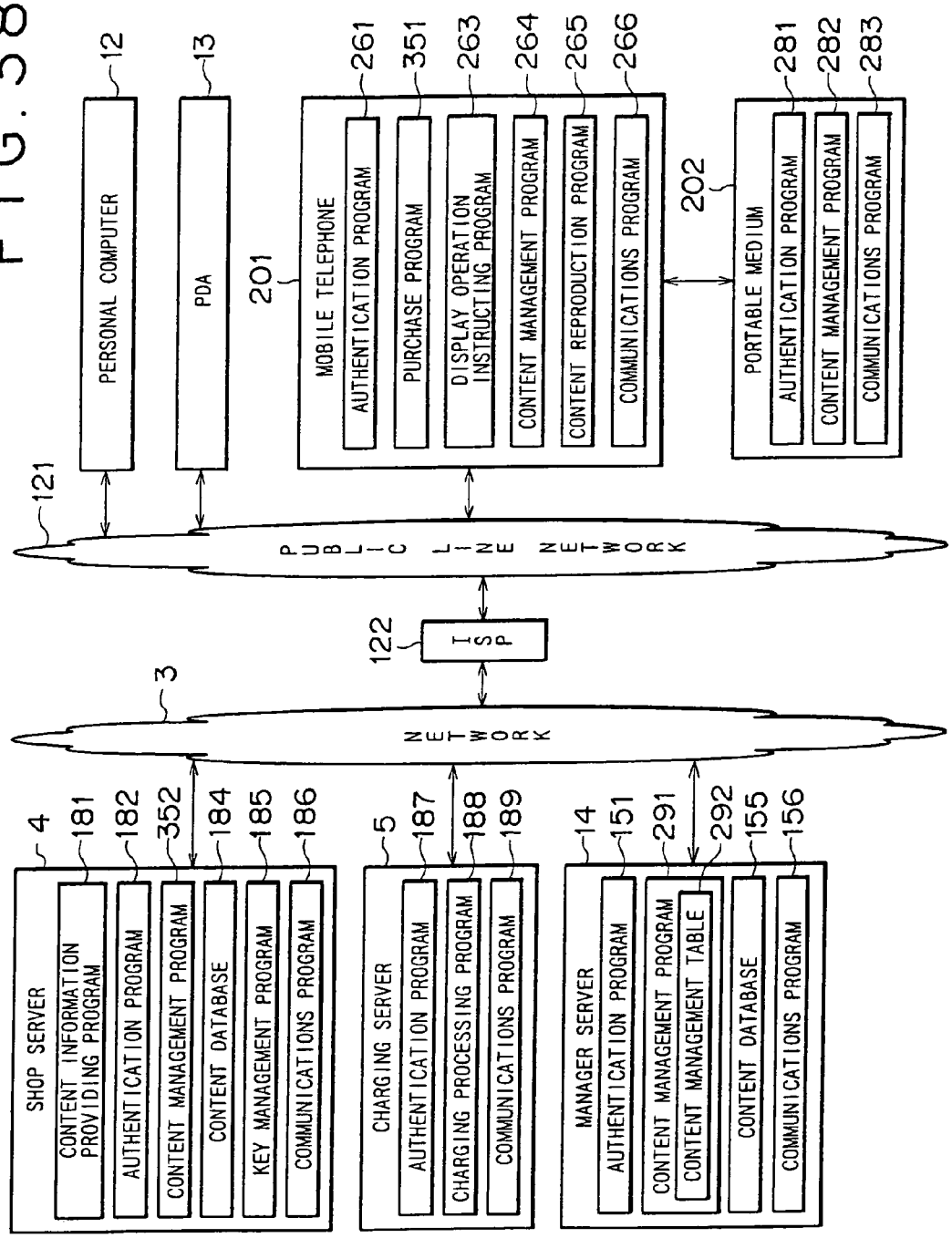
FIG. 38 is a block diagram illustrating an exemplary configuration of a fifth capability of the digital dada transmission system according to the invention.

The following describes an exemplary configuration of a fifth capability of the digital data transmission system associated with the present invention with reference to FIG. 38. With reference to FIG. 38, components similar to those previously described with FIG. 28 are denoted by the same reference numerals and therefore their descriptions will be skipped.

A purchase program 351 of the mobile telephone 201 sends a content purchase request to the shop server 4 via the public line network 121 and the network 3 along with the address of the manager server 14. The content purchase request to be sent by the purchase program 351 includes the content ID of a content to be purchased, the device ID of the mobile telephone 201, and the user ID of the user of the mobile telephone 201.

A content management program 352 of the shop server 4 receives the content purchase request from the purchase program 351, reads the requested content and its content usage conditions from the content database 184 and the corresponding content key from the key management program 185, and sends the content and its content key (encrypted by a temporary key) and usage conditions to the manager server 14 via the network 3 on the basis of the received address of the manager server 14.

When the content and its content key and usage conditions have been sent from the shop server 4 to the manager server 14 as requested by the content purchase request, the purchase program 351 sends a payment request to the charging server 5.

Figure 39:
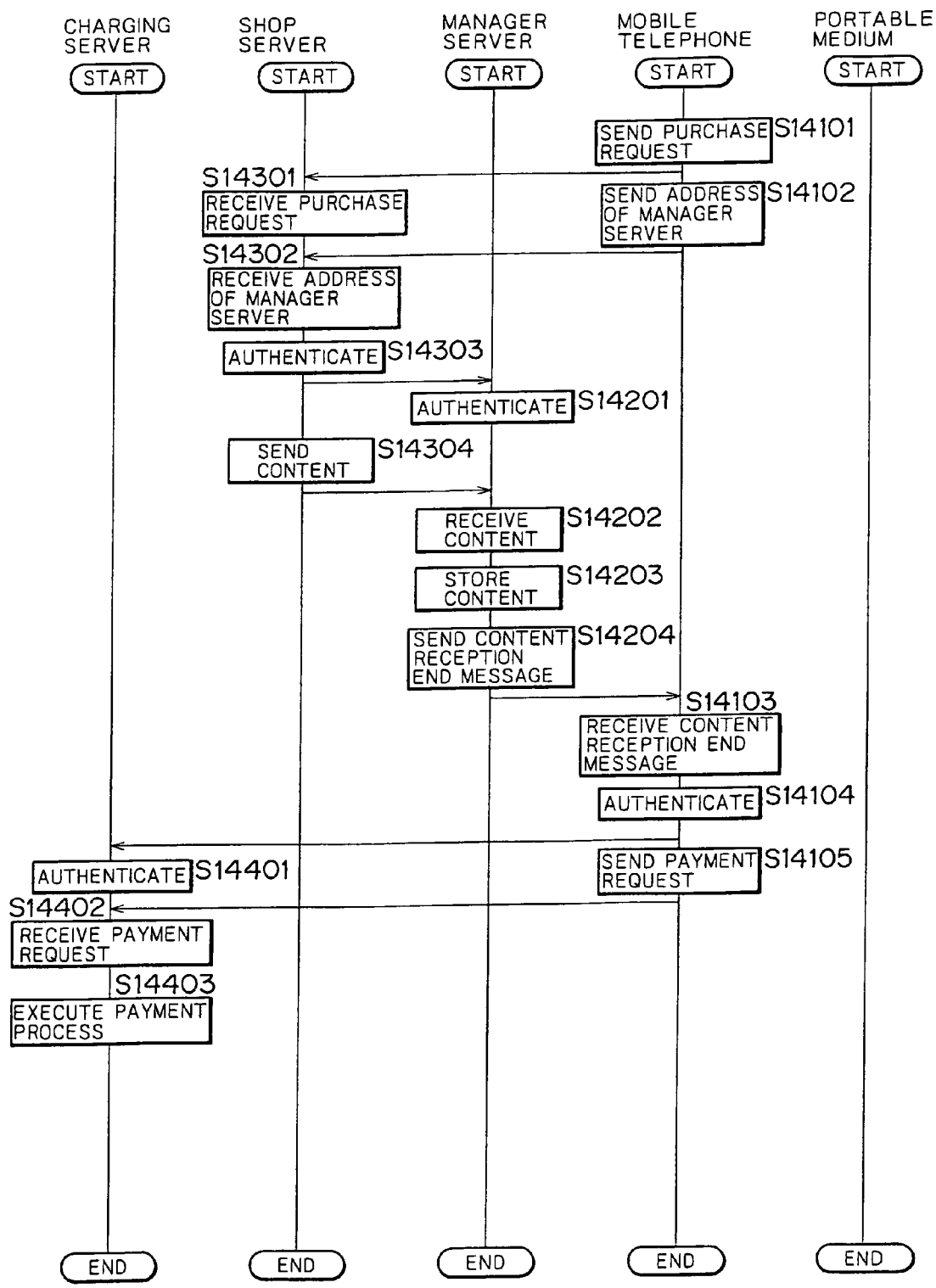
FIG. 39 is a flowchart describing a content purchase process.

The following describes the content purchase processing in which the mobile telephone 201 requests the shop server 4 for content purchase and sends a payment request to the charging server 5 with reference to the flowchart shown in FIG. 39. In step S14101, the purchase program 351 of the mobile telephone 201 sends a content purchase request (including the device ID and the user ID) to the shop server 4 via the network 3. In step S14301, the content management program 352 of the shop server 4 receives the content purchase request.

In step S14102, the purchase program 351 of the mobile telephone 201 sends the address of the manager server 14 to the shop server 4 via the network 3. In step S14302, the content management program 352 of the shop server 4 receives the address of the manager server 14.

In step S14303, the authentication program 182 of the shop server 4 establishes a connection with the manager server 14 on the basis of the address of the manager server 14 received in step S14302, thereby authenticating the manager server 14. In step S14201, the authentication program 151 of the manager server 14 authenticates the shop server 4.

The processes of steps S14303 and S14201 are generally the same as those of steps S1101 and S1201 shown in FIG. 10.

In step S14304, the content management program 352 reads the content (encrypted) corresponding to the content ID received in step S14301 and its usage conditions from the content database 184 and makes the key management program 185 supply the content key corresponding to that content. The content management program 352 sends the content and its usage conditions to the manager server 14 along with the device ID and the user ID. The content management program 352 encrypts the content key by the temporary key generated in the authentication process and sends the encrypted content key to the manager server 14.

In step S14202, the content management program 291 of the manager server 14 receives the content and its usage condition and content key from the shop server 4. The content management program 291 then decrypts the content key by the temporary key generated in the authentication process.

In step S14203, the content management program 291 stores the content and its content key and usage conditions into the content database 155 in relation to the device ID and the user ID.

In step S14204, the content management program 291 of the manager server 14 sends a message telling that the content reception has been completed to the mobile telephone 201 via the network 3. In step S14103, the purchase program 351 of the mobile telephone 201 receives this message.

In step S14104, the authentication program 261 of the mobile telephone 201 authenticates the charging server 5. In step S14401, the authentication program 187 of the charging server 5 authenticates the mobile telephone 201. In the authentication processes in steps S14104 and S14401 are generally the same as those of steps S1101 and S1201 shown in FIG. 10.

In step S14105, the purchase program 351 of the mobile telephone 201 sends a payment request to the charging server 5 via the network 3. This payment request includes the credit card number for example of the user of the mobile telephone 201 and is encrypted by a temporary key generated in the authentication process. In step S14402, the charging processing program 188 of the charging server 5 receives the payment request from the mobile telephone 201. In step S14403, the charging processing program 188 of the charging server 5 executes a payment process for the corresponding credit card company on the basis of the payment request received in step S14402, upon which the content purchase processing comes to an end.

Thus, the mobile telephone 201 sends a content purchase request to the shop server 4 and the manager server 14 receives the requested content from the shop server 4 and stores it. The mobile telephone 201 requests the charging server 5 for a payment process.

As described above, a content is music data herein. It will be apparent to those skilled in the art that a content may also be still image data, moving image data, text data, or a program, for example.

In the above-mentioned embodiments, the mobile telephone 11, the personal computer 12, or the PDA 13 stores a content. It will be apparent to those skilled in the art that a content may also be checked out to an imaging digital video cassette recorder having communications functionality or an electronic notepad having communications functionality for example.

In the above-mentioned embodiments, the mobile telephone 11, the personal computer 12, the PDA 13, or the mobile telephone 201 makes communication by means of PHS or IMT. It will be apparent to those skilled in the art that the communication may also be supported by WCDMA (Code Division Multiple Access), satellite communication, satellite broadcasting, PSTN (Public Switched Telephone Network), xDSL (x Digital Subscriber Line), ISDN (Integrated Services Digital Network), or a private network, for example.

The above-mentioned sequences of processes can be executed by hardware or software. The execution by software is supported by a computer in which the programs constituting the software are installed in a dedicated hardware device beforehand or by a general-purpose personal computer capable of executing various capabilities in which these programs are installed from the program storage medium.

The program storage medium for storing computer-readable and executable programs may be a package medium constituted by the magnetic disc 61 or 101 (including floppy disc), the optical disc 62 or 102 (including CD-ROM (Compact Disc-Read Only Memory) and DVD (Digital Versatile Disc)), the magneto-optical disc 63 or 103 (including MD (Mini Disc)), or the semiconductor memory 64 or 104 or the ROM 32, ROM 82, or the HDD 91 on which the programs are stored temporarily or permanently as shown in FIG. 5 or 6. Programs are stored in the program storage medium from wired or wireless communications media such as a local area network, the Internet, and digital satellite broadcasting through the communications block 38 or 93 as required.

It should be noted that the steps describing the programs to be stored in the program storage medium are not only executed in a time-series manner in the order described, but also in parallel or in a discrete manner.

It should also be noted that the system as used herein denotes an entire apparatus constituted by a plurality of component units.

What is claimed is:

1. An information providing system including a first information providing apparatus, an information processing apparatus, and a second information providing apparatus,
   said first information providing apparatus comprising:
   first reception control means for controlling a reception, from said information processing apparatus, of user identification data for identifying a user of said information processing apparatus and a request for purchasing a content;
   first transmission control means for controlling, in response to said request for purchasing said content, a transmission of said request for purchasing said content to said second information providing apparatus;
   second reception control means for controlling a reception, from said second information providing apparatus, of device identification information for identifying said second information providing apparatus and usage conditions of said content;
   storage control means for controlling storage of said device identification information and said usage conditions in correspondence with said user identification data; and
   second transmission control means for controlling in response to a request, from said information processing apparatus, a transmission, to said information processing apparatus, of said device identification information and said usage conditions stored in correspondence with said user identification data;

said information processing apparatus comprising:
third reception control means for controlling a reception of said device identification information and said usage conditions;
third transmission control means for controlling, when reproduction of said content is requested, a transmission of the request for said content to said second information providing apparatus on the basis of said device identification information and said usage conditions; and
fourth reception control means for controlling a reception of said content from said second information providing apparatus; and
said second information providing apparatus comprising:
fifth reception control means for controlling a reception of said request for purchasing said content from said first information providing apparatus;
fourth transmission control means for controlling in response to said request for purchasing said content a transmission of said device identification information and said usage conditions to said first information providing apparatus;
sixth reception control means for controlling a reception of a request for said content from said information processing apparatus; and
fifth transmission control means for controlling, in response to said request for said content, a transmission of said content to said information processing apparatus.

2. An information providing apparatus for a system, said system including an information processing apparatus and another information providing apparatus, said information providing apparatus comprising:
first reception control means for controlling a reception, from said information processing apparatus, of user identification data for identifying a user of said information processing apparatus and for controlling a reception of a request for purchasing a content;
first transmission control means for controlling a transmission of said request for purchasing content to the another information providing apparatus in response to said request for purchasing said content from the information processing apparatus;
second reception control means for controlling, a reception, sent from said another information providing apparatus, of information for identifying said another information providing apparatus and for controlling a reception of a usage condition of said content;
storage control means for controlling a storage of said information for identifying said another information providing apparatus and for identifying said usage condition in correspondence with controlling identification for identifying said user identification data; and
second transmission control means for controlling a transmission of said information for identifying said another information providing apparatus and said usage condition of said content to said information processing apparatus.

3. The information providing apparatus according to claim 2, wherein said second transmission control means controls a transmission of said content when checking out said content and said second reception control means controls a reception of information for identifying a destination to which said content is checked out.

4. The information providing apparatus according to claim 2, wherein said second reception control means controls the reception of said information for identifying said another information providing apparatus as a device identification.

5. The information providing apparatus according to claim 2, wherein said first reception control means controls a reception of information for identifying said information processing apparatus and said storage control means controls said information for identifying said information processing apparatus in correspondence with said usage condition of said content.

6. The information providing apparatus according to claim 2, wherein said second transmission control means controls the transmission of said information for identifying said another information providing apparatus and said usage condition to a storage medium detachably loaded in said information processing apparatus and said first reception control means controls a reception of information for identifying the storage medium.

7. The information providing apparatus according to claim 6, wherein said second transmission control means controls a transmission of said content when checking out said content and said first reception control means controls a reception of information for identifying a check-out destination of said content, said information being indicative of said storage medium.

* * * * *

UNITED STATES PATENT AND TRADEMARK OFFICE
CERTIFICATE OF CORRECTION

PATENT NO.         : 7,240,033 B2
APPLICATION NO. : 09/803898
DATED                 : July 3, 2007
INVENTOR(S)        : Shinobu Kuriya et al.

It is certified that error appears in the above-identified patent and that said Letters Patent is hereby corrected as shown below:

Column 23, line 42, change "AS" to --As--.
Column 28, line 6, change "D6661" to --D666--.
Column 41, line 54, change "S101" to --S1101--.
Column 49, line 40, insert --said-- after purchasing.

Signed and Sealed this

Twenty-ninth Day of April, 2008

JON W. DUDAS
*Director of the United States Patent and Trademark Office*